United States Patent
Chen et al.

(10) Patent No.: US 11,892,312 B2
(45) Date of Patent: Feb. 6, 2024

(54) METHODS AND SYSTEMS FOR PROVIDING INFORMATION FOR AN ON-DEMAND SERVICE

(71) Applicant: BEIJING DIDI INFINITY TECHNOLOGY AND DEVELOPMENT CO., LTD., Beijing (CN)

(72) Inventors: Ye Chen, Beijing (CN); Chengxiang Zhuo, Beijing (CN); Zhaoxue Wu, Beijing (CN); Ming Xu, Beijing (CN); Kaijie Qin, Beijing (CN); Yajie Zhang, Beijing (CN); Haiyang Lu, Beijing (CN); Dong Guo, Beijing (CN); Peng Yu, Beijing (CN); Yanjun Lu, Beijing (CN); Wenyi Bao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 252 days.

(21) Appl. No.: 17/448,717

(22) Filed: Sep. 24, 2021

(65) Prior Publication Data
US 2022/0011131 A1 Jan. 13, 2022

Related U.S. Application Data

(60) Division of application No. 16/569,632, filed on Sep. 12, 2019, now Pat. No. 11,156,470, which is a
(Continued)

(30) Foreign Application Priority Data

Jan. 27, 2015 (CN) .......................... 201510039939.3
Jan. 29, 2015 (CN) .......................... 201510048217.4
(Continued)

(51) Int. Cl.
*G01C 21/36* (2006.01)
*G06F 16/29* (2019.01)
(Continued)

(52) U.S. Cl.
CPC ......... *G01C 21/3617* (2013.01); *G06F 16/29* (2019.01); *G06Q 50/30* (2013.01);
(Continued)

(58) Field of Classification Search
CPC .... G01C 21/3617; H04W 4/029; H04W 4/40; H04W 4/02; G06F 16/29; G06Q 50/30; G06Q 30/04
(Continued)

(56) References Cited

U.S. PATENT DOCUMENTS 5,948,040 A * 9/1999 DeLorme ............... G06Q 10/02
701/426
8,392,116 B2 3/2013 Lehmann et al.
(Continued)

FOREIGN PATENT DOCUMENTS

CN 1289218 A 3/2001
CN 1692671 A 11/2005
(Continued)

OTHER PUBLICATIONS

Joao Bartolo Gomes et al., Where will you go? Mobile Data Mining for Next Place Prediction, International Conference on Data Warehousing and Knowledge Discovery, 146-158, 2013.
(Continued)

*Primary Examiner* — Yazan A Soofi
(74) *Attorney, Agent, or Firm* — METIS IP LLC

(57) ABSTRACT

The present disclosure relates to an information providing method for an on-demand service. The method may include receiving service request information from a passenger of a passenger terminal device. The service request information
(Continued)

may include a departure location of the passenger. The method may further include acquiring historical service request information related to the passenger; and determining travel-route-related information based at least in part on the departure location of the passenger and the historical service request information. Also disclosed is a system for implementing the method.

16 Claims, 19 Drawing Sheets

Related U.S. Application Data continuation of application No. 15/546,657, filed as application No. PCT/CN2016/072357 on Jan. 27, 2016, now Pat. No. 10,458,806.

(30) Foreign Application Priority Data

| | | | |
|---|---|---|---|
| Feb. 10, 2015 | (CN) | ......................... | 201510070073.2 |
| Mar. 10, 2015 | (CN) | ......................... | 201510105381.4 |
| Apr. 1, 2015 | (CN) | ......................... | 201510151590.2 |
| May 12, 2015 | (CN) | ......................... | 201510239402.1 |
| May 28, 2015 | (CN) | ......................... | 201510284601.4 |
| Jul. 31, 2015 | (CN) | ......................... | 201510464596.5 |
| Sep. 16, 2015 | (CN) | ......................... | 201510591079.4 |
| Dec. 25, 2015 | (CN) | ......................... | 201510991394.6 |
| Dec. 25, 2015 | (CN) | ......................... | 201511000093.9 |

(51) Int. Cl.

| | |
|---|---|
| *H04W 4/029* | (2018.01) |
| *G06Q 50/30* | (2012.01) |
| *H04W 4/02* | (2018.01) |
| *H04W 4/40* | (2018.01) |
| *H04L 67/52* | (2022.01) |
| *G06Q 30/04* | (2012.01) |

(52) U.S. Cl.
CPC ............... *H04L 67/52* (2022.05); *H04W 4/02* (2013.01); *H04W 4/029* (2018.02); *H04W 4/40* (2018.02); *G06Q 30/04* (2013.01)

(58) Field of Classification Search
USPC .......................................................... 701/521
See application file for complete search history.

(56) References Cited

U.S. PATENT DOCUMENTS

| | | | |
|---|---|---|---|
| 8,478,642 B2 | 7/2013 | Dey et al. | |
| 8,676,799 B1 | 3/2014 | Vaver | |
| 8,706,406 B2* | 4/2014 | Kalaboukis | G06Q 50/01 |
| | | | 701/423 |
| 8,855,912 B2* | 10/2014 | Miura | G01C 21/3469 |
| | | | 701/534 |
| 9,400,185 B2 | 7/2016 | Tanaka et al. | |
| 2002/0061754 A1 | 5/2002 | Takano | |
| 2004/0128066 A1 | 7/2004 | Kudo et al. | |
| 2004/0193492 A1 | 9/2004 | Applebaum | |
| 2007/0073477 A1 | 3/2007 | Krumm et al. | |
| 2007/0100687 A1 | 5/2007 | Yoshikawa | |
| 2009/0063226 A1* | 3/2009 | Greiner | G06Q 50/30 |
| | | | 705/7.26 |
| 2011/0019250 A1 | 1/2011 | Aiki et al. | |
| 2011/0128289 A1* | 6/2011 | Zingaretti | G06T 7/0014 |
| | | | 345/428 |
| 2011/0196601 A1* | 8/2011 | Miura | G01C 21/3697 |
| | | | 701/532 |
| 2011/0238289 A1 | 9/2011 | Lehmann et al. | |
| 2012/0041675 A1 | 2/2012 | Juliver et al. | |
| 2012/0069131 A1* | 3/2012 | Abelow | G06Q 30/0601 |
| | | | 345/589 |
| 2012/0123806 A1* | 5/2012 | Schumann, Jr. | G06Q 40/08 |
| | | | 705/4 |
| 2012/0295641 A1 | 11/2012 | Tsuda | |
| 2013/0066548 A1 | 3/2013 | Gruen et al. | |
| 2013/0238241 A1 | 9/2013 | Chelotti et al. | |
| 2013/0246219 A1* | 9/2013 | Mishanski | G06Q 30/00 |
| | | | 705/26.9 |
| 2013/0253812 A1 | 9/2013 | Masutani | |
| 2013/0285855 A1* | 10/2013 | Dupray | H04W 4/029 |
| | | | 342/451 |
| 2013/0316734 A1* | 11/2013 | Weiss | H04W 4/021 |
| | | | 455/456.1 |
| 2013/0337827 A1 | 12/2013 | Grobman | |
| 2014/0031068 A1 | 1/2014 | Yamada et al. | |
| 2014/0032274 A1 | 1/2014 | Ensen et al. | |
| 2014/0188748 A1 | 7/2014 | Cavoue et al. | |
| 2014/0207725 A1 | 7/2014 | Li et al. | |
| 2014/0274022 A1* | 9/2014 | Bell | G06F 16/235 |
| | | | 455/418 |
| 2014/0278105 A1 | 9/2014 | Canfield | |
| 2014/0310075 A1* | 10/2014 | Ricci | B60W 50/085 |
| | | | 705/13 |
| 2014/0372030 A1 | 12/2014 | Leader et al. | |
| 2015/0006279 A1* | 1/2015 | Khann | G06Q 30/0246 |
| | | | 705/14.45 |
| 2015/0073693 A1 | 3/2015 | Yang et al. | |
| 2016/0086391 A1* | 3/2016 | Ricci | G06Q 30/06 |
| | | | 701/29.3 |
| 2016/0216130 A1* | 7/2016 | Abramson | G01C 21/3423 |
| 2017/0191845 A1* | 7/2017 | Marueli | G01C 21/20 |
| 2017/0270447 A1* | 9/2017 | Borean | H04W 4/023 |
| 2018/0017405 A1* | 1/2018 | Chen | H04W 4/40 |
| 2018/0025408 A1 | 1/2018 | Xu et al. | |
| 2018/0032928 A1 | 2/2018 | Li et al. | |
| 2018/0033112 A1* | 2/2018 | Wu | G08G 1/00 |
| 2018/0137594 A1* | 5/2018 | Marco | G06Q 10/063114 |
| 2018/0160464 A1 | 6/2018 | Zhang | |
| 2018/0268324 A1 | 9/2018 | Zhang et al. | |
| 2018/0352039 A1 | 12/2018 | Yae et al. | |
| 2019/0107404 A1 | 4/2019 | Zhong et al. | |
| 2021/0209520 A1 | 7/2021 | Sarawgi et al. | |
| 2023/0045975 A1* | 2/2023 | Simpson | G01C 21/3438 |

FOREIGN PATENT DOCUMENTS

| | | |
|---|---|---|
| CN | 1808517 A | 7/2006 |
| CN | 101231718 A | 7/2008 |
| CN | 101382936 A | 3/2009 |
| CN | 101470012 A | 7/2009 |
| CN | 101546314 A | 9/2009 |
| CN | 102080964 A | 6/2011 |
| CN | 102129078 A | 7/2011 |
| CN | 102402566 A | 4/2012 |
| CN | 102413231 A | 4/2012 |
| CN | 102496130 A | 6/2012 |
| CN | 102629297 A | 8/2012 |
| CN | 102645220 A | 8/2012 |
| CN | 102749637 A | 10/2012 |
| CN | 102982680 A | 3/2013 |
| CN | 103208181 A | 7/2013 |
| CN | 103310287 A | 9/2013 |
| CN | 103323018 A | 9/2013 |
| CN | 103514739 A | 1/2014 |
| CN | 103632532 A | 3/2014 |
| CN | 103747523 A | 4/2014 |
| CN | 103841517 A | 6/2014 |
| CN | 103852771 A | 6/2014 |
| CN | 104391855 A | 3/2015 |
| CN | 104427466 A | 3/2015 |
| CN | 104442825 A | 3/2015 |
| CN | 104571036 A | 4/2015 |
| CN | 104599168 A | 5/2015 |
| CN | 104599217 A | 5/2015 |
| CN | 104616086 A | 5/2015 |
| CN | 104899252 A | 9/2015 |
| CN | 105138590 A | 12/2015 |

(56) References Cited

FOREIGN PATENT DOCUMENTS

| | | |
|---|---|---|
| JP | 1998283519 A | 10/1998 |
| JP | 2002181580 A | 6/2002 |
| JP | 2004045413 A | 2/2004 |
| JP | 2005018392 A | 1/2005 |
| JP | 2007316034 A | 12/2007 |
| JP | 2008003906 A | 1/2008 |
| JP | 2013210969 A | 10/2013 |
| JP | 2014075727 A | 4/2014 |
| KR | 20100005922 A | 1/2010 |
| KR | 20130002086 A | 1/2013 |
| KR | 101264284 B1 | 5/2013 |
| KR | 101296737 B1 | 8/2013 |
| WO | 2007067842 A2 | 6/2007 |
| WO | 2009125880 A1 | 10/2009 |
| WO | 2013072729 A1 | 5/2013 |
| WO | 2016119704 A1 | 8/2016 |

OTHER PUBLICATIONS

Yang, Xiaoming, An Automatic Annotation Algorithm for The Classification of Interest Points in electronic Map, Network Security Techniques and Their Applications, 2015, 4 pages.
Rikard, L., Anomaly Detection in Trajectory Data for Surveillance Applications, Doctoral Dissertation, Örebro Universitet, 2011, 143 pages.
International Search Report in PCT/CN2016/072357 dated Apr. 28, 2016, 6 pages.
First Office Action in Chinese application No. 201510039939.3 dated May 27, 2017, 7 pages.
First Office Action in Chinese application No. 201510048217.4 dated May 26, 2017, 7 pages.
First Office Action in Chinese Application No. 201510464596.5 dated Jan. 30, 2018, 22 pages.
The Third Office Action in Chinese application No. 201510048217.4 dated May 10, 2018, 19 pages.
First Office Action in Chinese application No. 201510070073.2 dated May 18, 2017, 15 pages.
The Third Office Action in Chinese application No. 201510070073.2 dated Jun. 6, 2018, 18 pages.
First Office Action in Chinese application No. 201510105381.4 dated May 5, 2016, 21 pages.
The Second Office Action in Chinese Application No. 201510105381.4 dated Nov. 3, 2016, 20 pages.
First Office Action in Chinese application No. 201510591079.4 dated May 25, 2017, 32 pages.
First Office Action in Chinese Application No. 201510991394.6 dated Mar. 2, 2020, 25 pages.
Examination Report No. 2 in Australian Application No. 2016212530 dated Aug. 7, 2019, 5 pages.
Notification of Reasons for Refusal in Japanese Application No. 2017-539550 dated Mar. 19, 2019, 6 Pages.
The Examination Search Report in Canadian Application No. 2975002 dated Jun. 21, 2018, 6 pages.
The Notice of Rejection in Japanese Application No. 2017-539550 dated Jul. 24, 2018, 8 pages.
First Office Action in Korean Application No. 10-2017-7023933 dated Apr. 17, 2018, 14 pages.
Notification of Reasons for Refusal in Korean Application No. 10-2017-7023933 dated Dec. 31, 2018, 8 Pages.
Search Report in Singaporean Application No. 11201706149X dated Apr. 27, 2018, 9 pages.
First Examination Report in Australian Application No. 2019236639 dated Nov. 24, 2020, 7 pages.
Second Examination Report in Australian Application No. 2019236639 dated May 13, 2021, 7 pages.
Decision to Grant in Japanese Application No. 2019228967 dated Jul. 6, 2021, 5 pages.

\* cited by examiner

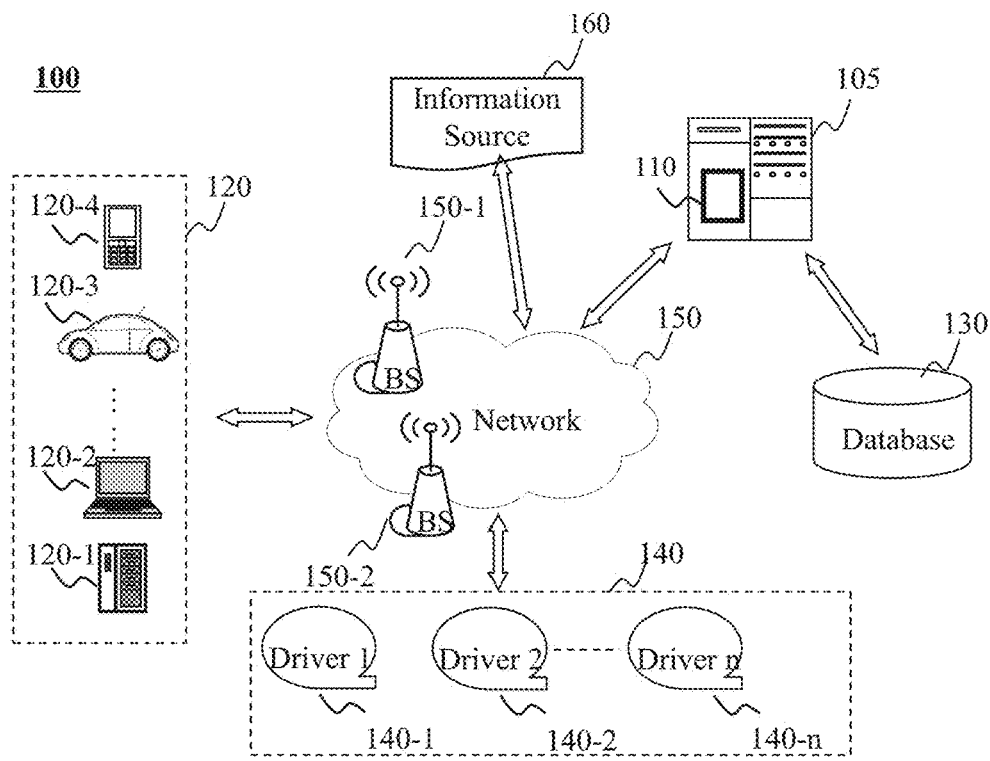
FIG. 1-A
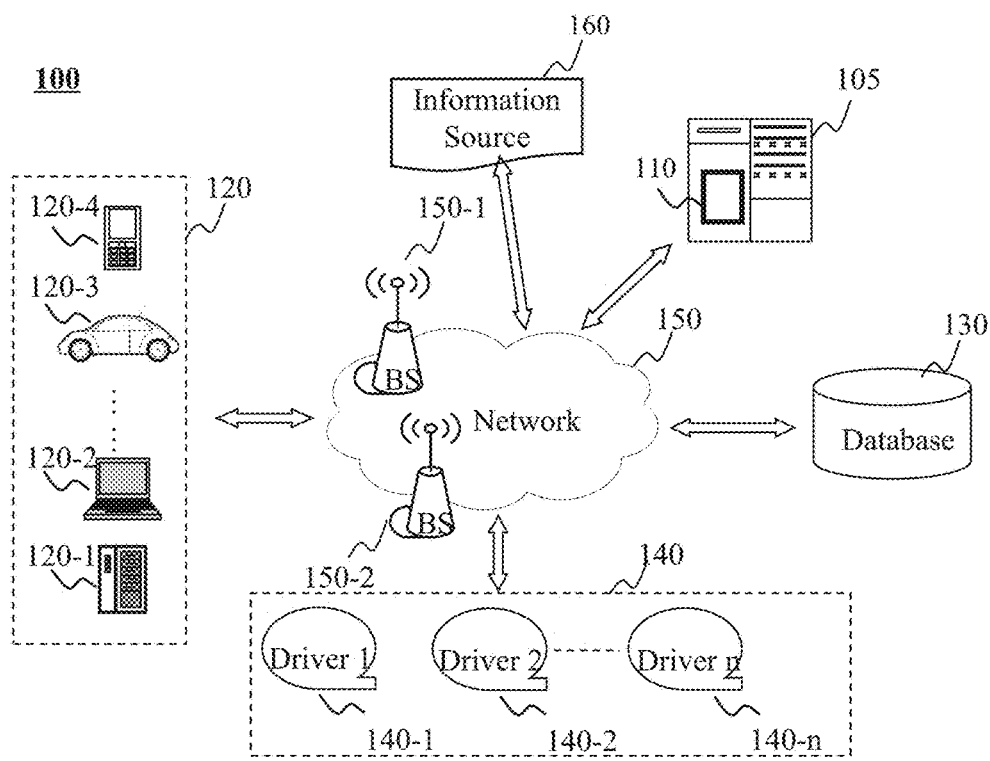
FIG. 1-B

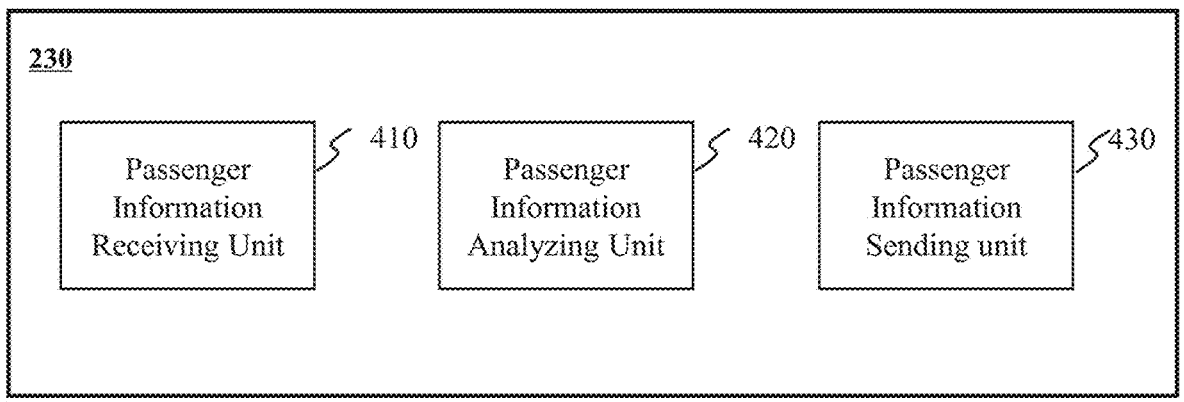
FIG. 4-A
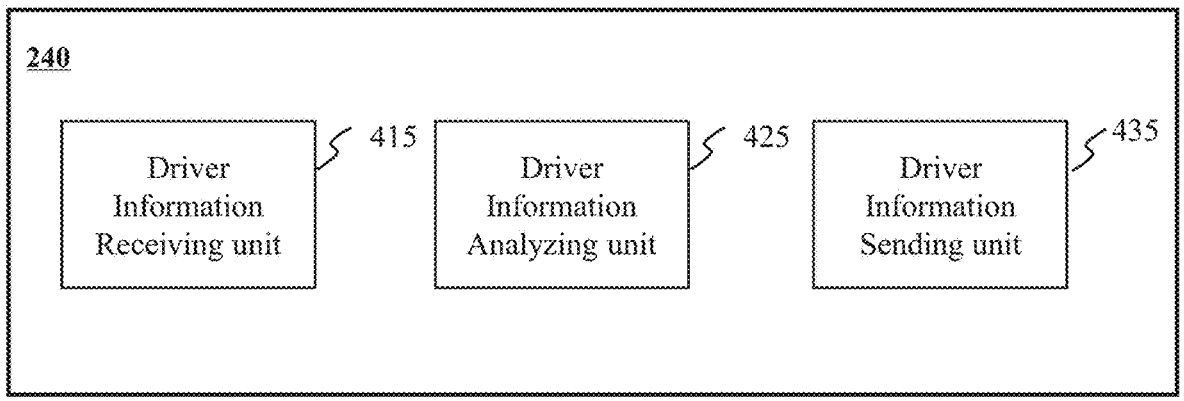
FIG. 4-B

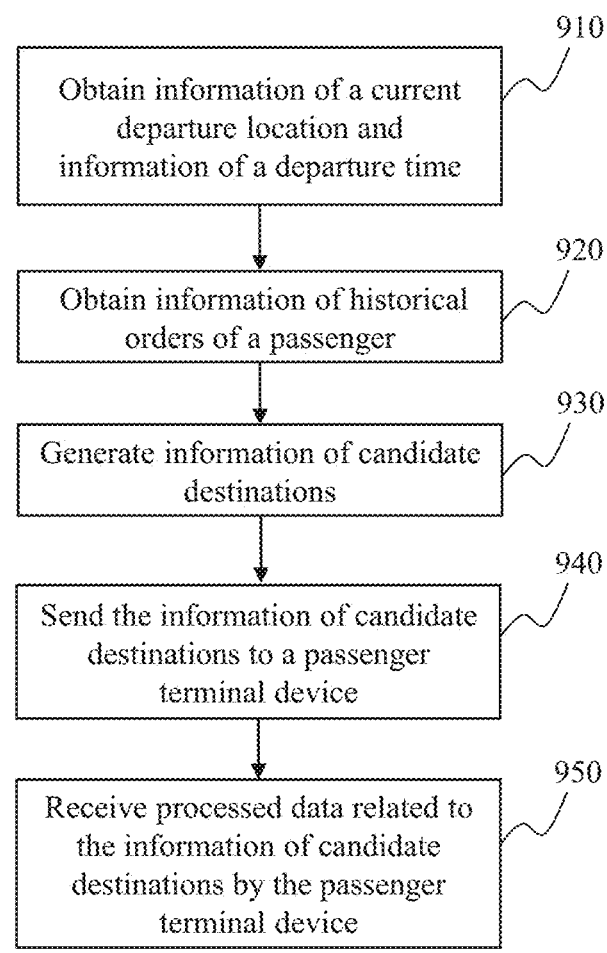
FIG. 9-A

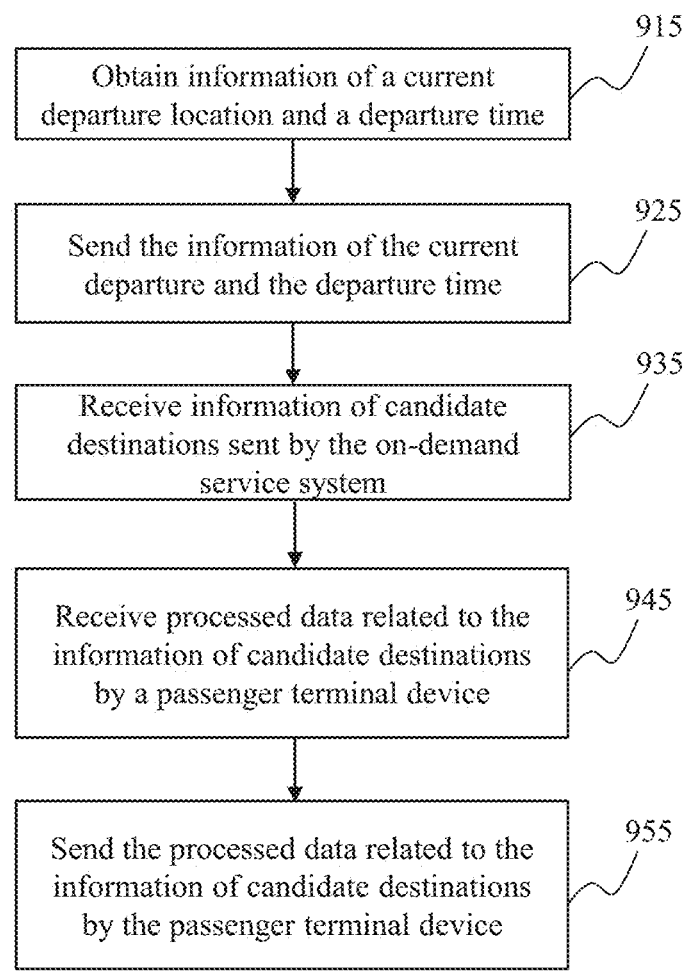
FIG. 9-B

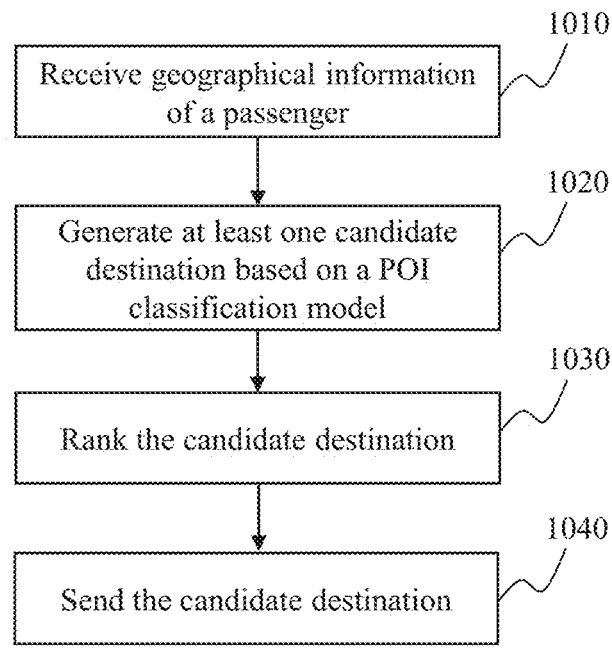
FIG. 10-A
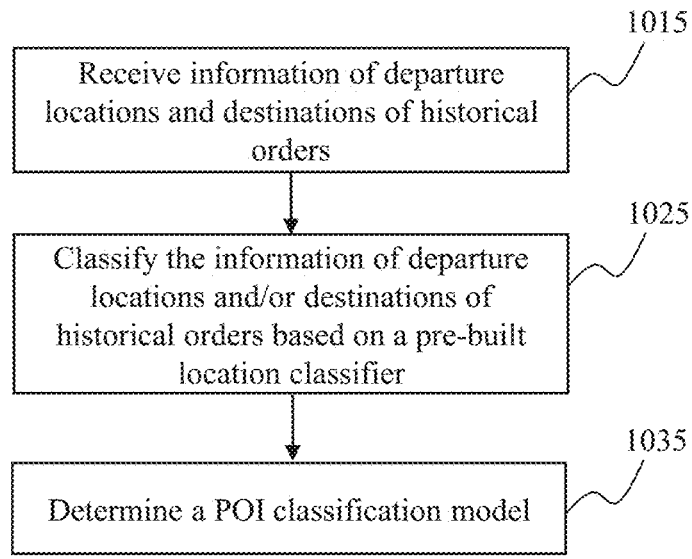
FIG. 10-B

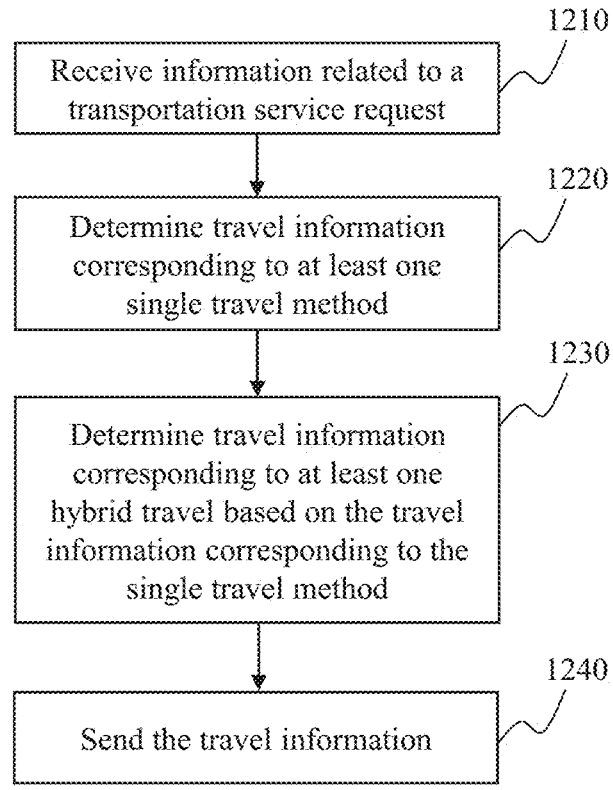
FIG. 12-A
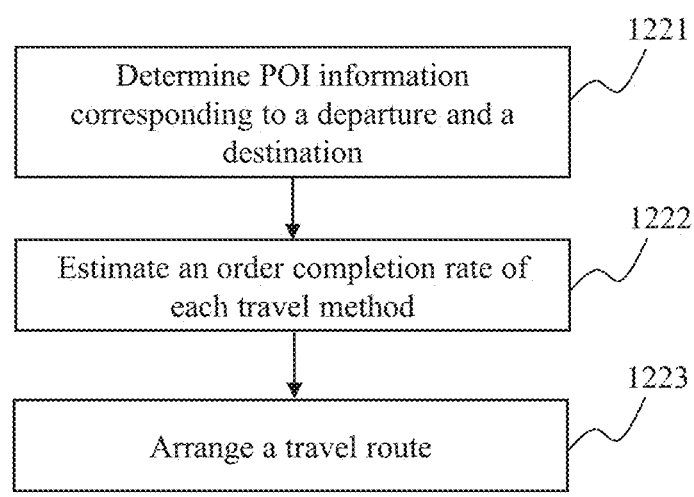
FIG. 12-B

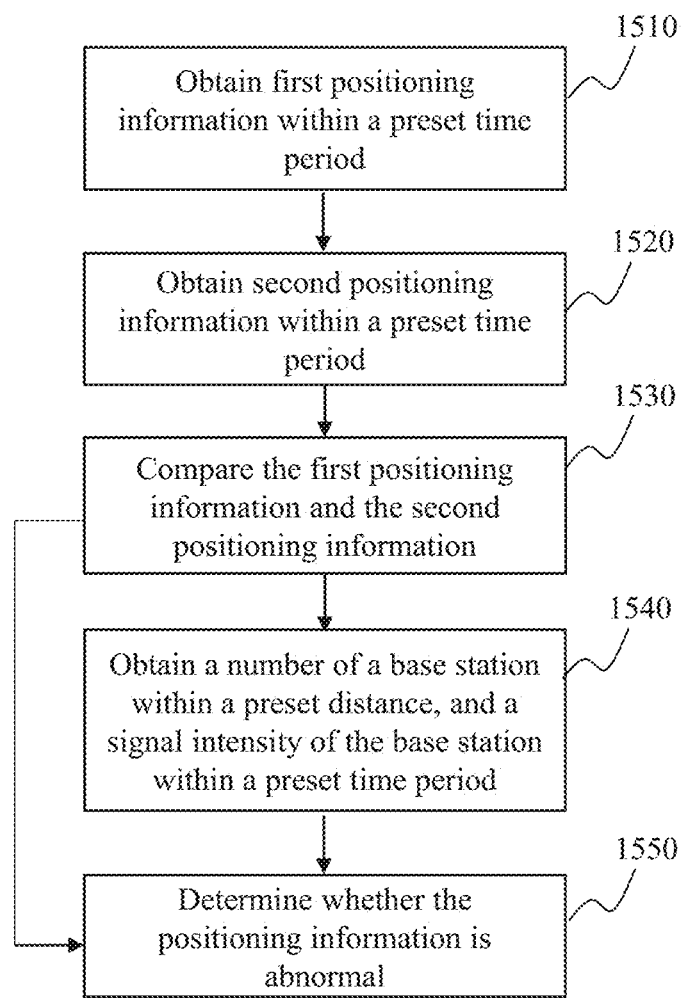
FIG. 15-A

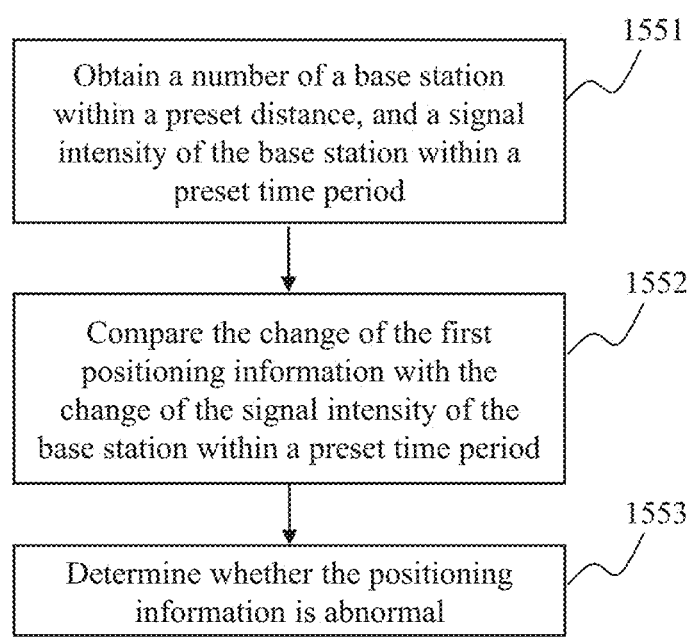
FIG. 15-B

METHODS AND SYSTEMS FOR PROVIDING INFORMATION FOR AN ON-DEMAND SERVICE

CROSS-REFERENCE TO RELATED APPLICATIONS

This application is a divisional application of U.S. application Ser. No. 16/569,632, filed on Sep. 12, 2019, which is a continuation of U.S. application Ser. No. 15/546,657, filed on Jul. 26, 2017, now U.S. Pat. No. 10,458,806, which is a U.S. National Stage entry under 35 U.S.C. § 371 of International Application No. PCT/CN2016/072357, filed on Jan. 27, 2016, which claims priority to Chinese Application No. 201510039939.3 filed on Jan. 27, 2015, Chinese Application No. 201510048217.4 filed on Jan. 29, 2015, Chinese Application No. 201510070073.2 filed on Feb. 10, 2015, Chinese Application No. 201510105381.4 filed on Mar. 10, 2015, Chinese Application No. 201510151590.2 filed on Apr. 1, 2015, Chinese Application No. 201510239402.1 filed on May 12, 2015, Chinese Application No. 201510284601.4 filed on May 28, 2015, Chinese Application No. 201510464596.5 filed on Jul. 31, 2015, Chinese Application No. 201510591079.4 filed on Sep. 16, 2015, Chinese Application No. 201510991394.6 filed on Dec. 25, 2015; and Chinese Application No. 201511000093.9 filed on Dec. 25, 2015, the contents of each of which are incorporated herein by reference.

TECHNICAL FIELD

The present disclosure generally relates to a system and method for providing information for an on-demand service, and more particularly, to a system and method for predicting travel destinations using mobile internet technologies and data processing technologies.

BACKGROUND

On-demand services and applications have become increasingly popular. For example, with the rapid growth of cities, transportation services are in high demand for people from all sectors of society. Meanwhile, due to rapid development of mobile Internet and popularity of smart devices, especially smart navigation devices and smartphones, transportation service applications are increasingly popular and can bring great convenience to people.

If the background of a transportation service system can predict a travel destination or route for a passenger/driver based on travel rules of the passenger/driver, both the passenger and the driver will have a better user experience.

SUMMARY

In one aspect of the present disclosure, a method of providing information for an on-demand service is provided. The method may include receiving service request information from a passenger terminal device. The service request information may include a departure location of the passenger. The method may further include obtaining historical service request information related to the passenger. The method may further include determining travel-route-related information based at least in part on the departure location of the passenger and the historical service request information.

In another aspect of the present disclosure, a system for providing information for an on-demand service is provided. The system may include a tangible computer readable storage medium configured to store an executable module. The executable module may include a service requester interface module configured to receive service request information from a passenger terminal device. The service request information may include a departure location of the passenger. The executable module may further include a processing module configured to obtain historical service request information related to the passenger and determine travel-route-related information based at least in part on the departure location of the passenger and the historical service request information. The system may include a processor configured to implement the executable module.

According to exemplary embodiments of the present disclosure, the service request information may include time information.

According to exemplary embodiments of the present disclosure, the travel-route-related information may include at least one of a destination, a route between a current location of the passenger and the destination, and a distance of the route.

According to exemplary embodiments of the present disclosure, the destination may be determined based on a classification model.

According to exemplary embodiments of the present disclosure, the classification model may be based on at least an address classification type of the destinations.

According to exemplary embodiments of the present disclosure, the method of providing information for an on-demand service may further include sending the travel-route-related information to the passenger terminal device.

According to exemplary embodiments of the present disclosure, the method of providing information for an on-demand service may further include receiving processed data related to the travel-route-related information by the passenger of the passenger terminal device.

According to exemplary embodiments of the present disclosure, the historical service request information may include at least one of a historical departure location, a historical destination, a historical route between the historical departure location of the passenger and the historical destination, and a distance of the historical route.

According to exemplary embodiments of the present disclosure, the method of providing information for an on-demand service may further include determining a service fee.

According to exemplary embodiments of the present disclosure, the determination of the service fee may include receiving information of multiple locations where a driver stays at multiple time points. The determination of the service fee may further include calculating the service fee based at least in part on the information of the multiple locations.

BRIEF DESCRIPTION OF THE DRAWINGS

The present disclosure is further described in terms of schematic embodiments. These schematic embodiments are described in detail with reference to the drawings. The drawings are not to scale. These embodiments are non-limiting schematic embodiments, in which like reference numerals represent similar structures throughout the several views of the drawings, and wherein:

FIG. 1-A is a schematic diagram of a network environment containing an on-demand service system according to some embodiments of the present disclosure;

FIG. 1-B is a schematic diagram of a network environment containing an on-demand service system according to another embodiment of the present disclosure;

FIG. 4-A is a schematic block diagram of a passenger interface of a POI engine according to some embodiments of the present disclosure;

FIG. 4-B is a schematic block diagram of a driver interface of a POI engine according to some embodiments of the present disclosure;

FIG. 9-A is a flow chart of an example of a process of predicting current destination-related information according to some embodiments of the present disclosure;

FIG. 9-B is a flow chart of an example of a process of receiving and processing destination-related information by a passenger terminal device according to some embodiments of the present disclosure;

FIG. 10-A is a flow chart of an example of a process of generating destination-related information according to some embodiments of the present disclosure;

FIG. 10-B is a flow chart of an example of a process of building a POI classification model according to some embodiments of the present disclosure;

FIG. 12-A is a flow chart of an example of a process of providing travel method plan by a POI engine according to some embodiments of the present disclosure;

FIG. 12-B is a flow chart of an example of a process of processing travel information by a POI engine according to some embodiments of the present disclosure;

FIG. 15-A is a flow chart of an example of a process of determining whether positioning information of a user is abnormal by a POI engine according to some embodiments of the present disclosure;

FIG. 15-B is a flow chart of an example of a process of determining whether positioning information is abnormal by a POI engine according to some embodiments of the present disclosure;

DETAILED DESCRIPTION

Figure 2:
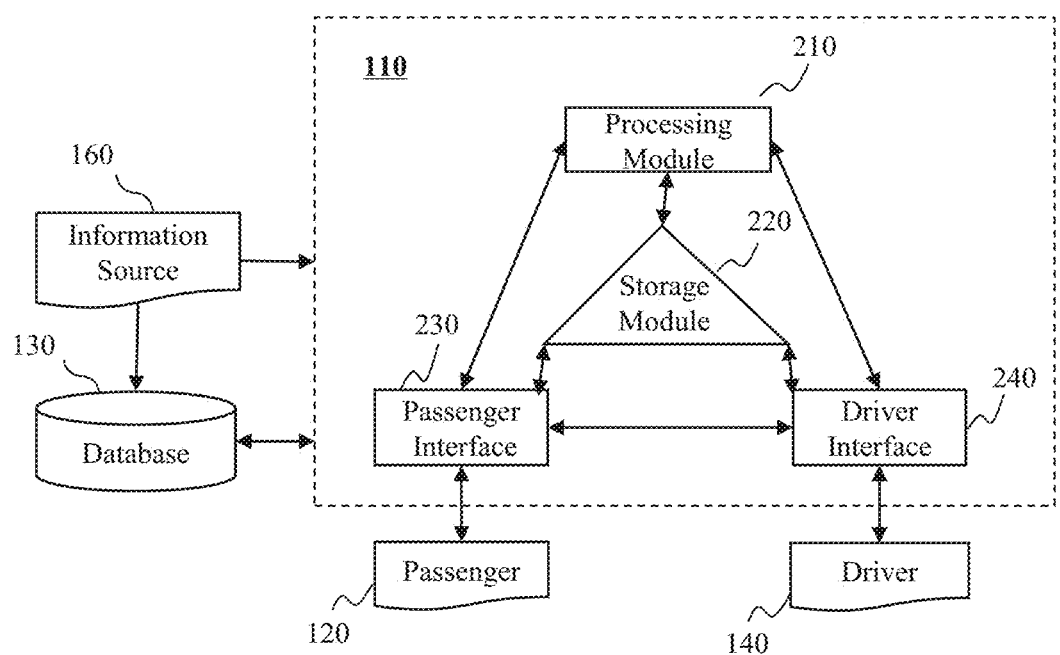
FIG. 2 is a schematic diagram of an on-demand service system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any amount of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Embodiments of the present disclosure may be applied to different transportation systems including but not limited to land transportation, sea transportation, air transportation, space transportation, the like, or any combination thereof. A vehicle of the transportation systems may include a rickshaw, travel tool, taxi, chauffeured car service, hitch, bus, rail transportation (e.g., a train, a bullet train, high-speed rail, and subway), ship, airplane, spaceship, hot-air balloon, driverless vehicle, the like, or any combination thereof. The transportation system may also include any transportation system that applies management and/or distribution, for example, a system for sending and/or receiving an express. The application scenarios of different embodiments of the present disclosure may include but is not limited to one or more webpages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar user order receiving system.

The term "user," "passenger," "requester," "service requester," and "customer" in the present disclosure are used interchangeably to refer to an individual, an entity or a tool that may request or order a service. The party may be an individual or device. Also, the term "driver," "provider," "service provider," and "supplier" in the present disclosure are used interchangeably to refer to an individual, an entity, or a device that may provide a service or facilitate the providing of the service. In addition, the term "user" in the present disclosure may refer to an individual, an entity, or a device that may request a service, order a service, provide a service, or facilitate provision of the service.

FIG. 1-A is a schematic diagram of a network environment containing an on-demand service system according to some embodiments of the present disclosure. The network environment 100 may include an on-demand service system 105, one or more passenger terminal devices 120, one or more databases 130, one or more driver terminal devices 140, one or more networks 150, and one or more information sources 160. The on-demand service system 105 may include a POI (Point of Interest) engine 110. In some embodiments, the POI engine 110 may be a system configured to analyze the collected information to generate an analytical result. The POI engine 110 may be a server, or a server group connected via a wired or a wireless network. The server group may be centralized (e.g., a data center) or distributed (e.g., a distributed system). The POI engine 110 may be centralized or distributed.

In the present disclosure, "passenger," "passenger terminal," and "passenger terminal device," may be used interchangeably. In the present disclosure, "driver," "driver terminal," and "driver terminal device" may be used interchangeably. Each of the passenger terminal 120 and the driver terminal 140 may be referred to as a user. Each of the passenger terminal 120 and the driver terminal may be an individual, a device, or other entity directly relating to service orders, such as a service requester and a service provider respectively. A passenger may be a service requester. The passenger may also include a user of the passenger terminal device 120. In some embodiments, the user of the passenger terminal device is not the passenger himself. For example, a user A of the passenger terminal device 120 may request an on-demand service, accept an on-demand service, or receive other information or instructions sent by the on-demand service system 105 for a passenger B using the passenger terminal device 120. The user of the passenger terminal device 120 may also be referred to as a passenger in the present disclosure. A driver may be a service provider. The driver may include a user of the driver terminal device 140. In some embodiments, the user of the driver terminal device may not be the actual driver. For example, a user C of the driver terminal device 140 may accept an on-demand service or receive other information or instructions sent by the on-demand service system 105 for a driver D using the driver terminal device 140. The user of the driver terminal device 140 may also be referred to as a driver in the present disclosure. In some embodiments, the passenger terminal 120 may include a desktop computer 120-1, a laptop computer 120-2, a built-in device of a vehicle 120-3, a mobile device 120-4, the like, or any combination thereof. Herein, the built-in device 120-3 may be a carputer, or the like. The mobile device 120-4 may be a smartphone, a personal digital assistance (PDA), a tablet computer, a handheld gaming device, smart glasses, a smartwatch, a wearable device, a virtual reality device, an augmented reality device (e.g., Google™ Glass, Oculus Rift™, HoloLens™, Gear™ VR, etc.), or the like, or any combination thereof. The driver terminal device 140 may also include one or more similar devices described above.

The POI engine 110 may directly access information stored in the database 130 and/or read information from or write information to the database 130. The POI engine 110 may also access information provided by the user terminal device 120 or 140 via the network 150. In some embodiments, the database 130 may include any device that is capable of storing data. The database 130 may be used to store data that are collected from the passenger 120 and/or the driver 140, and data that are used, generated and outputted by the POI engine 110. The database 130 may be local or remote. The database 130 and the on-demand service system 105 and/or one or more portions of the system 105 (e.g., the POI engine 110) may be connected via one or more wired and/or wireless communication links.

The network 150 may be a single network or a combination of networks. For example, the network 150 may include a local area network (LAN), a wide area network (WAN), a public network, a private network, a proprietary network, a public switched telephone network (PSTN), the Internet, a wireless network, a virtual network, or any combination thereof. The network 150 may include multiple network access points, such as a wired or wireless access point, including a base station 150-1, a base station 150-2, a network switched point, etc. Through these access points, any data source may be connected to the network 150 and transmit information via the network 150. Merely for illustration, the driver terminal device 140 in a transportation service is taken as an example, and it is not intended to limit the scope of the present disclosure. The driver terminal device 140 may be a mobile phone, a tablet computer, etc. The network environment 100 of the driver terminal device 140 may be a wireless network (e.g., Bluetooth® network, wireless local area network (WLAN), Wi-Fi, WiMax, etc.), a mobile network (e.g., 2G, 3G, 4G, etc.), or other communication methods (e.g., virtual private network (VPN), shared network, nearfield communication (NFC), ZigBee, etc.).

The information source 160 may be a source configured to provide other information to the system 105. For example, the information source 160 may provide the system with service information, such as weather conditions, traffic information, information of laws and regulations, news events, life information, life guide information, or the like. The information source 160 may be implemented using a single central server, multiple servers connected via a network, multiple personal devices, etc. When the information source is implemented using multiple personal devices, the personal devices can generate content (e.g., as referred to as the "user-generated content"), for example, by uploading text, voice, image and video to a cloud server. An information source may thus be generated by the multiple personal devices and the cloud server.

Taking a transportation service as an example, the information source 160 may include a municipal service system containing map information and city service information, a real-time traffic broadcasting system, a weather broadcasting system, a news network, a social network, or the like. The information source 160 may be a physical device, such as a common speed measuring device, a sensor, or an IOT (Internet of things) device, including a vehicle speedometer, a radar speedometer, a temperature and humidity sensor, etc. The information source 160 may be a source configured to obtain news, messages, real-time road information, or the like. For example, the information source 160 may be a network information source that includes an Internet news group based on Usenet, a server over the Internet, a weather information server, a road condition information server, a social network server, or the like, or any combination thereof. Taking food delivery service as an example, the information source 160 may be a system storing information of multiple food providers in a particular region, a municipal service system, a real-time traffic broadcasting system, a weather broadcasting system, a news network, a rules system storing laws and regulations of the district, a local social network system, or the like, or any combination thereof. The examples described herein are not intended to limit the scope of the information source or the type of services provided by the information source. Any device or network that can provide information of the services may be designated as an information source in the present disclosure.

In some embodiments, the on-demand service system 105 and different sections in the network environment 100 may be communicated based on orders. In the present disclosure, "service," "order," or "service order" may refer to a specific task or transaction that is performed or implemented by an individual or an entity for other individuals or entities. The subject matter of the order may be a product. In some embodiments, the product may be a tangible product or an intangible product. The tangible product may be any object with a shape or a size, including food, medicine, commodities, chemical products, electrical appliances, clothing, vehicles, house estates, luxuries, or the like, or any combination thereof. The intangible product may include service products, financial products, intellectual products, Internet products, or the like, or any combination thereof. The Internet products may include any product that satisfies the user's requirements on information, entertainment, communication, or business. There are many methods of classifying the Internet products. Taking the classification method based on host platform as an example, the Internet products may include personal host products, Web products, mobile Internet products, commercial host platform products, built-in products, or the like, or any combination thereof. The mobile Internet product may be a software, a program or a system used in mobile terminals. Herein, the mobile terminal may include but is not limited to a laptop computer, a tablet computer, a mobile phone, a personal digital assistant (PDA), an electronic watch, a POS machine, a carputer, a television, or the like, or any combination thereof. And the mobile Internet product may include various software or applications of social communication, shopping, travel, entertainment, learning, or investment used in the computer or the mobile phone. The travel software or application may be a trip software or application, a vehicle booking software or application, a map software or application, or the like. The vehicle booking software or application may be used to book horses, carriages, rickshaws (e.g., two-wheeled bicycles, three-wheeled bicycles, etc.), vehicles (e.g., taxis, buses, etc.), trains, subways, ships, aircrafts (e.g., planes, helicopters, space shuttles, rockets, hot air balloons, etc.), or the like, or any combination thereof.

FIG. 1-B is a schematic diagram of a network environment 100 according to another embodiment of the present disclosure. FIG. 1-B is similar to FIG. 1-A. In FIG. 1-B, the database 130 is independent, and may be directly connected to the network 150. The on-demand service system 105 or a part of the system 105 (e.g., the POI engine 110), and/or the user terminal devices 120 or 140 may directly access the database 130 via the network 150.

In FIGS. 1-A and/or FIG. 1-B, the database 130 and the on-demand service system 105, a part of the system 105 (e.g., the POI engine 110), and/or the user terminal device 120 or 140 may be connected in different ways. The access permission of each device to the database 130 may be limited. For example, the on-demand service system 105 or a part of the system 105 (e.g., the POI engine 110) may have the highest level of access permission, e.g., permission to read or modify public or personal information in the database 130. The passenger terminal device 120 or the driver terminal device 140 may be permitted to read some of the public information or the personal information relating to the users when certain conditions are satisfied. For example, the on-demand service system 105 may update or modify the public information or the user related information in the database 130, based on one or more experiences of a user (a passenger or a driver) using the on-demand service system 105. As another example, when receiving a service order from a passenger 120, a driver 140 may view some of the information of the passenger 120 in the database 130. However, the driver 140 may not modify the information of the passenger 120 in the database 130 on his/her own, but may only report the modification to the on-demand service system 105 so that the system 105 may determine whether to modify the information of the passenger 120 in the database 130 accordingly or not. As another example, when receiving a request of providing service from a driver 140, a passenger 120 may view some of the information (e.g., user rating information, driving experiences, etc.) of the driver 140 in the database 130, however, the passenger 120 may not modify the information of the driver 140 in the database 130 on his/her own, but may only report the modification to the on-demand service system 105 so that the system 105 may determine whether or not to modify the information of the driver 140 in the database 130 accordingly.

It should be noted that the above description of the service system based on a location is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart the spirit and scope of this disclosure. For example, the database 130 may be a cloud computing platform with data storing function that includes but is not limited to a public cloud, a private cloud, a community cloud, a hybrid cloud, etc. All such modifications are within the protection scope of the present disclosure.

FIG. 2 is a schematic system diagram of an on-demand service system 105 according to some embodiments of the present disclosure. For brevity, the on-demand service system 105 is not shown in the figure and the POI engine 110 is illustrated as an example. The POI engine 110 may include one or more processing modules 210, one or more storage modules 220, one or more passenger interfaces 230, and one or more driver interfaces 240. The POI engine 110 may be centralized or distributed. One or more modules of the POI engine 110 may be local or remote. In some embodiments, the POI engine 110 may be a web server, a file server, a database server, an FTP server, an application server, a proxy server, a mail server, or the like, or any combination thereof.

In some embodiments, the POI engine 110 may receive information from and/or send processed information to the passenger terminal device 120 through the passenger interface 230. In some embodiments, the POI engine 110 may receive information from and/or send processed information to the driver terminal device 140 through the driver interface 240. The method of sending or receiving the information may be direct. For example, information may be directly obtained from one or more passenger terminal devices 120 and/or one or more driver terminal devices 140 through the passenger interface 230 and/or the driver interface 240 via the network 150. As another example, information may be directly received from the information source 160. The method of sending or receiving the information may be indirect. For example, the processing module 210 may obtain information by sending a request to one or more information sources 160. The information in the information source 160 may include but is not limited to weather conditions, road conditions, traffic conditions, news events, social activities, or the like, or any combination thereof. The POI engine 110 may be configured to communicate with the database 130. In some embodiments, the order pushing engine may be configured to extract information such as map data, information of historical orders, information of an amount of time adjustment, etc. The information of historical orders may include departure locations of the historical orders, destinations of the historical orders, pickup times of the historical orders, a price of each of historical orders, or the like, or any combination thereof. The information of amount of time adjustment described above may include values of time adjustment for different geographic areas in different time periods. The POI engine 110 may be configured to send, to the database 130, information received from the passenger interface 230 and/or the driver interface 240. The processed result of the information obtained by the processing module 210 of the POI engine 110 may also be sent to the database 130.

In some embodiments, the processing module 210 may be configured to process related information. The processing module 210 may send the processed information to the passenger interface 230 and/or the driver interface 240. The methods of processing information may include but is not limited to storing, classifying, filtering, converting, calculating, retrieving, predicting, training, or the like, or any combination thereof. In some embodiments, the processing module 210 may include but is not limited to a central processing unit (CPU), an application specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, or the like, or any combination thereof.

In some embodiments, the passenger interface 230 and the driver interface 240 may receive information sent by the passenger terminal device 120 and the driver terminal device 140, respectively. The received information may be information about requests for service, information about a current location of a passenger or a driver, information about a text sent by a passenger terminal device 120 or a driver terminal device 140, or any other information sent by the passenger terminal device 120 or the driver terminal device 140 (e.g., uploaded information of images, video content, audio content, etc.). The received information may be stored in the storage module 220, calculated and processed by the processing module 210, or sent to the database 130.

In some embodiments, information received by the passenger interface 230 and the driver interface 240 may be sent to the processing module 210. The processing module 210 may then process the information to generate processed information. The information generated by the processing module 210 may be optimized information of the current location of the passenger and/or the driver, information related to a pickup location and/or a destination of the order. In some embodiments, the information generated by the processing module 210 may be confirmation information of the location of the passenger and/or the driver, such as whether the location of the passenger or the driver is abnormal. In some embodiments, the information generated by the processing module 210 may include travel methods, an order completion rate with respect to each travel method or a combination of multiple travel methods, or the like, or any combination thereof. The travel method may include a chauffeured car service, a hitchhiking, a taxi, a bus, a train, a bullet train, a high-speed rail, a subway, a ship, an airplane, or the like, or any combination thereof. In some embodiments, the processed information generated by the processing module 210 may be route-related information. The route-related information may include the number of routes, the departure location and destination of each route, the required time and fee for each route corresponding to different travel methods In some embodiments, the information generated by the processing module 210 may be sent to the passenger terminal device 120 and/or the driver terminal device 140 via the passenger interface 230 and/or the driver interface 240. In some embodiments, the information generated by the processing module 210 may be stored in the database 130, the storage module 220, or any other module or unit of the on-demand service system 105 that can store data.

In some embodiments, the database 130 may be configured in the background of the on-demand service system 105 (as shown in FIG. 1-A). In some embodiments, the database 130 may be a stand-alone device and may directly connect with the network 150 (as shown in FIG. 1-B). In some embodiments, the database 130 may be a part of the on-demand service system 105. In some embodiments, the database 130 may be a part of the POI engine 110. The database 130 may refer to any device that can store data. The database 130 may be used to store data collected from the user terminal device 120, user terminal device 140, or the information source 160. The database 130 can also store various data generated by the POI engine 110. The database 130 or other storage device in the system may refer to any media with a read/write function. The database 130 or other storage device in the system may be an internal device of the system 105 or an external device connected to the system 105. The connection between the database 130 and other storage device in the system may be wired or wireless. The database 130 or other storage device in the system may include but is not limited to a hierarchical database, a network database, a relational database, or the like, or any combination thereof.

The database 130 or other storage device of the system may digitize information, and then store the digitalized information in an electrical, magnetic or optical storage device. The database 130 or other storage device of the system may be configured to store various information, such as programs, data, or the like. The database 130 or other storage device of the system may be a device configured to store information in the form of electric energy, e.g., multiple memories, a random-access memory (RAM), a read-only memory (ROM), or the like. The random-access memory may include but is not limited to a dekatron, a selectron, a delay line memory, a Williams tube, a dynamic random access memory (DRAM), a static random access memory (SRAM), a thyristor random access memory (T-RAM), a zero-capacitor random memory (Z-RAM), or the like, or any combination thereof. The read-only memory may include but is not limited to a magnetic bubble memory, a magnetic button line memory, a thin film memory, a magnetic plated wire memory, a magnetic-core memory, a magnetic drum memory, a CD-ROM, a hard disk, a tape, an early non-volatile memory (NVRAM), a phase change memory, a magnetic resistance random access memory, a ferroelectric random access memory, a nonvolatile SRAM, a flash memory, an electronic erasable programmable read-only memory, an erasable programmable read-only memory, a programmable read-only memory, a mask ROM, a floating gate connected random access memory, a Nano-RAM, a race-track memory, a variable resistive memory, a programmable metallization memory, or the like, or any combination thereof. The database 130 or other storage device of the system may be a device configured to store information utilizing magnetic energy, such as a hard disk, a soft disk, a tape, a magnetic core storage, a magnetic bubble memory, a USB flash disk, a flash disk, or the like. The database 130 or other storage device of the system may be a device configured to store information by optical method, such as a compact disc (CD), a digital video disc (DVD), or the like. The database 130 or other storage device of the system may be a device configured to store information by magneto-optical method, e.g., magnetic disc, or the like. The method of accessing the database 130 or other storage device of the system 105 may include random access, serial access, read-only access, or the like, or any combination thereof. The database 130 or other storage device of the system may be a volatile memory or a nonvolatile memory. It should be noted that the above description of storage devices is provided for the purpose of illustration, and not intended to limit the scope of the present disclosure. The database 130 or other storage devices in the system 105 may be local or remote.

It should be noted that the processing module 210 and/or the database 130 may reside in the user terminal device 120 or 140, or implement corresponding functions via a cloud computing platform. Herein, the cloud computing platform may include but is not limited to a storage-based cloud platform mainly used for data storing, a calculation-based cloud platform mainly used for data processing, a hybrid cloud platform used for both data storing and processing, etc. The cloud platform used by the user terminal 120 or 140 may be a public cloud, a private cloud, a community cloud, a hybrid cloud, or the like. For example, some order information and/or non-order information received by the user terminal device 120 or 140 may be calculated and/or stored by the user cloud platform according to actual requirements. Other order information and/or non-order information may be calculated and/or stored by a local processing module and/or a system database.

It should be understood that the POI engine 110 illustrated in FIG. 2 may be implemented by a variety of methods. For example, the POI engine 110 may be implemented by a hardware, a software, or a combination of them. Herein, the hardware may be implemented by a dedicated logic. The software may be stored in the memory, and may be implemented by an appropriate instruction execution system (e.g., a microprocessor, a dedicated design hardware, etc.). It will be appreciated by those skilled in the art that the above methods and systems may be implemented by computer-executable instructions and/or embedding in control codes of a processor. For example, the control codes may be provided by a medium such as a disk, a CD or a DVD-ROM, a programmable memory device such as read-only memory (e.g., firmware), or a data carrier such as an optical or electric signal carrier. The POI engine 110 and its modules may not only be implemented by large scale integrated circuits or gate arrays, semiconductor devices (e.g., logic chips, transistors, hardware circuits of programmable hardware devices such as field programmable gate arrays, programmable logic devices, etc.) but may also be implemented by software executed in various types of processors, or a combination of the above hardware circuits and software (e.g., firmware).

It should be noted that the above description of the POI engine 110 is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart the spirit and scope of this disclosure. For example, the processing module 210, the storage module 220, the passenger interface 230, the driver interface 240, and the database 130 may be different modules in one system, or may be combined as a single module to perform the corresponding functions of two or more of the above modules. For example, the passenger interface 230 and the driver interface 240 may be combined as a single interface that can interact with the passenger terminal device 120 and the driver terminal device 140 at the same time. For example, the database 130 may be included in the POI engine 110, and all functions of the database 130 and the storage module 220 may be implemented by a single storage device. All such modifications are within the protection scope of the present disclosure.

Figure 3:
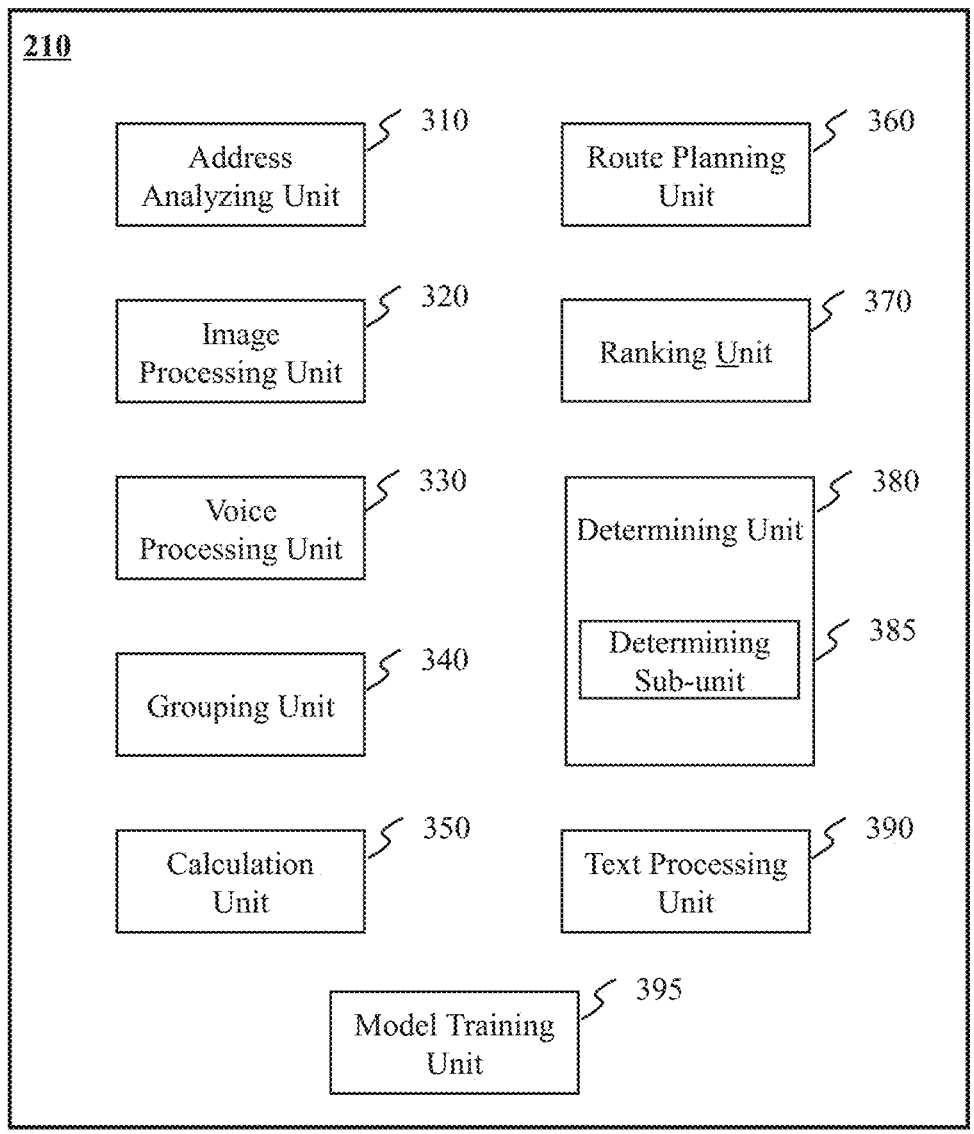
FIG. 3 is a schematic block diagram of a processing module of a POI engine according to some embodiments of the present disclosure.

FIG. 3 is a schematic diagram of the processing module 210 of the POI engine 110 according to some embodiments of the present disclosure. The processing module 210 may include an address analyzing unit 310, an image processing unit 320, a voice processing unit 330, a grouping unit 340, a calculation unit 350, a route planning unit 360, a ranking unit 370, a determining unit 380, a text processing unit 390 and/or a model training unit 395. The determining unit 380 may further include a calculation sub-unit 385. It should be noted that the above descriptions of the structure of the processing module 210 of the POI engine 110 are provided for illustration purposes, and not intended to limit the scope of the present disclosure. In some embodiments, the processing module 210 may also include other units. In some embodiments, some of the above units may be removed. In some embodiments, some of the above units may be combined into one unit to perform corresponding functions. In some embodiments, the above units may be independent. In some embodiments, the above units may be interconnected.

The address analyzing unit 310 may be configured to process received address information. The address information may be obtained from the passenger interface 230, the driver interface 240, the database 130, the information source 160, or other units or sub-units of the processing module 210. The methods of processing the address information may include analysis and/or reverse analysis of the address information. The reverse analysis of the address information may include converting one or more coordinates into text description information of a location corresponding to the coordinates. The analysis of the address information may refer to converting text description information of a location (e.g., a text description of the location) into address coordinate information. The address coordinate information may include one or more coordinates in a coordinate system, e.g. longitude-latitude coordinates. The text description information may be one or more of the iconic and representative names of a location, such as a common name, a street number, a name of a landmark of the location, etc. The address analyzing unit 310 may send processed address information to other units. The other units may include but are not limited to an image processing unit 320, a voice processing unit 330, a route planning unit 360, a ranking unit 370, a determining unit 370, a passenger interface 230, a driver interface 240, or the like, or any combination thereof.

The image processing unit 320 may be configured to process a received image (e.g. a still image, a video, etc.) to obtain processed information. The method of processing may include one or more image processing methods such as image enhancement, image identification, image segmentation, image measurement (e.g. calculation of angles of view, distances, or perspective relations), or the like. The image processing unit 320 may receive the image information from the passenger interface 230, the driver interface 240, the database 130, the information source 160, or one or more combinations of other units or sub-units of the processing module 210. The image information identified by the image processing unit 320 may be inputted to the address analyzing unit 310 to search corresponding address information. In some embodiments, the processed results generated by the image processing unit 320 may be sent to the route planning unit 360.

The voice processing unit 330 may be configured to process voice information received from the passenger terminal device 120 and/or the driver terminal device 140. The method of processing may include noise reduction, voice and/or speech recognition, semantic recognition, person recognition, or the like. The voice processing unit 330 may output the recognized audio information to other units for processing. For example, the voice processing unit 330 may send the recognized address information to the address analyzing unit 310, the route planning unit 360, or the like.

The grouping unit 340 may be configured to group received information. The number of the groups may be one, two, three, four, five, etc. In some embodiments, the information may be address information of the passenger and/or the driver, including a location coordinate and a location name. For example, the grouping unit 340 may group the current GPS coordinates of vehicles received from the driver interface 240 and determine the status of the vehicles based on the grouping result. The method of grouping may include one or more clustering algorithms such as K-MEANS algorithm, K-MEDOIDS algorithm, CLARANS algorithm, etc. In some embodiments, the grouping unit 340 may group the received information and output the grouped information. For example, the grouping unit 340 may group historical orders based on distances between the departure locations of the historical orders and the current location of the passenger, and frequencies of use of the locations in the orders (e.g., the number of historical orders that relate to a particular departure location and the current location) during a particular time period. The result generated by the grouping unit 340 may be further sent to other units or sub-units of the processing module 210 (e.g. the route planning unit 360). The processing module 210 may process the result. The result may also be sent to the passenger interface 230 and/or the driver interface 240. Then the result may be outputted by the passenger interface 230 and/or the driver interface 240.

According to some embodiments of the present disclosure, the clustering algorithms may include but are not limited to segmentation clustering algorithms, hierarchical clustering algorithms, constrained clustering algorithms, clustering algorithms of the machine learning, clustering algorithms used in high dimensional data, or the like, or any combination thereof.

The segmentation clustering algorithms may include but are not limited to density-based methods, grid-based methods, graph theory-based methods, and square error-based iterative redistribution clustering algorithms. The density-based methods may include but are not limited to Density-Based spatial Clustering of Applications with Noise (DBSCAN), Ordering Points to Identify the Clustering Structure (OPTICS), Density-based Clustering (DENCLUE), Clustering Using References Density (CURD), etc. The grid-based methods may include but are not limited to STatistical INformation Grid (STING), CLustering In QUEst (CLIQUE), WAVE-CLUSTER, etc. The square error-based iterative redistribution clustering algorithms may include but are not limited to probability-based clustering, nearest neighbor clustering, K-Medoids algorithm, K-Means algorithm, CLARANS algorithm, etc. The hierarchical clustering algorithms may include but are not limited to agglomerative clustering algorithm and divisive clustering algorithm. The CURE (Clustering Using REpresentatives) algorithm, ROCK (RObust Clustering using linKs) algorithm and CHAMELEON algorithm may be the most representative methods of the agglomerative clustering algorithm. The agglomerative clustering algorithms may also include but are not limited to Single-Link, Complete-Link and Average-Link. The clustering algorithms of the machine learning may include but are not limited to artificial neural network method and method based on theory of evolution. The method based on theory of evolution may include Simulated Annealing (SA) and Genetic Algorithms (GA). The clustering algorithms used in high dimensional data may include but are not limited to subspace clustering and joint clustering.

The calculation unit 350 may be configured to calculate received information. The information may be obtained from the passenger interface 230, the driver interface 240, the database 130, the information source 160 or other units or sub-units of the processing module 210 such as the address analyzing unit 310. The calculation contents may include a distance, time, an order completion rate, required fee, or the like, or any combination thereof. In some embodiments, the calculation unit 350 may calculate a probability of a historical travel route (e.g., a probability that a historical travel route is selected). In some embodiments, the calculation unit 350 may calculate probabilities of occurrence of departure locations and/or destinations of historical orders (e.g., probabilities that departure locations and/or destinations of historical orders are selected in the historical orders). In some embodiments, the calculation unit 350 may calculate distances between a current location of a passenger and the departure locations of the historical orders. In some embodiments, the calculation unit 350 may calculate an order completion rate and a required fee at a certain location when a certain travel method is selected. In some embodiments, the calculation unit 350 may calculate an order completion rate and a required fee at a certain time point when a certain travel method is selected. In some embodiments, the calculation unit 350 may calculate the distance, the required time, the required fee, the required walking distance, or the like, or any combination thereof, from the departure location to the destination of an order. The calculation unit 350 may send the calculated results to one or more other units such as the route planning unit 360, the ranking unit 370, etc.

The route planning unit 360 may calculate and plan a travel route for the passenger and a driving route from the driver to the passenger based on positioning information obtained from the passenger terminal device 120 and/or the driver terminal device 140. The route planning unit 360 may plan routes based on information provided by other units. Said other units may include an address analyzing unit 310, an image processing unit 320, a voice processing unit 330, a grouping unit 340, a calculation unit 350, a ranking unit 370, or the like, or any combination thereof. In some embodiments, the route planning unit 360 may plan routes based on information from the database 130 and/or the information source 160. In some embodiments, the route planning unit 360 may comprehensively analyze and process information of historical orders, map data, amounts of time adjustment received from the database 130 and information related to a service received from the information source 160. After analyzing and processing the information, the route planning unit 360 may generate various routes for the passenger and/or the driver to select. The historical orders may include pickup locations of the historical orders, destinations of the historical orders, transaction times of the historical orders (e.g. the time when the order is accepted by both the driver and the passenger), order completion rates, costs, or the like, or any combination thereof. The map data may include geographic coordinates of artificial objects (e.g., streets, bridges, buildings, etc.), geographic coordinates of natural landscapes (e.g., various water areas, mountains, forests, wetlands, etc.), and descriptive names or identifications (e.g. the number of a street, the name of a mansion, the name of a river, the name of a store, etc.), image information, three-dimensional models, or the like, of the objects described above. The information related to the service may include weather information, traffic information, information of laws and regulations, news events, life information, life guide information, or the like, or any combination thereof. Results generated by the route planning unit 360 (e.g. routes) may be sent to the passenger terminal device 120 and/or the driver terminal device 140 via the passenger interface 230 and/or the driver interface 240 respectively. In some embodiments, the results generated by the route planning unit 360 may be sent to the ranking unit 370 for processing to generate a result with a particular sequence, or a priority.

The ranking unit 370 may be configured to rank received information based on a particular rule. The particular rule may be based on a probability, a distance, a time sequence, an amount of required time, a required fee, the number of employed travel methods, or the like, or any combination thereof. The information processed by the ranking unit 370 may be obtained from the calculation unit 350. In some embodiments, the ranking unit 370 may rank alternative departure locations or destinations based on the number or probability of occurrences of the departure locations and/or the destinations of the historical orders and send the order to the passenger terminal device 120 and/or the driver terminal device 140 for selection based on the number of occurrences from high to low. In some embodiments, the ranking unit 370 may rank a travel method and/or a route based on a required fee. In some embodiments, the ranking unit 370 may rank the travel methods and/or the routes based on a required time. The result may be ranked in descending or ascending order. In some embodiments, the ranking unit 370 may output information relating to the ranking process. In some embodiments, the ranking unit 370 may output information relating to the ranking process that satisfies a preset condition. The preset condition may include a highest using frequency of a certain address, a lowest required fee, a least required time, a shortest walking distance, a smallest number of the travel methods, or any combination thereof.

The determining unit 380 may determine status of the passenger and/or the driver. In some embodiments, the determining unit 380 may determine accuracy and/or precision of the location information sent by the passenger terminal device 120 and/or the driver terminal device 140. In some embodiments, the determining unit 380 may determine the status of a vehicle, for example, whether the vehicle is stationary, whether the vehicle is moving, the moving direction of the vehicle, the speed of the vehicle, the acceleration of the vehicle, or the like, or any combination thereof. The determination of the status of the vehicle may be used to calculate the required fee of an order by the calculation unit 350. The calculation of the required fee may be performed by the calculation sub-unit 385 of the determining unit 380. In some embodiments, the determining unit 350 may determine a difference between the positioning result obtained by a first positioning technology and the positioning result obtained by a second positioning technology or multiple positioning technologies, wherein the positioning result may be received from the driver terminal device 140. The difference may be calculated by the calculation sub-unit 385. Whether the positioning information obtained by using the first positioning technology is abnormal may be determined based on the difference. Based on the determining result, the POI engine 110 may be configured to determine whether to send the order information to the driver terminal device 140.

The text processing unit 390 may be configured to process text information received by the processing module 210. In some embodiments, the text information may be processed by word segmentation, extracting characteristic text from text information, classifying the characteristic text, semantically recognizing the text information, or the like, or any combination thereof. In some embodiments, the text processing unit 340 may be configured to process (e.g. perform a deletion operation, etc.) the content of the text information that satisfies a particular condition. The text information may be obtained from the passenger interface 230, the driver interface 240, the database 130, the information source 160, the storage module 220 or other units or sub-units in the processing module 210. The result generated by the text processing unit 390 may be sent to other units for further processing.

The model training unit 395 may be configured to train a location classifier or a POI classification model. The model training unit 395 may receive information from the database 130, the information source 160, or other models or units of the on-demand service system 105, and use the received information to train the location classifier and/or the POI classification model. In some embodiments, the model training unit 395 may identify an address classification type of a location contained in address information or text address data. In some embodiments, the model training unit 395 may determine historical travel purposes or historical travel routes based on the historical order information of a user (e.g., a passenger). Then the service request of the passenger may be responded and an appropriate destination and/or departure location may be recommended to the passenger based on the historical travel purposes or the historical travel routes.

It should be noted that the above descriptions of the processing module 210 of the POI engine 110 are provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure and on the condition that above functions are realized. However, those variations and modifications may not depart the spirit and scope of this disclosure. For example, in some embodiments, the calculation unit 350 and the calculation sub-unit 385 may be integrated into one unit or module to perform the calculating functions. As another example, in some embodiments, the processing module 210 may include an independent accounting unit configured to calculate the required fee for closing an order. In some embodiments, some units may be omitted such as the text processing unit 390. In some embodiments, the processing module may include other units or sub-units. All other improvements and modifications recognized by a person with ordinary skill in the art are within the scope of protection of the present disclosure.

Figure 5:
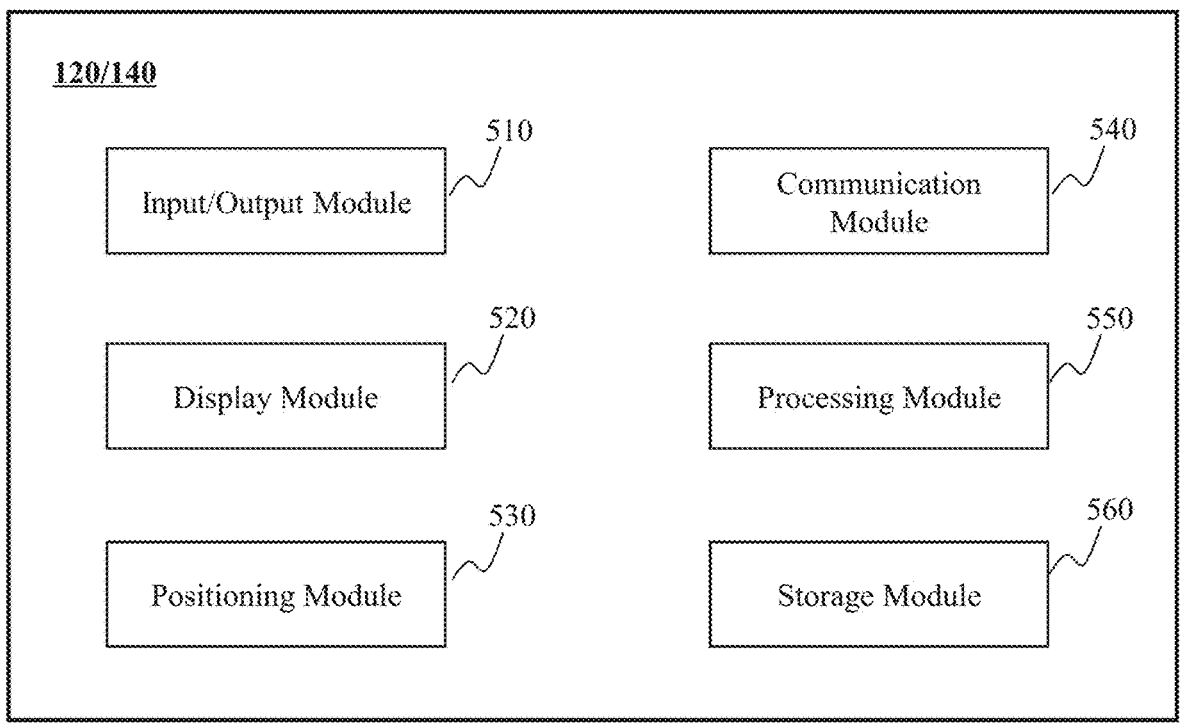
FIG. 5 is a schematic diagram of a user terminal device according to some embodiments of the present disclosure.

FIG. 4-A is a schematic block diagram of the passenger interface 230 of the POI engine 110 according to some embodiments of the present disclosure. The passenger interface 230 may include a passenger information receiving unit 410, a passenger information analyzing unit 420, and/or a passenger information sending unit 430. The passenger information receiving unit 410 may be configured to receive information from the passenger terminal device 120, and then may recognize, arrange and classify the information. The contents of the information sent by the passenger terminal device 120 may include the current location of the passenger terminal device 120 determined using a positioning technology, a current location or pick up location inputted by the passenger that is using the passenger terminal device 120, other information related to the current location of the passenger, the current system time, the passenger's expected pickup time/arrival time/travel time, the passenger's choice/requirement/description information for a service, the content/format/time/quantity of information that the passenger is expected to receive, the time when the passenger turns on/off the service application on the passenger terminal device 120, or the like, or any combination thereof. In some embodiments, the information sent by the passenger terminal device 120 may be text information in natural languages inputted by the passenger in the passenger terminal device 120, or binary information sent by the passenger terminal device 120. The information sent may be voice information (including voice inputs of the passenger) recorded in the input/output (I/O) module 510 of the passenger terminal device 120, image information (including still images or videos) obtained by the I/O module 510 of the passenger terminal device 120 (as shown in FIG. 5), or the like, or any combination thereof. The passenger terminal device 120 may provide the information to the passenger information receiving unit 410 of the passenger interface 230 via the network 150.

The passenger information analyzing unit 420 may be configured to analyze the passenger information received by the passenger information receiving unit 410. The analysis may include arranging or classifying the passenger information. The analysis may also include converting the format, or extracting, analyzing or converting the content of the passenger information to obtain a format that can be calculated, processed, or stored by the processing module 210 or the storage module 220. Based on instructions or preferences of the passenger terminal device 120, the passenger information analyzing unit 420 may also be configured to convert the information processed by the processing module 210 or stored in the storage module 220 into a format that can be accessed or selected by the passenger terminal device 120. Then the information may be provided to the passenger information sending unit 430. The passenger information sending unit 430 may be configured to send the information to the passenger terminal device 120 via the network 150, in which the information is that the POI engine 110 needs to send. The passenger information receiving unit 410 may be composed of a wired or wireless receiving device that establishes a connection with the passenger terminal device 120 via the network 150. Similarly, the passenger information sending unit 430 may be composed of a wired or wireless sending device that establishes a connection with the passenger terminal device 120 via the network 150.

FIG. 4-B is a schematic block diagram of the driver interface 240 of the POI engine 110 according to some embodiments of the present disclosure. As shown in FIG. 4-B, the driver interface 240 may include a driver information receiving unit 415, a driver information analyzing unit 425, and a driver information sending unit 435. The driver information receiving unit 410 may be configured to receive information from the driver terminal device 140, and then recognize, arrange and classify the information. The contents of information sent by the drive may include the current location of the driver determined using a positioning technology, the driving speed of the driver, the current service status (e.g., occupied, waiting for passengers, idle driving (e.g. driving without a passenger)) returned by the driver, the selection/confirmation/rejection information of the driver with respect to the service request, the information that the driver turns on/off the service application on the driver terminal device 120, or the like, or any combination thereof. The type of the information sent by the driver terminal device 140 may be text information in natural language inputted by the driver in the driver terminal device 140, binary information sent by the driver terminal device 140, audio information (including the driver's voice input) recorded by the driver terminal device 140, image information (e.g., still images or videos) obtained by the driver terminal device 140, other types of multimedia information, or the like, or any combination thereof. The driver terminal device 140 may send the information described above to the driver information receiving unit 415 of the driver interface 240 via the network 150.

The driver information analyzing unit 425 may be configured to analyze the driver information received by the driver information receiving unit 410. The analyzing operation herein may include arranging or classifying the driver information, converting the content into a format. The analyzing operation may also include extracting, analyzing or converting the content of the information to obtain the format. The format of the information described above may be calculated, processed, or stored by the processing module 210 or the storage module 220. Based on instructions or preferences of the driver terminal device 140, the driver information analyzing unit 425 may also be configured to convert the information processed by the processing module 210 or the information stored in the storage module 220 into an information format that can be accessed or selected by the driver terminal device 140. The driver information analyzing unit 425 may provide the format-converted information to the driver information sending unit 435. The driver information sending unit 435 may be configured to send the information to the driver terminal device 140 via the network 150, in which the information is that the POI engine 110 needs to send to the driver terminal device 140. The driver information receiving unit 415 may be composed of a wired or wireless receiving device that establishes a connection with the driver terminal device 140 via the network 150. Similarly, the driver information sending unit 430 may be composed of a wired or wireless sending device that establishes a connection with the driver terminal device 140 via the network 150.

FIG. 5 is a schematic block diagram of the passenger terminal device 120 and the driver terminal device 140 according to some embodiments of the present disclosure.

The passenger terminal device 120 may include an input/output (I/O) module 510, a display module 520, a positioning module 530, a communication module 540, a processing module 550, and a storage module 560. The passenger terminal device 120 may also include more modules or components.

The input/output module 510 may receive one or more types of inputs that the passenger provides to an on-demand service application's interface, such as an image interface, a map interface, or an input/output interface. The input/output module 510 may output the information to the passenger in one or more types. The input/output module 510 may collect and record one or more types of information such as optics, acoustics, electromagnetics, mechanics, etc. of the passenger or the outside (e.g., the surrounding environment) in the form of still images, videos, voices, mechanical vibrations, etc., by a method such as signal conversion. The input and/or output may be in the form of acoustical signals, optical signals, mechanical vibration signals, or the like, or any combination thereof. The display module 520 may display the image interface, the map interface, the input/output operating interface, the operating system interface, or the like, of the on-demand service application. The positioning module 530 may determine the location or motion status of the passenger based on one or more positioning/distance measuring technologies. More particularly, for example, the determination of the location or motion status of the passenger may include calculating one or more motion parameters such as, the location, the speed, the acceleration, the angular speed, the route, or the like, or any combination thereof, of the passenger. The communication module 540 may send or receive the information of the passenger terminal device 120 by a wired or a wireless communication. For example, the communication module 540 may communicate with the passenger interface 230 of the POI engine 110, so that the passenger terminal device 120 may send information to the POI engine 110 or receive information from the POI engine 110 via the passenger interface 230. In some embodiments, the passenger terminal device 120 may communicate with the driver terminal device 140 via the communication module 540. For example, the passenger terminal device 120 and the driver terminal device 140 may communicate with each other through Bluetooth® communication and/or infrared communication. A distance between the driver terminal device 140 and the passenger terminal device 120 may be directly measured when the Bluetooth® of both devices are turned on. The processing module 550 may calculate, determine, or process the information obtained by the passenger terminal device 120. The storage module 560 may store the information that is obtained, generated, calculated, determined, or processed by the input/output module 510, the positioning module 530, the communication module 540, or the processing module 550.

The positioning technology may include but is not limited to Global Position System (GPS) technology, Global Navigation Satellite System (GLONASS) technology, Beidou Navigation System technology, Galileo Positioning System (Galileo) technology, Quasi-Zenith Satellite System (QASS) technology, base station positioning technology, and Wi-Fi positioning technology. The distance measuring technology may include but is not limited to a distance measuring technology based on electromagnetic waves, acoustic waves, or the like, or any combination thereof. For example, the distance measuring technology based on electromagnetic waves may utilize radio waves, infrared rays, visible lights, or the like, or any combination thereof. The distance measuring technology based on radio waves may utilize Bluetooth® band, or other microwave bands. The distance measuring technology based on infrared rays may utilize near-infrared rays, mid-infrared rays, far-infrared rays, or the like, or any combination thereof. The distance measuring technology based on acoustic waves may utilize ultrasonic waves, infrasonic waves, acoustic waves at other frequencies, or the like, or any combination thereof. The distance measuring technology based on electromagnetic waves or acoustic waves may measure the distance according to one or more principles. For example, the distance measuring technology based on electromagnetic waves or acoustic waves may rely on the time of wave propagation, the Doppler effect, an intensity of a signal, signal attenuation characteristics, or the like, or any combination thereof.

The above description of the passenger terminal device 120 is also applicable to the driver terminal device 140.

It should be noted that the above description of the service system based on the user terminal device 120 or 140 is provided for the purpose of illustration, and not intended to limit the scope of the present disclosure. For persons having ordinary skills in the art, modules may be combined in various ways, or connected with other modules as subsystems. Various variations and modifications may be conducted under the teaching of the present disclosure. However, those variations and modifications may not depart the spirit and scope of this disclosure. For example, the input/output module 510 and the display module 520 may be different modules in a system, or a single module capable of achieving functions of both modules. As another example, the positioning module 530 and the communication module 540 may be different modules, or a single module integrated in a hardware. All such modifications are within the protection scope of the present disclosure.

Figure 6:
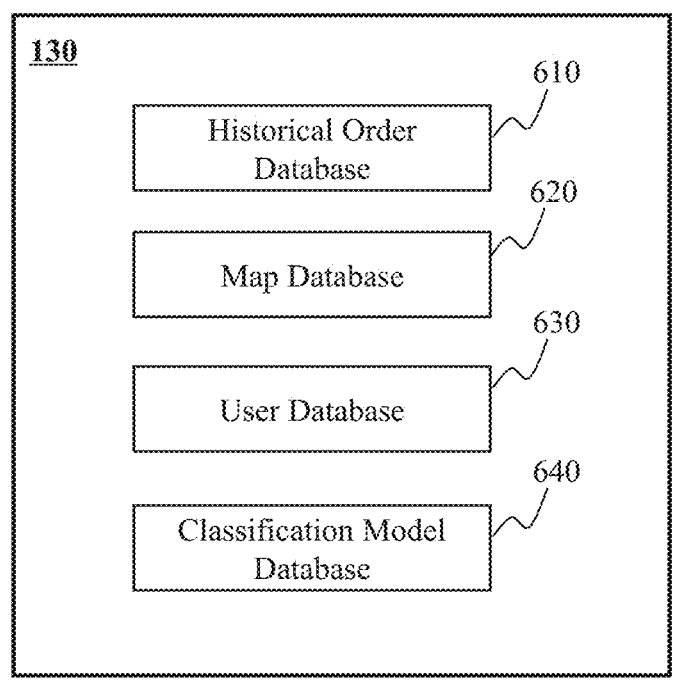
FIG. 6 is a schematic block diagram of a database according to some embodiments of the present disclosure.

FIG. 6 is a schematic block diagram of the database 130 according to some embodiments of the present disclosure. The database 130 may store information of multiple contents. The database 130 may include one or more sub-databases, such as historical order databases 610, map databases 620, user databases 630, classification model databases 640, etc. In some embodiments in which one or more kinds of information are required by the POI engine 110 or other modules/units, the information may be extracted from the database 130.

The historical order database 610 may include historical orders of which the content may relate to departure locations, destinations, types of the departure locations, types of the destinations, departure location time/arrival time, pickup locations of the passenger and the driver, travel mileage, travel routes, a fare of the order service, tips of the order service, a mileage rate of the order service, time-based fare of the order service, driving time, etc. The contents of the historical order may also relate to locations of the passenger/driver and driving speed at different time points during the service, average driving speed, the ratings of the passenger and/or the driver to the historical orders, or the like.

The map database 620 may include geographic coordinates of artificial objects such as streets, bridges, buildings, or the like. The map database 620 may include geographic coordinates of natural landscapes such as water areas, mountains, forests, wetlands, or the like. The map database 620 may include descriptive names, identifications, or the like (e.g., the number of a street, building names, river names, shop names, etc.). The map database 620 may include image information of the artificial objects and the natural landscapes described above.

The information stored in the user database 630 may include service-related information of the user 120/140, such as account names, displayed names (e.g., nicknames), documentation numbers (e.g., a driver license, an ID card, etc.), a registration date, a user level/priority, traffic violation records, drunken driving records (e.g., driving while intoxicated), and vehicle information of the driver 140, etc. The user database 630 may also store other social information of the user 120/140, such as credit records, criminal records, honors or reward records, etc. The user database 630 may also store the profile information of the user 120/140, such as age, gender, nationality, address, work place, ethnicity, religious belief, educational attainment, work experience, marital status, emotional states, language proficiencies, professional skills, political tendencies, hobbies, favorite music/TV programs/movies/books, etc.

The classification model database 640 may be configured to store information of location types related to locations, information of mapping relationship between a location type and a descriptive name of the location type and the, correlation information between different location types, etc. For example, the correlation information may include a correlation coefficient between a particular location type and the descriptive name of the location type, a correlation coefficient between two location types, a set relationship between two location types, or the like. A location type may be considered as a set of locations, including at least one location belonging to this location type. A certain location type may also include other location types as its sub-types. There may be intersecting and overlapping parts between two location types (e.g., a certain location may belong to one or more location types at the same time). The location type can be a Cantor set or a fuzzy set. Each location type may have a distinct definition or "boundary." Alternatively, the location types may have no distinct "boundaries." For a location type that is a fuzzy set, each element in the set may have a membership degree that represents its probability of belonging to this location type. The membership degree may be less than or equal to 1. The information described above may be stored in different modules or components of a database 130. The information described above may also be stored separately in multiple databases 130. The multiple databases 130 may exchange information with each other via a wired or a wireless communication.

Figure 7:
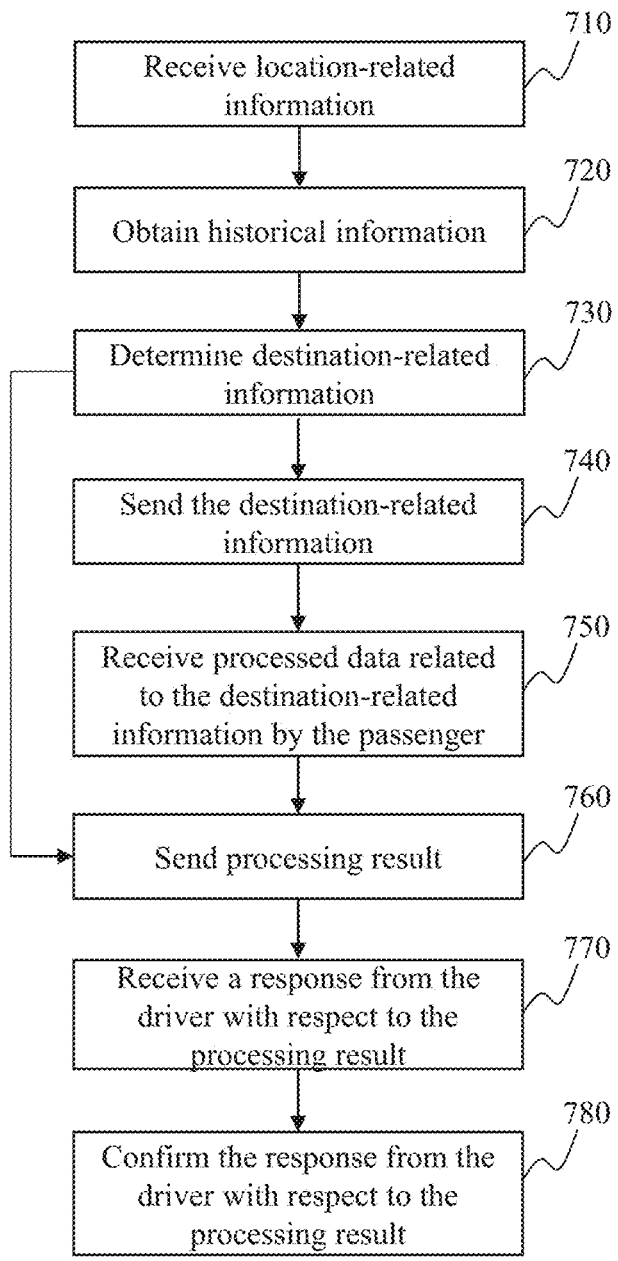
FIG. 7 is a flow chart of an example of a process of determining destination-related information according to some embodiments of the present disclosure.

FIG. 7 is a flow chart of an exemplary process of determining destination-related information by the system 105 according to some embodiments of the present disclosure. It should be noted that in some embodiments, the destination-related information can include location of a destination, a type of the destination, a time when a passenger arrives at the destination, a route from a departure location to the destination, an average speed from the departure location to the destination, an employed travel method from the departure location to the destination, a required fee from the departure location to the destination, or the like, or any combination thereof. The destination-related information may relate to a destination, or multiple destinations.

As shown in FIG. 7, in step 710, the passenger interface 230 of the POI engine 110 of the system 105 may receive location-related information from the passenger terminal device 120 via the network 150. The location-related information may include but is not limited to a current location of a passenger, a location of the passenger at a future time point, a location of the passenger during a future time period, a departure location designated by a passenger, a current time, a departure time designated by a passenger, or the like.

The current location of the passenger may be collected by the positioning module 530 of the passenger terminal device 120, or obtained from the I/O module 510. Information related to the current location of the passenger may be one or more coordinates of the location of the passenger determined by one or more positioning technologies. Information related to the current location of the passenger may also include a descriptive name of the current location inputted by the passenger. In some embodiments, information related to the current location may also include other information related to areas around the current location of the passenger and/or the current location of the driver, such as business areas, residential areas, sceneries, hospitals, schools, big buildings, bus stations, train stations, airports, bridges, crossroads, or the like, or any combination thereof. In some embodiments, the location-related information described above sent by the passenger terminal device 120 and/or the driver terminal device 140 may also include other information about surrounding areas of the current location of the passenger in the form of pictures, videos, audios, etc. The pictures, videos, and audios described above may be obtained by the I/O module 510 (as shown in FIG. 5). For example, a passenger can use his or her mobile phone camera to take photos of landmarks around him or her and upload the photos to the POI engine 110. As another example, the passenger terminal device 120 may obtain a voice or a video of the passenger's surrounding areas and send the voice or video to the POI engine 110.

The departure location designated by the passenger may refer to a departure location designated by the passenger (or other users of the passenger terminal device 120) on the passenger terminal device 120. In some embodiments, a passenger (or other users of the passenger terminal device 120) may input or select a departure location on an input box, a list, an icon array, etc. that is provided by the I/O module 510 of the device 120. In some embodiments, the passenger may also designate a departure location on a map interface that is displayed on the passenger terminal device 120 by the display module 520 by operating a pointer, a pushpin, etc. In some embodiments, the passenger may also provide the information of the departure location for the passenger terminal device 120 by a voice input.

The current time may be a system time of an operating system of the passenger terminal device 120 obtained by the processing module 550 of the passenger terminal device 120. The departure time designated by the passenger may be inputted via the I/O module 510 of the passenger terminal device 120. The designated departure time may be a specific time point or a time range. The length, and the starting and ending points of the time range may vary with application scenarios, the passenger's current requirements and/or traffic conditions.

In step 720, the POI engine 110 may obtain historical information from the database 130. The structure and function of the database 130 is shown in FIG. 6 and described in the corresponding description of FIG. 6. The historical information may include information relating to historical orders stored in the historical order database 610. The historical information may also include map information stored in the map database 620. The historical information may also include information stored in the user database 630, such as service-related information of users, other social information, profile information, etc. The description of the information described above may be found in FIG. 6, and is not repeated here.

It should be noted that, although step 720 is numbered after step 710, the numbers do not imply or represent any chronological order, but merely serve as an illustration for brevity. Step 720 described above may be performed in parallel with step 710 or prior to step 710.

In step 730, the processing module 210 of the POI engine 110 may determine the destination-related information based on received location-related information and obtained historical information.

The processing module 210 of the POI engine 110 may predict locations/descriptive names/location types of destinations that passengers expect to arrive at based on the historical information and the location-related information. The processing module 210 may also plan at least one route from a departure location to a destination based on the departure location and the destination. The processing module 210 may also estimate the route-related information based on a route planning algorithm. The route-related information may include but is not limited to a travel distance, a travel time, a time point of arriving at the destination, a time delay caused by traffic congestions, a fuel consumption, a driving speed, the number of traffic lights, a travel cost, a toll or the like.

In some embodiments, the route planning unit 360 of the processing module 210 may calculate and determine the route from a departure location to a destination based on one or more route optimization algorithms.

A criterion of determining the route may relate to an optimal total cost. The total cost may be represented in different forms including for example, a route distance, a travel time, an estimated time delay caused by traffic congestions, an estimated fuel consumption, an estimated driving speed, the number of traffic lights, an estimated cost, a toll, or the like, or any combination thereof. The form of the total cost may be based on one or more forms described above.

The route optimization algorithms described above may include but are not limited to traditional route planning algorithms, graphics algorithms, intelligent bionic algorithms, and other algorithms. Traditional route arranging algorithms may include but are not limited to simulated annealing (SA), artificial potential method, fuzzy logic arithmetic, Tabu Search (TS), etc. Graphic algorithms may include but are not limited to C-Space (also known as Visible-Space), Free-Space, Grid, etc. Intelligent bionic algorithms may include but are not limited to ant colony algorithm, neural network algorithm, genetic algorithms (GA), particle swarm optimization (PSO) algorithm, etc. Other algorithms may include but are not limited to Dijkstra algorithm, Shortest Path faster algorithm (SPFA), Bellman-Ford algorithm, Johnson algorithm, Fallback algorithm, Floyd-Warshall algorithm, etc.

Based on routes determined by the algorithm described above, the calculating module 350 may calculate and process the routes to obtain the route-related information. The description of details of the route-related information may be found in above description, and is not repeated here.

The calculating module 350 may calculate the route-related information described above based on information obtained from the database 130 and/or the information source 160. The obtained information may include but is not limited to information of historical orders from the historical order database 610, map data from the map database 620, information from other sources 160 about weather conditions, calendars, holidays, social activities, laws and regulations, or the like, or any combination thereof. The description of the information described above may be found in FIGS. 1-A and 6, and is not repeated here.

In step 740, after determining the destination-related information via the network interface 150, the POI engine 110 may transmit the destination-related information to the passenger terminal device 120 through the passenger interface 230. Then the destination-related information may be displayed and subsequently processed by the passenger terminal device 120. The transmitted destination-related information may be the destination itself, the route from the current location of the passenger terminal device 120 or the departure location designated by the passenger to the destination, or the route-related information described above.

In some embodiments, the transmitted destination-related information may relate to a destination or multiple destinations. In some embodiments, the destination-related information relating to multiple destinations may be represented in the form of a list. More particularly, in some embodiments, the ranking unit 370 of the processing module 210 may rank the multiple destinations. The criteria of ranking may be based on the route-related information described above, such as an estimated route distance, an estimated travel time, an estimated fuel consumption, an estimated fee, or the like, or any combination thereof. The ranking unit 370 may rank the multiple destinations in ascending or descending order based on the route-related information mentioned above.

In step 750, the POI engine 110 may receive processed data related to the destination-related information by the passenger of the passenger terminal device 120 through the passenger interface 230 via the network module 150. The processed data related to the destination-related information by the passenger may include confirming, rejecting, selecting, adding, modifying the destination-related information, or the like, or any combination thereof.

Alternatively, after receiving a processing by a passenger, the processing module 210 of the POI engine 110 may analyze and calculate the processing to obtain a processing result. The processing result may correspond to a destination designated by the passenger, or a route corresponding to a destination and/or destination-related information.

In step 760, the driver interface 240 of the POI engine 110 may send the processing result to at least one driver terminal device 140 via the network 150. In step 770, the driver interface 240 of the POI engine 110 may receive a response from a driver of the driver terminal device 140 with respect to the processing result. Contents of the response may include the driver's willingness/unwillingness to provide a transportation service for the passenger, additional conditions of providing the transportation service for the passenger, information of the current location, or the like, or any combination thereof. In step 780, the POI engine 110 may process the driver's response described above to confirm the response. In some embodiments, the passenger interface 230 of the POI engine 110 may send information indicative of the driver's willingness to provide a transportation service, additional conditions, and information of the current location to the passenger terminal device 120 after the driver confirms to provide the transportation service for the passenger. The passenger interface 230 may also send other information of the driver to the passenger terminal device 120. Examples of such information may include service-related information of the driver, other social information, profile information, or the like, or any combination thereof.

It should be noted that the description of determining the destination-related information by the POI engine 110 is provided for the purposes of illustration, and is not intended to limit the scope of the present disclosure. For persons having ordinary skills in the art, steps may be combined in various ways, and various variations and modifications may be conducted to achieve functions described above under the teaching of the present disclosure. However, those variations and modifications may not depart the spirit and scope of this disclosure. One or more of steps 710-780 may be omitted or removed, and a new step may be inserted into the steps described above. For example, after step 780, the POI engine 110 may receive a transaction report from the passenger terminal device 120 and/or the driver terminal device 140 through the passenger interface 230 and/or the driver interface 240. As another example, in some embodiments, after determining the destination-related information of the passenger, the POI engine may directly send the information to the driver terminal device 140, i.e., step 740 and 750 are omitted and the driver is informed of the predicted departure location and destination of the passenger in advance. All such modifications are within the protection scope of the present application.

Figure 8:
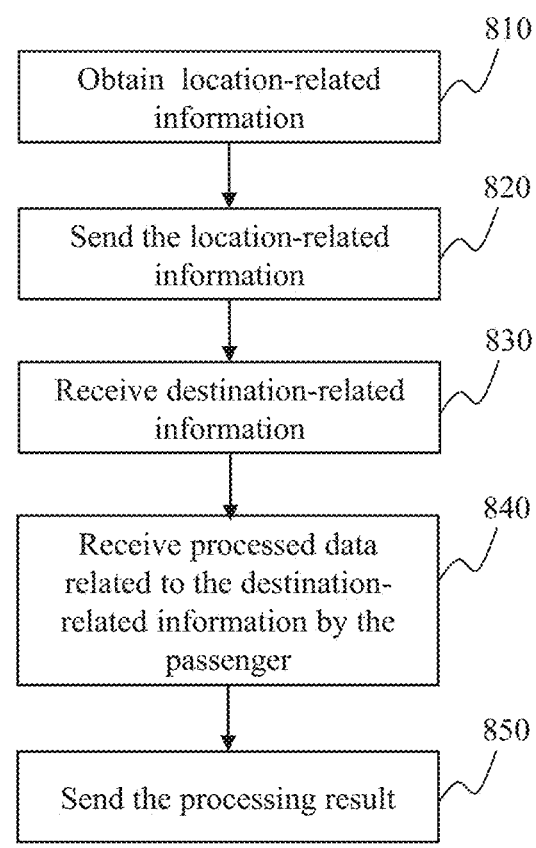
FIG. 8 is a flow chart of an example of a process of receiving destination-related information device by a passenger terminal according to some embodiments of the present disclosure.

FIG. 8 is a flow chart of an exemplary process of receiving destination-related information device by the passenger terminal device 120 according to some embodiments of the present disclosure.

In step 810, the passenger terminal device 120 may obtain location-related information by the positioning module 530 and/or the I/O module 510.

In step 820, the passenger terminal device 120 may send the obtained location-related information to the on-demand service system 105, other passenger terminal devices 120, and/or one or more driver terminal devices 140 through the communication module 540 via the network 150.

In some embodiments, the passenger terminal device 120 may send the location-related information to the on-demand service system 105. The POI engine 110 may process the location-related information. The POI engine 110 may generate the destination-related information based on the location-related information.

After step 820, the passenger terminal device 120 may receive the destination-related information obtained from the system 105 by the communication module 540 in step 830. The destination-related information may be found in FIG. 7 and corresponding description, and will not be further described.

In some embodiments, destination-related information received by the passenger terminal device 120 may relate to multiple destinations. The information relating to multiple destinations may be further represented or presented in the form of a list.

After step 830, the passenger terminal device 120 may display the received information by the display module 520. The information may be displayed in a text form or a Hypertext form. In some embodiments, the destination-related information may further be displayed or represented in a hypertext marking language (HTML). In some embodiments, the destination-related information may be displayed in a map interface.

In step 840, the I/O module 510 of the passenger terminal device 120 may receive processed data related to the destination-related information by the passenger.

After receiving the process data related to the destination-related information by the passenger, the communication module 540 of the passenger terminal device 120 may send the processing result in step 850. The processing result may be sent to the on-demand service system 105, other passenger terminal devices 120, or one or more driver terminal devices 140.

After step 850, the passenger terminal device 120 may receive information from any other device. The information may be obtained from the system 105, other passenger terminal devices 120, or one or more driver terminal devices 140. The information obtained from the system 105 may include but is not limited to a receipt of receiving the processing by the passenger, a processing result of the destination based on the processing by the passenger, a notification of sending the information to one or more driver terminal devices 140 by the system 105, responses to the destination-related result from one or more driver terminal devices 140, etc.

The description of process or steps of obtaining the destination-related information by the passenger terminal device 120 is provided for the purposes of illustration, and is not intended to limit the scope of the present disclosure. For persons having ordinary skills in the art, steps may be combined in various ways. Various variations and modifications may be conducted under the teaching of the present disclosure. However, those variations and modifications may not depart the spirit and scope of this disclosure. For example, in some embodiments, step 840 and step 850 may be omitted after the passenger terminal device 120 receives the destination-related information. All such modifications are within the protection scope of the present disclosure.

FIG. 9-A is a flow chart of an example of a process of predicting current destination-related information according to some embodiments of the present disclosure.

In step 910, the POI engine 110 may obtain information of a current departure location and information of a departure time from a passenger terminal device 120 through the passenger interface 230.

In step 920, the POI engine 110 may obtain information of historical orders relating to the passenger terminal device 120 from a database 130.

The POI engine 110 may obtain information of historical orders relating to the passenger terminal device 120 and/or information of one or more historical orders during a time period. The time period may vary based on factors such as account information of the user that relates to the passenger terminal device 120, a frequency of use of the historical orders of the user, an area that the order relates to, a current traffic condition, etc. The time period may be preset, and the length of the period may be arbitrary. For example, the period may include but is not limited to 1 month, 3 months, 6 months, 1 year or any other value.

The POI engine 110 may obtain information of historical orders relating to the passenger terminal device 120, or information of one or more historical orders in surrounding areas of the current location relating to the passenger terminal device 120. The surrounding area of the current location may be an area that a distance between the current location and any location in this area is less than a threshold. The threshold may be 1 kilometer, 2 kilometers, 5 kilometers, 10 kilometers, or any other value. The surrounding areas of the current location may include a specific area. The threshold may vary based on factors such as account information of the user relating to the passenger terminal device 120, a location of the passenger terminal device 120, a current status of the transportation service, etc. The specific area may be an administrative division, a business area, a public area, or a residential area, of any size. The specific area may be any other area that is delimited by people. The specific area may also be a physical geographic area without distinct boundaries (e.g., a geographic area delimited based on landform, climate, distributions of plants or animals, etc.). The specific area may be delimited based on rivers and/or mountains, etc.

Information of the historical orders may include information of a departure location, a departure time, information of a destination, an arriving time, a driving time, an average speed, or the like, or any combination thereof.

In step 930, the POI engine 110 may generate information of one or more candidate destinations based on the information of the current departure location, the information of the departure time, and the information of historical orders relating to the passenger terminal device 120. The calculation unit 350 of the processing module 210 may predict the destination information based on information of historical departure locations. The prediction may be evaluated based on a degree of correlation between the current departure location and the departure locations of the historical orders.

According to some embodiments of the present disclosure, when the departure location of historical orders is close to the current departure location of the passenger, the degree of correlation between the current order and the historical orders may be higher. According to some embodiments, when the departure time of historical orders is close to the current departure time of the passenger, the degree of correlation between the current order and the historical orders may be higher. The proximity between the departure times of historical orders and the current departure time of the passenger may refer to that the departure times of historical orders and the current departure time are in the same or similar years, months, days, status of forenoon/afternoon, hours and/or minutes.

According to some embodiments of the present disclosure, when departure times of historical orders and a current departure time of a passenger have a certain periodical rule, the degree of correlation between the current order and the historical orders may be higher. The periodical rule may refer to that the current order and the historical orders have a certain repeatability or similarity and have a time interval in between. The time period may be an integral multiple of a unit time length, such as a year, a month, a day, etc.

The calculation unit 350 of the processing module 210 may estimate a degree of correlation between a current order and a historical order by calculating a score index. According to some embodiments of the present disclosure, a score of each historical destination corresponding to a historical departure location may be obtained by a big data calculation. In some embodiments, the score of the historical destination corresponding to each historical departure location may be calculated as:

$$\text{Score (time, source, } POI_i) = \frac{1}{\sqrt{d+1}} \max\left\{\left(2 - \frac{s}{86400}\right), 1\right\} \times \frac{1}{1.2^h} \times f(POI_i.\text{source, source}), \quad (1)$$

wherein the parameter time may denote a current departure time, the parameter source is a current departure location, the parameter $POI_i$ may denote a historical data item (e.g., a historical departure location, a historical destination, a historical departure time, etc.), and d may denote the number of days between the current departure time and the historical data $POI_i$ (also referred to as the "intermediate days"). In some embodiments, historical data with a smaller number of intermediate days may have a higher value of reference. The parameter s may denote the number of intermediate seconds between the current departure time and the historical data $POI_i$. In some embodiments, for a short-term destination within 1 day, a smaller number of intermediate seconds may indicate a higher score. The parameter h may denote the number of intermediate hours between the current departure time and the historical data $POI_i$, and historical data with a smaller number of the intermediate hours may have a higher value of reference. The parameter $POI_i$.source may denote a historical departure location in the historical data $POI_i$. $f(x,y)$ may denote a degree of correlation between the current departure location and the historical departure location. In some embodiments, if a distance between a current departure location and a historical departure location in the historical data $POI_i$ is less than a threshold, or a current departure location is identical to a historical departure location, $f(x,y)=1$. In some embodiments, if a distance is greater than a threshold, or a current departure location is different from a historical departure location, $f(x,y)$ may be a decimal between 0 and 1. For example, $f(x,y)$ may be a decimal such as 0.1, 0.2, 0.3, or the like. The threshold of the distance may be a preset value such as 50 meters, 100 meters, 200 meters, 500 meters, or the like. After obtaining the scores of the historical destinations based on Equation 1, the ranking unit 370 of the processing module 210 may rank the historical destinations and identify a historical destination with the highest score.

According to some embodiments, if a score of a historical destination with the highest score is greater than a particular first threshold, the historical destination with the highest score may be further processed to determine if the historical destination may be designated as a default destination. The processing may be performed by the calculation unit 350. For example, the score of the historical destination with the highest score may be further compared with scores of other historical destinations. More particularly, for example, a ratio of the score of the historical destination with the highest score to total score of multiple historical destinations may be calculated. If the ratio is greater than a second threshold, the historical destination with the highest score may be designated as the default destination.

According to some embodiments of the present disclosure, if a certain passenger has information of three historical travels, and the score of the first travel to destination A is 2, the score of the second travel to A is 1.5, and the score of the third travel to B is 1, then the score of historical destination A is 3.5, and the score of historical destination B is 1. The first threshold may be set as 2, the second threshold may be set as 0.75. The determining unit 380 of the processing module 210 may compare the score of the historical destination A with the first threshold, and if the score of the historical destination A is greater than the first threshold, the determining unit 380 may then determine whether the ratio of the score of the historical destination A (3.5) to the total score (4.5) of the historical destination A and the score of historical destination B is greater than the second threshold. If the ratio (3.5/4.5) is greater than the second threshold, the historical destination A may be designated as a predicted destination (or referred to as a default destination). The first threshold and the second threshold may be set as required.

It should be noted that the description described above of determining the default destination is provided for the purposes of illustration, and is not intended to limit the scope of the present disclosure. It is understood that the processing module 210 may determine multiple default destinations based on the scores of the historical destinations, rather than just designate the historical destination with the highest score as one default destination. The processing module 210 may rank the default destinations after determining multiple default destinations. Based on the scores of the historical destinations, the historical destinations may be ranked in ascending order or descending order of the scores. It should be noted that the purpose of setting the first threshold and the second threshold in the process of determining the predicted destination is to ensure the accuracy of the predicted destination of the passenger. The predicted destination may be sent to the passenger only if the accuracy of the destination is high enough.

After obtaining one or more candidate destinations (i.e., the predicted/default destinations described above), the address analyzing unit 310 of the processing module 210 may further include analysis and/or reverse analysis of the information of the candidate destinations (i.e., converting the candidate destinations represented by geographic coordinates into descriptive names, or converting the candidate destinations expressed by descriptive names into geographic coordinates). The sent information of the candidate destination may be expressed by the descriptive name, the geographic coordinates, and/or both of them.

After generating the information of the candidate destinations, the POI engine 110 may send the information of the candidate destinations to the passenger terminal device 120 via the network 150 through the passenger interface 230 in step 940. In some embodiments, the POI engine 110 may send information of the candidate destinations to one or more driver terminal devices 140 through the driver interface 240.

In step 950, the POI engine 110 may receive processed data related to the information of the candidate destinations by the passenger terminal device 120 through the passenger interface 230.

After step 950, the POI engine 110 may analyze and calculate the processed data described above to generate a processing result. After the processing result is generated, the POI engine 110 may perform some subsequent operations. The description of details of generating the processing result and the subsequent operations can be found in FIG. 7, and is not repeated here.

It should be noted that the description of the process or steps about predicting information of the destination based on information of historical orders, current departure location and departure time of a passenger is provided for the purposes of illustration, and is not intended to limit the scope of the present disclosure. For persons having ordinary skills in the art, modules may be combined in various ways, or connected with other modules such as sub-systems, and various variations and modifications may be conducted under the teaching of the present disclosure. For example, in some embodiments, steps 940 and 950 may be omitted after the POI engine 110 sends the destination-related information. As another example, the POI engine 110 may use other relevant information obtained from the passenger terminal device 120 or the information source 160 to collectively determine information of candidate destinations. The relevant information may include but is not limited to location information of the passenger terminal device 120 in a historical time period, other information obtained by the passenger terminal device 120 (e.g. physiological information such as a heartbeat, a pulse, a blood pressure and social information such as activities in social networking, dating with friends), weather information, current social activities, information of the holidays, laws and regulations information, etc. All such modifications are within the protection scope of the present disclosure.

FIG. 9-B is a flow chart of an example of a process of receiving and processing destination-related information by the passenger terminal device 120 according to some embodiments of the present disclosure.

In step 915, the passenger terminal device 120 may obtain current information of a current departure location and a current departure time.

According to some embodiments of the disclosure, the current departure location may relate to a current location, or a departure location set or designated by the passenger.

When the current departure location is a current location, the current departure location may be determined by the communication module 540 of the passenger terminal device 120 based on one or more positioning technologies, or by the I/O module 510 of the passenger terminal device 120 that receives the input order from the passenger.

According to some embodiments of the present disclosure, the communication module 540 may determine a precise current location based on two or more positioning technologies. For example, the communication module 540 may obtain GPS positioning information and positioning information of the base station by communicating with the base station and the GPS satellites. The processing module 550 may further process the GPS positioning information and positioning information of the base station to obtain a precise current location. The processing module 550 may take the current location as the current departure location.

When the current departure location is a location set or designated by the passenger on the passenger terminal device 120, the current departure location may be the location inputted or selected by the passenger.

According to some embodiments of the present disclosure, the passenger terminal device 120 may monitor whether there is an instruction in a destination input box. When there is an instruction in the input box, the I/O module 510 of the passenger terminal device 120 may obtain information of the current departure location. The processing module 550 may simultaneously obtain the time when the passenger inputs the instruction.

According to some embodiments of the present disclosure, the passenger terminal device 120 may store and record multiple common destinations preset by a passenger. When the passenger needs a transportation service, the passenger may callout the common destinations stored in the passenger terminal device 120. The common destinations may be displayed on the display module 520 and selected via the I/O module 510.

In step 925, the passenger terminal device 120 may send the information of the current departure location and the current departure time to the system 105 through the communication module 540. Besides the information of the current departure location and the current departure time, the passenger terminal device 120 may also send information of other contents. The information of other contents may include but is not limited to physiological information of the passenger, any requirement/preference/expectation for the transportation service of the passenger, other information of the passenger, etc.

In step 935, the communication module 540 of the passenger terminal device 120 may receive the information of candidate destinations sent by the on-demand service system 105.

After step 935, the passenger terminal device 120 may display the received information by the display module 520. The information may be displayed in a text form or a hypertext form. Furthermore, in some embodiments, destination-related information may be expressed or displayed in the form of hypertext marking language (HTML). In some embodiments, the destination-related information may be displayed on a map interface.

In step 945, the passenger terminal device 120 may receive processed data related to the information of candidate destinations by the passenger through the I/O module 510. The processing may include but is not limited to deleting/selecting/designating one or more candidate destinations and adding new destination information.

After receiving the processed data by the passenger, alternatively, the passenger terminal device 120 may send the processing result to the system 105, one or more other passenger terminal devices 120, or one or more driver terminal devices 140 in step 955.

It should be noted that the description of the process or steps of providing the current information and processing the information of the candidate destinations by the passenger terminal device 120 is provided for illustration, and is not intended to limit the scope of the present disclosure. For persons having ordinary skills in the art, steps may be combined in various ways. Various variations and modifications may be conducted under the teaching of the present disclosure. However, those variations and modifications may not depart the spirit and scope of this disclosure. For example, in some embodiments, step 945 and step 955 may be omitted after the passenger terminal device 120 receives the information of the candidate destinations. As another example, the passenger terminal device 120 may obtain other relevant information in step 915. The relevant information may include but is not limited to at least one piece of location information in a historical time period of the passenger terminal device 120, other information of the passenger (physiological information, e.g., a heartbeat, a pulse, a blood pressure), etc. The other information of the passenger may be obtained by the sensor component of the I/O module 510 of the passenger terminal device 120, or other devices such as wearable devices, healthy devices, etc. The passenger terminal device may send the information in step 925. All such modifications are within the protection scope of the present disclosure.

FIG. 10-A is a flow chart of an example of a process of generating destination-related information based on a particular POI classification model by the POI engine 110 according to some embodiments of the present disclosure. In step 1010, the POI engine 110 may receive geographic information of a passenger. The reception of the geographic information may be performed by the passenger interface 230. The geographic information may include location information and time information. The location information may include a current location of the passenger and a departure location of an order. The time information may include a current time, a time when the passenger sends a service request, a time set by the passenger, or the like. The current location of the passenger may be the same with or different from the departure location of the order. The current location of the passenger and/or the departure location of the order may be obtained by using a particular positioning technology or by manually inputting a particular address name by the passenger. The related description of the positioning technology can be found in FIG. 5, and will not be repeated here.

In step 1020, the POI engine 110 may generate candidate destinations based on a particular POI classification model. The step 1020 may be performed by the processing module 210. In some embodiments, the particular POI classification model may relate to a passenger. Each passenger may have a corresponding POI classification model. The POI classification model may be stored in the user database 630, the storage module 220, or other modules or units that can store data, of the on-demand service system 105. The process of determining the particular POI classification model is described in FIG. 10-B. The POI engine 110 may determine a POI classification type of a current location of the passenger or a departure location of the order based on the POI classification model described above. More specifically, in some embodiments, the POI engine 110 may determine the POI classification type of a destination of the order based on the POI classification type of a current location of the passenger or a departure location of the order. In some embodiments, the POI engine 110 may determine the POI classification type of a destination of the order based on the POI classification type of a current location of the passenger or a departure location of the order, as well as a current time, a time when the passenger sends a service request and a time set by the passenger. The POI engine 110 may generate information of at least one candidate destination based on the POI classification type of the destination of the order.

The number of the candidate destinations may be arbitrary. For example, the number of the candidate destinations may be one, two, three, four, or five. The candidate destinations may belong to the same or different POI classification types. For example, the candidate destinations may belong to two or three different POI classification types. The number of the candidate destinations and/or the number of POI classification types that a destination belongs to may be fixed or adjustable. For example, the POI engine 110 may designate the number of destinations received from the passenger terminal device 120 as N1, and designate the number of POI classification types that a destination belongs to as N2. The number of destinations that belong to each POI classification type may be fixed or adjustable.

In some embodiments, the POI engine 110 may also rank generated candidate destinations based on a particular ranking rule in step 1030. In some embodiments, the ranking may be performed by the ranking unit 370 of the processing module 210. The particular ranking rule may be a combination of one or more rules such as a probability, a distance, a time sequence, an amount of required time, a required fee, the number of employed travel methods, or the like, or any combination thereof. In some embodiments, the POI engine 110 may calculate, by the calculation unit 350, an amount of required time, a distance, a required fee, a desired travel method, an order completion rate corresponding to different travel methods, or the like, from the departure location of the order to a candidate destination of the order. The ranking unit 370 may rank the candidate destinations based on a calculating result of the calculation unit 350. In some embodiments, the ranking unit 370 may rank the candidate destinations based on the number or frequency of using the candidate destinations. In step 1040, the POI engine 110 may send ranked candidate destinations to the passenger terminal device 120 through the passenger interface 230. The number of the candidate destinations sent to the passenger terminal device 120 may be one or more of the candidate destinations ranked in step 1030.

In some embodiments, destination information generated in step 1020 may include a recommended single or hybrid travel method, and a required fee of the recommended single or hybrid travel method. In step 1030, the POI engine 110 may rank the information of the candidate destinations based on the number of the travel methods or the amount of the required fee.

In step 1040, the POI engine 110 may send the candidate destinations to the passenger terminal device 120 and/or the driver terminal device 140. The candidate destination may be sent with or without being ranked.

In some embodiments, the POI engine 110 may send the candidate destinations generated in step 1020 to the passenger terminal device 120. In some embodiments, the POI engine 110 may send top N destinations of the candidate destinations in step 1020 that are ranked based on a particular rule to the passenger terminal device 120. N may be 2, 3, 4, 5, 6, 7, 8, 9, 10, or greater than 10. In some embodiments, the POI engine 110 may rank and send the top N destinations to the passenger terminal device 120. The top N destinations may be ranked based on one or more rules such as the number of usage in descending order, the frequency of usage in descending order, the number of travel methods in ascending order, required times in ascending order, required fees in ascending order, order completion rates corresponding to different travel methods, or the like. In some embodiments, the rule(s) of ranking the top N destinations may be automatically configured by the POI engine 110. In some embodiments, the rule of ranking the top N destinations may be preset by a passenger. In some embodiments, the ranking rule may be designated by a passenger based on an order (e.g., a current order or an order that satisfies a particular condition). For example, the POI engine 110 may provide one or more ranking methods for the passenger to select. Then the passenger may designate one or more ranking methods and/or application conditions. As another example, the POI engine 110 may permit the passenger to define one or more ranking methods and/or application conditions. For example, the ranking may be based on multiple factors. The POI engine 110 may permit the passenger to define a weight for each factor when calculating the ranking. In some embodiments, the POI engine 110 may send the top N destinations ranked in a random order.

In some embodiments, the POI engine 110 may further receive processing of the candidate destinations by the passenger terminal device 120. In some embodiments, the processing may include directly selecting one of the candidate destinations to send to the POI engine 110. In some embodiments, the processing may include selecting multiple candidate destinations to send to the POI engine 110. In some embodiments, the processing may include deleting one or more candidate destinations. It should be noted that the description described above of processing at least one candidate destination sent by the POI engine 110 is provided for the purposes of illustration, and not intended to limit the scope of the present disclosure. In some embodiments, other methods of processing the candidate destination may also be included. After receiving processing result from the passenger terminal device 120, the POI engine 110 may send the processing result to the driver terminal device 140. For example, the POI engine 110 may receive a destination selected by the passenger terminal device 120 from the candidate destinations described above and set this selected destination as the destination of an order. The POI engine 110 may send the order that includes a departure location and the selected destination to the driver terminal device 140.

It should be noted that the above description of generating a destination is provided for the purposes of illustration, and is not intended to limit the scope of the present disclosure. For persons having ordinary skills in the art, various variations and modifications may be conducted under the teaching of the present disclosure. However, those variations and modifications may not depart the spirit and scope of this disclosure. In some embodiments, some steps in the flow chart described above may be omitted, such as step 1030. The POI engine 110 may directly generate and send the candidate destinations without ranking the candidate destinations. In some embodiments, the flow chart described above may include other steps, such as a storing step. Some intermediate processing results and/or final processing results of the steps described above may be stored in the storage module 220, the database 130, or other modules or units that can store data, of the on-demand service system 105.

In some embodiments, step 1010 may also be omitted. When the POI engine 110 receives a service request signal from a passenger, it may determine the passenger's possible travel locus based on a current time without collecting a current location of the passenger and/or a departure location of an order. A service request signal may be detected by the POI engine 110 when a service application that provides service is turned on. In some embodiments, the travel locus may refer to a departure location and a destination of the order. The description of generating candidate destinations is similarly applicable to generating the travel loci, and is not repeated here. All such modifications are within the protection scope of the present application.

FIG. 10-B is a flow chart of an example of a process of building a POI classification model according to some embodiments of the present disclosure. In some embodiments, the POI classification model may relate to a passenger, e.g., an account name of the passenger. Each passenger may have a specific POI classification model. For brevity, a passenger is illustrated as an example in following description. The POI engine 110 may obtain information of historical orders related to the passenger (or other users of the passenger device 120) in step 1015. The information of historical orders may include information of historical orders relating to the passenger, or information of one or more historical orders during a preset time period relating to the passenger. The preset time period may include one or more days, one or more weeks, one or more months, one or more quarters, one or more years, etc. In some embodiments, the preset time period may be two months. In some embodiments, the preset time period may be random or fixed. In some embodiments, the preset time period may be determined based on historical experience or experimental data. The information of historical orders may include departure locations and destinations of the historical orders, historical service requesting time of the passenger, historical departure time set by the passenger, or the like, or any combination thereof. The information of historical orders may be obtained from the historical order database 610 of the database 130, the storage module 220, and/or other modules or units of the on-demand service system 105 with a storing function.

In step 1025, the POI engine 110 may process the information of historical orders of the passenger based on a location classifier that is pre-built by the on-demand service system 105. The method of building the location classifier may refer to the following description of this disclosure. The information of historical orders may include location information, time information, information of a required fee, or the like, or any combination thereof. The location information may include departure locations and/or destinations of the historical orders. The time information may include time when the passenger sends a service request or departure time set by the passenger. The processing may include classifying addresses of the departure locations and/or the destinations of the historical orders to generate an address classification type corresponding to the departure locations and/or the destinations of the historical orders. The address classification type may include transportation facility, residential area, office area, food and beverage, hotel, entertainment, address name, shopping, etc.

In some embodiments, the POI engine 110 may determine the POI type (i.e. the POI classification type) of the passenger based on a result of address classification of departure locations and/or destinations of historical orders in step 1035. The POI type of the passenger may belong to one or more types. The POI engine 110 may predict the passenger's historical destinations and/or loci based on the address classification type of the departure locations and/or the destinations of all the passenger's historical orders or the passenger's historical orders in a previous time period. The time period in the past may be one or more weeks, one or more months, one or more quarters, one or more years, etc. For example, if the POI type of the passenger is "food and beverage" and "residential area" in the past or in a previous time period, determined by the POI engine 110, the passenger may often move around an area between his/her residence and a restaurant in the past or in the previous time period. It may be concluded that the passenger preferred to food consumption in the past or in a previous period.

In some embodiments, the POI engine 110 may determine the POI type of the passenger based on time information and address information of the historical orders in step 1035. The POI type of the passenger may belong to one or more types. The time information of the historical order may include a time point or a time period of a day. The POI engine 110 may predict historical destinations and/or locus information of the passenger in the past or in a previous time period, based on the address classification type of the departure locations and/or the destinations of all the passenger's historical orders or the passenger's historical orders in the previous time period, and the time when the passenger sent a service request or the departure time set by the passenger. For example, from 8 am to 10 am, if the address classification type of the departure locations of the passenger's historical orders in the past or in a previous period is "residential area," the address classification type of the destinations of the passenger's historical orders in the past or in the previous period is "office area," the POI type of the passenger may be "residential area" and "office area". Then it may indicate that the passenger often moves around an area between his/her residence and office in the past or in the previous period. It may be concluded that the passenger preferred to work in the past or the previous period.

The POI classification model may be obtained based on the POI type of the passenger determined by the steps described above. The passenger's behaviors and habits may be predicted based on the POI classification model. After the current location information and/or the time information are obtained, the address classification type of the passenger's destination may be predicted, then the passenger's destination may be predicted accordingly.

The following is a detailed description of a method of building a location classifier in step 1025. It should be noted that the description is provided for the purposes of illustration, and not intended to limit the scope of the present disclosure. The process of building the location classifier may include the following steps: (a) the processing module 210 may obtain multiple text address data in which the address classification type is already known; (b) the text processing unit 390 may segment the multiple text address data of which the address classification type is already known to generate multiple feature texts using a predetermined word segmentation method; (c) the model training unit 395 may generate the location classifier by taking the multiple feature texts as training data to train the location classifier. The method of training the location classifier may include naive Bayesian algorithm, weight Bayesian algorithm, decision tree, Rocchio, neural network, linear least squares fitting, K-nearest neighbor, genetic algorithm, maximal entropy, linear regression model, or the like, or any combination thereof. The linear regression model may include a logistic regression model and a support vector machine model. The method of training the location classifier described herein may also include other algorithms or models. In some embodiments, the location classifier may also be derived directly from empirical values without data training.

In some embodiments, the processing module 210 may also include a sample equalizing unit (not shown in FIG. 3.). After obtaining the multiple text address data of which the address classification type is already known, the sample equalizing unit may perform a sample equalization on the multiple text address data. The sample equalization may include calculating an average number of the text address data of each address classification type based on the number of the text address data and the number of address classification types by the calculation unit 350. In some embodiments, the method of sample equalization may be "sampling with replacement." If the number of the text address data of a certain address classification type is less than the average number, the number of text address data of this address classification type may be increased to the average number. Conversely, if the number of the text address data of a certain address classification type is larger than the average number, the number of text address data of this address classification type may be decreased to the average number.

In step (b), the text processing unit 390 may segment the text address data of each known address classification type to generate multiple feature texts. The feature texts may be regarded as a vector, e.g., $X=(x_1,x_2,x_3, \ldots x_m)$, wherein each element of X may denote a feature text and m may denote the number of feature texts of each segmented text address data. For example, the words "Beijing Shangdi Subway Station" may be segmented as three feature texts, e.g., "Beijing," "Shangdi," "Subway Station." In some embodiments, the processing module 210 may include a redundancy eliminating unit. In some embodiments, the redundancy eliminating unit may be contained in the text processing unit 390 and work as a text deleting unit. The text deleting unit may delete those feature texts with a length shorter than a certain threshold. In some embodiments, the threshold may be 2, 3, 4, etc. For example, the result of segmenting "I'm in Beijing Xierqi Subway Station" may be "I'm," "in," "Beijing," "Xierqi," "Subway," "Station." The remaining feature texts may be "Beijing," "Xierqi," "Subway," "Station" after the feature texts "I'm" and "in" with a length shorter than 2 have been deleted.

In step (c), the model training unit 395 may generate a location classifier by taking the multiple feature texts as training data to train the location classifier. In some embodiments, the model training unit 395 may train the location classifier using a naive Bayesian algorithm. For brevity, a set of the address classification types may be $Y=(y_1,y_2,y_3, \ldots y_q)$, wherein elements in Y may represent different address classification types. The calculation unit 350 may calculate a posterior probability $P(Y|X)$ for each combination of X and Y based on the Bayesian function $P(Y|X)=P(X|)*P(Y)/P(X)$, wherein $P(Y|X)$ may denote a probability that the text address data X belongs to a certain classification type.

The calculation unit 350 of the processing module 210 may calculate the probability that the text address data belongs to each address classification type. In some embodiments, the probability that the text address data belongs to each address classification type can be obtained as:

$$P_k = P(Y|X) = P(X|Y)*P(Y)/P(X) = \Pi_i^m P(x_i|Y=y_k)*P(Y=y_k)/P(X), \quad (2)$$

wherein $P(Y=y_j)$ may denote a proportion of the address classification type $y_j$ in the set of the address classification types, $P(x_i|Y=y_j)$ may denote a proportion of the feature text $x_i$ in the address classification type $y_j$; $P(X)$ may denote a probability of occurrence of a departure location or destination of an order. The calculation unit 350 may obtain $P(Y=y_j)$ and $P(x_i, Y=y_j)$ based on data statistics.

The calculation unit 350 of the processing module 210 may calculate the probability that the text address data belongs to each address classification type. For brevity, probabilities of the address classification types are denoted by P1, P2, P3, . . . Pq in descending order, wherein q is the total number of the address classification types. Based on the probabilities of the different address classification types described above, the processing module 210 may determine the address classification type that the text address data belongs to. In some embodiments, the processing unit 210 of the POI engine 110 may designate the address classification type with the largest probability among the q probabilities described above as the address classification type of the text address data. In some embodiments, the POI engine 110 may select two largest probabilities (i.e. P1 and P2) among the q probabilities described above and P1 and P2 may be compared. If P1>Z*P2, and Z is greater than 1, the address classification type corresponding to P1 may be designated as the address classification type of the text address data. A range of the value of Z may be 1 to 2, 2 to 3, 3 to 4, 4 to 5, 5 to 6, or more than 6. In some embodiments, Z may have a range of value from 3 to 5. For example, if the probability that "Shangdi Subway Station" belongs to the address classification type "transportation facility" and "address name" is 0.6 and 0.1 respectively, and the value of Z is 3, because 0.6>3*0.1, the processing unit 210 may determine that the address classification type of "Shangdi Subway Station" is a "transportation facility."

What has been described above is a process of generating a location classifier. Based on the location classifier, it may be feasible to classify a departure location and/or a destination of an order to determine an address classification type of the departure location and/or the destination of the order. It should be noted that the above description is provided for the purposes of illustration, and not intended to limit the scope of the present disclosure. For persons having ordinary skills in the art, various variations and modifications may be conducted under the teaching of generating an address classifier. All such improvements and modifications are within the scope of protection of the present disclosure.

Figure 11:
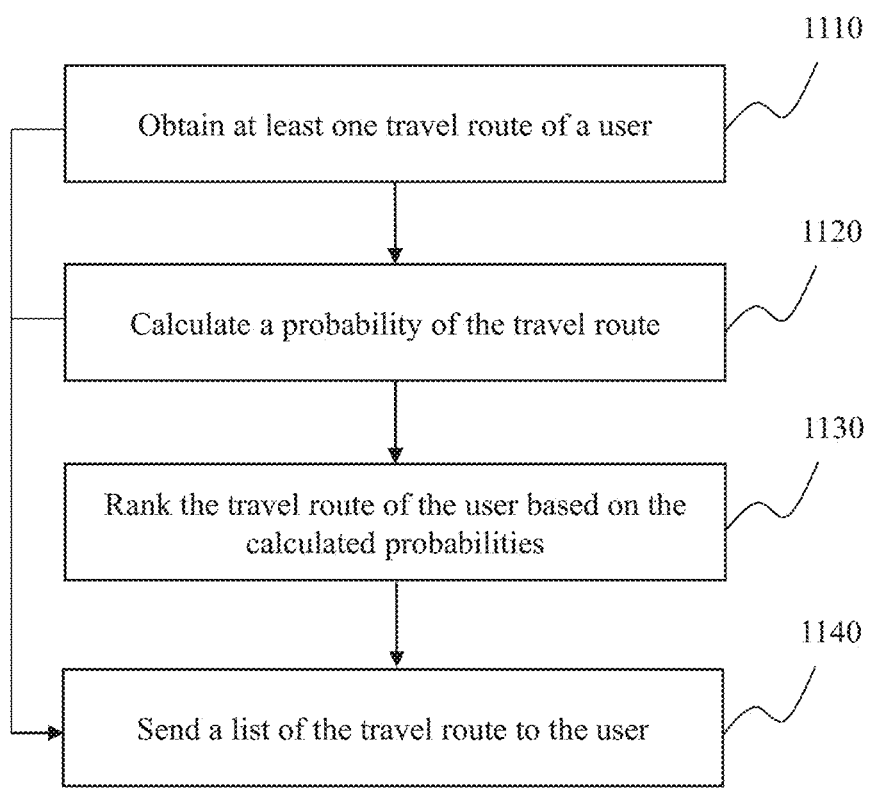
FIG. 11 is a flow chart of an example of a process of providing a travel route by a POI engine according to some embodiments of the present disclosure.

FIG. 11 is a flow chart of an example of a process of providing a travel route to a user by the POI engine 110 according to some embodiments of the present disclosure. As shown in FIG. 11, in step 1110, the POI engine 110 may obtain at least one travel route of a user. The user may be a passenger or a driver. The step 1110 may be performed by the passenger interface 230 and/or the driver interface 240. In some embodiments, the travel route may be obtained from the passenger terminal device 120 and/or the driver terminal device 140, the database 130 or the information source 160. It should be noted that there are various methods of obtaining the travel route of the user. For example, multiple common travel routes may be preset by the user. Alternatively, the travel route may be obtained based on the big data calculation of daily travel data and consumption behavior of the user. According to some embodiments of the present disclosure, the travel route may include a departure location and a destination.

In step 1120, the POI engine 110 may calculate the probability of the travel route (e.g. a probability of a travel route may represent the probability of taking the travel route in a travel). The calculation of the probability of the travel route may be performed by the processing module 210 of the POI engine 110. For example, in some embodiments, the POI engine 110 may calculate the probability of the travel route by the calculation unit 350 of the processing module 210 of the POI engine 110 based on historical probabilities of travel routes and/or travel-route-related information. The historical probability of each travel route may be obtained by the calculation of the historical travel data of the user. The historical probability of each travel route may be calculated by the calculation unit 350. According to some embodiments of the present disclosure, the travel-route-related information may include but is not limited to a current location, a current weather conditions, a current date and/or a current time, or the like, or any combination thereof. For example, the travel routes of the user obtained by the POI engine 110 in step 1110 may be $R_1, R_2, \ldots, R_n$, respectively. Time of travel corresponding to each travel route may be $C_1, C_2, \ldots, C_n$ respectively. If a user has at least one travel, i.e., $\Sigma_{i=1}^n C_i > 0$, then the historical probability of each travel route may be $C_1/\Sigma_{i=1}^n C_i, C_2/\Sigma_{i=1}^n C_i, \ldots, C_n/\Sigma_{i=1}^n C_i$ respectively. It can be drawn that, for an obtained travel route R, preset by the user, if the user has never traveled along the travel route $R_i$, i.e., $C_i=0$, then the historical probability of the travel route $R_i$ may be 0. More particularly, for example, the travel-route-related information may refer to factors that influence the selection of the travel routes of the user. The factors may include a current location of the user, a current weather condition, a current date, a current time, or the like, or any combination thereof. A consumption behavior of the user may refer to a behavior that the user makes a consumption decision and completes the consumption driven by a need or a motivation. The consumption behavior may be a thinking or mental process, or a process of taking actions, making plans or solving problems. The user's selection of a travel route may be a process of consumption behavior. The user may determine his/her requirement of travels based on internal or external conditions. For example, if the current location of the passenger is at home during working hours on weekdays, the passenger may most likely to choose to take a taxi to the company. If the current location of the passenger is the company after working hours on weekdays, the passenger may most likely choose to take a taxi home. If it is on weekends, the passenger may most likely choose to take a taxi to a bar, a cinema, other entertainment venues, or the like. As another example, the passenger's desire of traveling may be not strong on a rainy or snowy day. And once the passenger chooses to travel on a rainy or snowy day, the most possible destinations may be places related to daily life that are not far away from the passenger, such as restaurants, banks, hospitals, supermarkets, etc.

In some embodiments, calculation of the probability of each travel route may be based on calculation of the historical probabilities. For example, the obtained travel routes of the passenger/driver may be $R_1, R_2, \ldots R_n$ respectively and the historical probabilities calculated corresponding to the travel routes may be $H_1, H_2, \ldots, H_n$ respectively. Then the current probability of the travel routes may be assumed as $H_1, H_2, \ldots, H_n$, respectively. In some embodiments, the calculation of the probability of each travel route may be obtained based on the calculation of the historical probabilities and the travel-route-related information. For example, the obtained travel routes of the passenger/driver may be $R_1$, $R_2$, ..., $R_n$ respectively and the historical probabilities calculated corresponding to the travel routes may be $H_1$, $H_2$, ..., $H_n$ respectively. For brevity, only the travel-route-related information relating to the current location may be considered. The travel routes of the passenger/driver may be divided into two groups: a route set $G_1$ wherein departure locations are current locations and another route set $G_2$ wherein departure locations are not current locations. There may be k routes in $G_1$, represented by $R_1$, $R_2$, ..., $R_k$ respectively, and probabilities of the k routes calculated correspondingly may be $H_1$, $H_2$, ..., $H_k$. There may be n-k routes in $G_2$, represented by $R_{k+1}$, $R_{k+2}$, ... $R_n$ respectively, and probabilities of the n-k routes calculated correspondingly may be $H_{k+1}$, $H_{k+2}$, ..., $H_n$ respectively. For each route in the set $G_2$, as all of the departure locations are not the current locations, the current probability of each route in $G_2$ may be 0. For each route in the set $G_1$, as all of the departure locations are the current locations, each influence coefficient of "the current location" to each route in $G_1$ may be the same. So the probability of each route in set $G_1$ may be $$H_1 + \frac{1}{k}\sum_{i=k+1}^{n} H_i, H_2 + \frac{1}{k}\sum_{i=k+1}^{n} H_i, \ldots, H_k + \frac{1}{k}\sum_{i=k+1}^{n} H_i$$

respectively, and the probability of each route in set $G_2$ may be 0. As such, the current probability of each travel route (i.e., $R_1$, $R_2$, ..., $R_n$) of the passengers/drivers may be $$H_1 + \frac{1}{k}\sum_{i=k+1}^{n} H_i, H_2 + \frac{1}{k}\sum_{i=k+1}^{n} H_i, \ldots, H_k + \frac{1}{k}\sum_{i=k+1}^{n} H_i, 0, \ldots, 0$$

respectively. In some embodiments, the calculation of the probability of each travel route may be obtained based on the travel-route-related information. For example, the travel routes of the passenger/driver that is acquired is shown in table 1:

TABLE 1 acquired travel routes of the passenger/driver

| Travel Route ID | Departure location | Destination Location |
|---|---|---|
| $R_1$ | A certain residential area | Children's palace |
| $R_2$ | A certain residential area | Activity Center for the aged |

According to some embodiments, the factors that influence the selection of travel route of the passenger/driver (i.e., the travel-route-related information) may be time and weather. An influence coefficient may be allocated to each factor respectively to represent a degree of the factor's influence on the final selection of travel route of the passenger/driver, as shown in table 2 and table 3:

TABLE 2 influence coefficients of time on the selection of travel route of the passenger/driver

| Travel Route ID | Weekdays | Weekends | Holidays | Days that give beneficial treatments to the aged |
|---|---|---|---|---|
| $R_1$ | 50 | 100 | 150 | 20 |
| $R_2$ | 0 | 30 | 50 | 200 |

TABLE 3 influence coefficients of weather on the selection of travel route of the passenger/driver

| Travel Route ID | Fine day | Rainy day | Snowy day |
|---|---|---|---|
| $R_1$ | 1 | 0.5 | 0 |
| $R_2$ | 1 | 0.5 | 0 |

If the current day is both a holiday and a fine day, then selective coefficients of two routes $R_1$, $R_2$ may be 150×1=150 for $R_1$, and 50×1=50 for $R_2$ respectively. Thus, probabilities of the two routes may be: 150/(150+50)=75% for $R_1$, and 50/(150+50)=25% for $R_2$ respectively. If the current day is both a day that give beneficial treatments to the aged and a fine day, then selective coefficients of the two routes may be 20×1=20 for $R_1$, and 200×1=200 for $R_2$ respectively. Thus, probabilities of the two routes may be: 20/(20+200)=9.1% for $R_1$, 200/(20+200)=90.9% for $R_2$ respectively.

It should be noted that the above description is provided for the purposes of illustration, not intended to limit the scope of the present disclosure. Because there may be various kinds of travel-route-related information, and influence of the travel-route-related information on each travel route may be same or different, more complex mathematical models can be built for different travel-route-related information to calculate the final probability of each route.

In step 1130, the POI engine 110 may rank the travel routes of the passenger/driver according to the probabilities calculated above. The travel routes may be ranked based on the probabilities in descending order by the ranking unit 370 of the processing module 210 of the POI engine 110.

In step 1140, the POI engine 110 may send a list of the travel routes that have been ranked to the passenger terminal device 120 and/or the driver terminal device 140. The step 1140 may be performed by the passenger interface 230 and/or the driver interface 240. In some embodiments, the list of the travel routes may be displayed on the display unit 520 of the passenger terminal device 120 and/or the driver terminal device 140 and provided for the passenger and/or driver to select. In some embodiments, a travel route with the highest probability in the list of the travel routes may be designated as a default travel route and directly added to corresponding service request information.

It should be noted that the POI engine 110 may directly send the travel routes of the passenger or the driver without performing step 1120 and/or step 1130. For example, when only one travel route of the passenger/driver is obtained, the probability of the travel route may not need to be calculated, and the travel route may be directly sent to the passenger/driver. As another example, when only one travel route of the passenger/driver is obtained, the probability of the travel route may be calculated as 100%, and the travel route may be directly sent to the passenger/driver without performing step 1130.

It should be obvious to those skilled in the art that the modules, the units or the steps in the above description of the present disclosure may be realized by general calculating modules. For example, the modules, the units or the steps may be integrated into one calculating module or distributed on a network of multiple calculating modules. Alternatively, the modules, the units or the steps may be realized by executable program codes such that the executable program codes may be stored in a storage module and executed by the calculating module. The modules, the units or the steps may also be realized by distributing each of them on an individual integrated circuit module or distributing some of the modules or steps on a single integrated circuit module. In this way, the present disclosure is not limited to combinations of any particular hardware or software.

It should be noted that the above examples are provided for the purposes of illustration and not intended to limit the scope of the present disclosure. For persons having ordinary skills in the art, various variations and modifications may be conducted under the teaching of the present disclosure. However, those variations and modifications may not depart the spirit and scope of this disclosure.

FIG. 12-A is a flow chart of an example of a process of providing a travel method plan to a passenger/driver by the POI engine 110 according to some embodiments of the present disclosure. In step 1210, the POI engine 110 may receive information related to a transportation service request. The step 1210 may be performed by the passenger interface 230 and/or the driver interface 240. In some embodiments, the passenger interface 230 and/or the driver interface 240 may receive the transportation service request from the passenger terminal device 120 and obtain feature-related information and profile information of the transportation service request. The profile information may include but is not limited to a departure time, information of a departure location and a destination, or the like, or any combination thereof. The feature-related information may include but is not limited to POI information of a departure location and a destination, real-time weather information, real-time traffic information, preference information of a driver for each travel method, the number of available drivers corresponding to each travel method in a preset area, an actual distance, or the like, or any combination thereof.

In step 1220, the POI engine 110 may determine travel information of the transportation service request corresponding to each single travel method based on the feature-related information and the profile information. The step 1220 may be performed by the determining unit 380 of the processing module 210 of the POI engine 100. The determining unit 380 may determine the travel information of the transportation service request corresponding to each single travel method based on the feature-related information and the profile information. The travel information may include an order completion rate, a required time, a required fee, a walking distance, etc. For example, the travel information of a car-hailing request (i.e., the transportation service request) corresponding to a single travel method may include an order completion rate, a required time, a required fee, a walking distance, etc. of each travel method based on the car-hailing request. In some embodiments, the determining unit 380 may determine POI information of the departure location and the destination, respectively based on information of the departure location and information of the destination. For each travel method, the determining unit 380 may estimate its order completion rate based on the POI information of the departure location, the POI information of the destination, a departure time, real-time traffic information, preference information of a driver for a certain travel method, and the number of available drivers. The determining unit 380 may plan a travel route and obtain the actual distance, travel time and level of traffic congestion of the travel route to estimate a total fee, a walking distance and a required time of the travel route based on the departure location, the destination and the travel method.

In some embodiments, there may be multiple preset amounts of additional fees such as tips. The determining unit 380 may determine an order completion rate corresponding to each preset amount of additional fee and the passenger's acceptance rate of each preset amount of additional fee. The determining unit 380 may also obtain an optimal amount of additional fee based on the order completion rate and the passenger's acceptance rate of each preset amount of additional fee, and designate the order completion rate that corresponds to the optimal amount of additional fee as the final order completion rate. More particularly, a service provider may receive a car-hailing request and analyze POI (point of interest) information of a departure location and a destination of the request, for example, whether the departure location/destination is a hospital, a community or a business district. In addition, for each travel method, an order completion rate may be estimated based on real-time traffic conditions, time, the departure location and the destination, and information of drivers around. For a travel method with tips, an estimated order completion rate and a recommended amount of tips that increases the order completion rate may be outputted. In addition, for each travel method, its required fee, required time and walking distance may be estimated based on the actual distance, the travel time, and the level of traffic congestion of a travel route obtained according to a result of travel route planning. The total fee may be a sum of the required fee and the recommended tip. Thus, the travel information of multiple single travel methods may be obtained.

In some embodiments, step 1220 may include sub-steps 1221, 1222, and 1223. FIG. 12-B is a flow chart of an example of a process of processing travel information by the POI engine 110. In step 1221, POI information of a departure location and a destination may be determined based on information of the departure location and the destination information, respectively. In step 1222, for each travel method, an order completion rate may be estimated based on the POI information of the departure location, the POI information of the destination, departure time, real-time traffic information, preference information of a driver for the travel method, and the number of available drivers. More particularly, for example, the step 1222 may be performed by estimating the order completion rate of a car-hailing request with each travel method based on a pre-built prediction model. The prediction model may be a model built based on feature-related information of historical orders during a preset time period for each travel method. The feature-related information of the car-hailing request may be regarded as a predictive variable of the prediction model. The order completion rate of the car-hailing request with each travel method may be taken as a target variable of the prediction model.

After the order completion rate of each travel method is estimated in step 1222, the method of processing travel information may further include step A01 and step A02. In step A01, based on multiple preset amounts of additional fee, the order completion rate corresponding to each of the preset amount of additional fee and the passenger's acceptance rate of the preset amount of additional fee may be determined. The additional fee may be a tip. An optimal tip may be selected by estimating the order completion rates and the passenger's acceptance rates corresponding to multiple preset tips. It should be noted that, in the step A01, the order completion rate and the passenger's acceptance rate may be obtained in the same way as the step 1222, i.e., by pre-building a prediction model. The additional fee may be a characteristic data of the prediction model. In step A02, an optimal amount of additional fee may be obtained based on the order completion rate and the passenger's acceptance rate corresponding to each of the preset amount of additional fee. The order completion rate corresponding to the optimal amount of additional fee may be designated as the final order completion rate.

In step 1223, based on a departure location, a destination and a travel method, a travel route may be planned and its actual distance, travel time and level of traffic congestion may be obtained to estimate a total fee, a walking distance and a required time. The travel information of multiple single travel methods such as tips, order completion rates, total fees, walking distances, required times, etc. may be obtained by the steps described above.

Refer back to FIG. 12-A, in step 1230, the POI engine 110 may determine a hybrid travel method using a global optimization algorithm based on the travel information of each single travel method. Then the POI engine 110 may obtain the travel information of the hybrid travel method corresponding to the transportation service request. The step 1230 may be performed by the calculation sub-unit 385 of the determining unit 380 of the processing module 210 of the POI engine 110. The calculation sub-unit 385 may determine the hybrid travel method using a global optimization algorithm based on the travel information of each single travel method. Then the determining unit 380 may obtain the travel information of the hybrid travel method determined by the calculation sub-unit 385. In some embodiments, the global optimization algorithm may be a greedy algorithm or the like. In some embodiments, based on order completion rate, required time, required fee, and walking distance of each single travel method, the determining unit 380 and its calculation sub-unit 385 may employ the greedy algorithm to determine multiple hybrid travel methods. The determined multiple hybrid travel methods may be ranked based on required time in ascending order. The travel information of the multiple hybrid travel methods corresponding to the car-hailing request may be obtained. Alternatively, based on order completion rate, required time, required fee, and walking distance of each single travel method, the determining unit 380 and its calculation sub-unit 385 may employ the greedy algorithm to determine multiple hybrid travel methods. The determined multiple hybrid travel methods may be ranked based on required fee in ascending order. The travel information of the multiple hybrid travel methods corresponding to the car-hailing request may be obtained. For example, after multiple hybrid travel methods are obtained by combining multiple single travel methods, a most suitable hybrid travel method may be obtained by employing the greedy algorithm. The travel information of the hybrid travel method corresponding to the car-hailing request may include order completion rate, required time, required fee, the walking distance, etc. of each hybrid travel method based on the car-hailing request. In some embodiments, step 1230 may specifically include step 1231 and step 1232.

In step 1231, based on order completion rate, required time, required fee, and walking distance of each single travel method, by employing the greedy algorithm, multiple hybrid travel methods may be determined. The determined multiple hybrid travel methods may be ranked based on required time in ascending order. The travel information of the multiple hybrid travel methods corresponding to the car-hailing request may be obtained. Travel information of multiple hybrid travel methods corresponding to the car-hailing request may be obtained. In step 1232, based on order completion rate, required time, required fee, and walking distance of each single travel method, by employing the greedy algorithm, multiple hybrid travel methods may be determined. The determined multiple hybrid travel methods may be ranked based on required fee in ascending order. Travel information of multiple hybrid travel methods corresponding to the car-hailing request may be obtained. Thus, based on a goal of saving time or money, the global optimization algorithm can generate two different results for the passenger to select a desired travel method. The step 1231 and the step 1232 may be both performed, or only one of them may be performed.

In step 1240, based on the travel information of each single travel method and the travel information of each hybrid travel method, all single and hybrid travel methods may be sent to a user device after being ranked according to a preset travel condition. The step 1240 may be performed by the ranking unit 370 of the processing module 210 of the POI engine 110 and the passenger interface 230 and/or the driver interface 240. Based on the travel information of each single travel method and the travel information of each hybrid travel method, all single and hybrid travel methods may be ranked by the ranking unit 370 according to a preset travel condition. Then a list of travel methods that have been ranked may be sent through the passenger interface 230 and/or the driver interface 240. In some embodiments, the ranking unit 370 may be configured to rank all the single and hybrid travel methods according to a preset travel condition, based on an order completion rate, a required time, a required fee, and a walking distance of each single and hybrid travel method. The preset travel condition may include a preset range of walking distance, a preset required fee, a preset required time, or the like, or any combination thereof. More particularly, for example, the step 1240 may be used to comprehensively rank the single and hybrid travel methods based on a passenger-input or system default travel condition or ranking method. The method in step 1240 may further include receiving and displaying the single and hybrid travel methods in sequence by the passenger terminal device 120 and/or the driver terminal device 140 for the passenger to select. The passenger terminal device 120 and/or the driver terminal device 140 may include a display unit 520 configured to display the ranked single and hybrid travel methods for the passenger to select.

In some embodiments, the step 1240 may include ranking all single and hybrid travel methods according to a preset travel condition based on an order completion rate, a required time, a required fee, and a walking distance of each single and hybrid travel method. The preset travel condition may include a preset range of walking distance, a preset required fee, a preset required time, or the like, or any combination thereof. In some embodiments, multiple travel conditions may be preset. For example, the multiple travel conditions may include a cheapest required fee and a walking distance less than 1 km.

In some embodiments, the most suitable travel method may be found for a passenger based on all data stored in the on-demand service system 105 and a geographic information system. For example, a background device of the system 105 and the geographic information system may find that an order completion rate of a taxi near the current location of a passenger is very low and the passenger's order quality is not very high, i.e. failure probability of the passenger's order is very high. However, the background device may find that an order completion rate of a chauffeured car service is relatively high. Then the background device may recommend the chauffeured car service to the passenger as a priority choice. As another example, if the background device finds that a passenger is near a bus station and there will be a bus in 5 minutes that will take the passenger to a location close to the passenger's destination, the background may recommend the passenger to take the bus and tell the passenger the bus's arrival time. Alternatively, the background device may recommend the passenger a hybrid bus-taxi travel method. The hybrid bus-taxi travel method may include taking the passenger by bus to a location with a high order completion rate of a taxi order. The location with a high order completion rate may be a location where orders are relatively less and drivers prefer to the type of the current order. The background device may provide multiple recommended travel methods with estimated fee and estimated time for the passenger to select.

In some embodiments, a method of planning travel method is provided. A car-hailing software platform may obtain multiple recommended travel methods based on various information. The recommended travel methods may include one or more single and hybrid travel methods. The car-hailing software platform may rank the multiple recommended travel methods in ascending order based on a preset ranking method, such as required fee, required time, or walking distance. These multiple recommended travel methods may be provided for a passenger to select to effectively increase the order completion rate, save time or money and improve the passenger's user experience.

For brevity and better understanding of the method of planning travel method of the present disclosure, a passenger is illustrated as an example in following description, but is not intended to limit the scope of the present disclosure.

For example, a passenger A would like to leave for Union Hospital from Beijing Huilongguan North immediately. After the passenger A sends the order, the service terminal of a car-hailing software may detect that passenger A's order is a real-time request order and analyze that its destination is a hospital in the business district around Qianmen Street. This information may be sent to each product line (i.e., multiple travel methods). Each product line may estimate an order completion rate based on traffic information, preference of a driver for a product line, the number of available drivers, etc. An optimal tip and the order completion rate of each product line may be obtained based on the order completion rate and the passenger's acceptance rate that correspond to each tip. For example, a result may be as follows:

by taking a taxi, the tip is RMB 5 yuan, the order completion rate is 0.8, the total fee is RMB 90 yuan, the walking distance is 700 meters, and the required time is 1.15 hours;

by taking a chauffeured car service, the tip is RMB 0 yuan, the order completion rate is 0.9, the total fee is RMB 120 yuan, the walking distance is 200 meters, and the required time is 1.05 hours;

by taking a hitchhiking, the tip is RMB 5 yuan, the order completion rate is 0.8, the total fee is RMB 60 yuan, the walking distance is 800 meters, and the required time is 1.2 hours; and by taking a bus, the tip is RMB 0 yuan, the order completion rate is 1, the total fee is RMB 10 yuan, the walking distance is 3 km, and the required time is 2 hours;

In addition, after the data request (i.e., the result described above) enters a route synthesis program, the route synthesis program may perform optimization by employing a greedy optimization algorithm based on a system default optimization method or an optimization method designated by the passenger. For example, if the current optimization target is the lowest required fee and a walking distance less than 1 km, the bus, i.e. the cheapest travel methods, may be selected as the first travel method to start the travel. The total fee of taking a hitchhiking, a taxi, or a chauffeured car service that corresponds to distances between each bus station and the destination of the passenger may be calculated respectively. A result may be found that taking a hitchhiking after having taken the bus for three stations would be a good hybrid travel method that will totally cost RMB 20 yuan and 1.4 hours, and require a 900 meters' walking. Finally, this hybrid travel method may be selected by the passenger. It is shown in the above example that the greedy algorithm may be used as a global optimization method to firstly optimize the product with an optimal optimization target. If the first optimal solution does not meet some constraints (e.g. the current optimization object), a second alternative may be selected (e.g., a hitchhiking).

It should be noted that modules of the system of the present disclosure are logically divided according to their functions. These modules are provided for the purposes of illustration, and not intended to limit the scope of the present disclosure. These modules may be re-divided or combined according to different requirements. For example, some modules may be combined into a single module, or further divided into more sub-modules.

Various modules of the present disclosure may be implemented by hardware, software running in one or more processors, or a combination of them. For persons having ordinary skills in the art, some or all of the functions of the modules of the present disclosure may be implemented by a microprocessor or a digital signal processor (DSP). The present disclosure may also be implemented as a device or a program running in a device (e.g., a computer program and a product with computer programs) that perform a part or all of the methods described herein. Such kind of programs may be stored on a computer readable medium, or may be in a form of one or more signals. Such signals may be downloaded from an Internet website, provided on a carrier signal, or provided in any other forms.

The embodiments described above are provided for the purposes of illustration, and not intended to limit the scope of the present disclosure. For persons having ordinary skills in the art, various variations and modifications may be conducted under the teaching of the present disclosure. However, those variations and modifications may not depart the spirit and scope of this disclosure. The scope of the patent disclosure should be the consistent with the scope of the claims.

Figure 13:
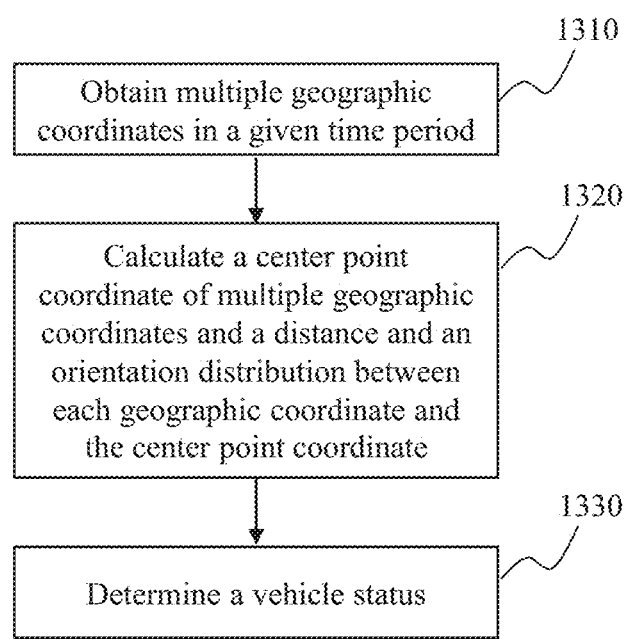
FIG. 13 is a flow chart of an example of a process of detecting a vehicle status by a POI engine according to some embodiments of the present disclosure.

FIG. 13 is a flow chart of an example of a process of detecting a vehicle status by the POI engine 110 according to some embodiments of the present disclosure. In step 1310, the POI engine 110 may receive geographic dataflow from a vehicle and obtain multiple geographic coordinates of the vehicle in a given time period as shown in FIG. 13.

The step 1310 may be performed by the passenger interface 230 and/or the driver interface 240. According to some embodiments of the present disclosure, the geographic dataflow may be obtained using a positioning technology, and the positioning technology may include but is not limited to global positioning system (GPS) technology, global navigation satellite system (GLONASS) technology, Beidou navigation system technology, Galileo positioning system technology, quasi-zenith satellite system (QZSS) technology, wireless fidelity (Wi-Fi) positioning technology, or the like, or any combination thereof. According to some embodiments of the present disclosure, the GPS dataflow obtained by the GPS positioning technology may include multiple real-time GPS coordinates uploaded by the vehicle at a given time frequency, in which each GPS coordinate corresponds to a location of the vehicle at each sampling time. In some embodiments, for the multiple real-time GPS coordinates uploaded by the vehicle at a given time frequency, each GPS coordinate may correspond to a location of the vehicle at each sampling time. For example, current GPS coordinates of the vehicle may be obtained in real time by a GPS module of a smart device; the GPS coordinates that are sampled at a certain time frequency may be uploaded in real time by a long-lived connection service of a car-hailing app. In some embodiments, the address analyzing unit 310 of the processing module 210 of the POI engine 110 may extract multiple GPS coordinates from the GPS dataflow in a given period related to a given time point. For example, the real-time GPS dataflow Gi={sxi, syi, ti} may be obtained using the GPS positioning technology, wherein i=1,2, 3, . . . , n, sx may denote longitudes of the GPS dataflow, sy may denote latitudes of the GPS dataflow, and t may denote the sampling time of the GPS dataflow. According to the given time point t, multiple GPS coordinates Gj in the time interval t-tj<ε may be obtained, wherein Gj={sxj, syj}, j=1, 2, 3, . . . , k.

In step 1320, the POI engine 110 may calculate a center point coordinate of multiple geographic coordinates and a distance and an orientation distribution between each geographic coordinate and the center point coordinate. The step 1320 may be performed by the calculation sub-unit 385 of the processing module 210 of the POI engine 110. In some embodiments, the calculation sub-unit 385 may be configured to calculate a center point coordinate of multiple GPS coordinates, an Euclidean distance and a radian between each GPS coordinate and the center point coordinate, and a normalized distance and an orientation distribution between each GPS coordinate and the center point coordinate based on each Euclidean distance and each radian. Herein, the Euclidean distance is one of the common methods of calculating a distance in clustering analysis. In some embodiments, methods of calculating a distance may include but is not limited to the Euclidean distance, the Manhattan distance, the Mahalanobis distance and/or the Hamming distance, etc. For example, the multiple GPS coordinates of the vehicle in the given period may be obtained by the address analyzing unit 310, i.e., Gj={sxj, syj}, wherein j=1, 2, 3, . . . , k. Firstly, the center coordinate $g_0$ of multiple GPS coordinates may be calculated as:

$$g_0 = \frac{1}{k}\sum_{j=0}^{k} G_j, \quad (3)$$

Then, the Euclidean distance $\omega(G_j, g_0)$ and the radian $\psi(G_j, g_0)$ between each GPS coordinate and the center point coordinate may be calculated. Based on each Euclidean distance $\omega(G_j, g_0)$ and each radian $\psi(G_j, g_0)$, the normalized distance $S(G_j, g_0)$ and the orientation distribution $\theta(G_j, g_0)$ between each GPS coordinate and the center point coordinate may be calculated according to Equation 4 and Equation 5, wherein W is a first threshold selected based on experimental data and practical experience:

$$S(G_j, g_0) = \begin{cases} 1, & \omega(G_j, g_0) < W \\ 0 \end{cases}, \quad (4)$$

$$\theta(G_j, g_0) = \begin{cases} (1, 0, 0, 0), & 0 \le \psi(G_j, g_0) < \pi/2 \\ (0, 1, 0, 0), & \pi/2 \le \psi(G_j, g_0) < \pi \\ (0, 0, 1, 0), & \pi \le \psi(G_j, g_0) < 3\pi/2 \\ (0, 0, 0, 1), & 3\pi/2 \le \psi(G_j, g_0) < 2\pi \end{cases}, \quad (5)$$

In step 1330, a vehicle status may be determined based on the distance and the orientation distribution. The step 1330 may be performed by the determining unit 380 of the processing module 210 of the POI engine 110. In some embodiments, the determining unit 380 and the calculation sub-unit 385 may calculate an average normalized distance and a total orientation distribution based on the normalized distance and the orientation distribution between each GPS coordinate and the center point coordinate; and determine the vehicle status based on the average normalized distance, the first threshold, the total orientation distribution and a second threshold. For example, the normalized distance $S(G_j, g_0)$ and the orientation distribution $\theta(G_j, g_0)$ between each GPS coordinate and the center point coordinate may be obtained by the calculation sub-unit 385. Firstly, the average normalized distance $S_{avg}$ and the total orientation distribution $\theta_{sum}$ may be calculated as:

$$S_{avg} = \frac{1}{k}\sum_{j=0}^{k} S(G_j, g_0), \quad (6)$$

and $$\theta_{sum} = \left\| \sum_{j=0}^{k} \theta(G_j, g_0) \right\|_1, \quad (7)$$

Then the vehicle status R may be determined according to Equation 8, wherein 1 may indicate that the vehicle is static and 0 may indicate that the vehicle is not static, the parameter $\overline{\omega}$ may denote the first threshold, and the parameter $\eta$ may denote the second threshold, and the two thresholds are selected based on experimental data and practical experience. In some embodiments, a static status of the vehicle may be a low-speed driving status.

$$R = \begin{cases} 1, & S_{avg} < \overline{\omega}, \theta_{sum} > \eta \\ 0 \end{cases}, \quad (8)$$

It should be noted that an exemplary flow chart may be described as a flow diagram, a flow chart table, a data flow diagram, a structural chart or a block diagram. The sequence of the steps may be rearranged. When the steps in the process are completed, the process may proceed to an end or extra steps not included in the flow chart. According to some embodiments of the present disclosure, determining the vehicle status by the POI engine 110 may further include storing the vehicle status and the center point coordinate and sending the vehicle status and the center point coordinate in response to a search request for the vehicle status. In some embodiments, the storage module 220 of the POI engine 110 may be configured to store the vehicle status and the center point coordinate. In some embodiments, the passenger interface 230 and/or the driver interface 240 of the POI engine 110 may be configured to send the vehicle status and the center point coordinate in response to a search request of the vehicle status. For example, in a car-hailing platform, the vehicle status R and the center point coordinates $g_0$ may be stored in the storage device. When the on-demand service system 105 sends the search request for the vehicle status, the vehicle status R and the center point coordinates $g_0$ that correspond to the searching time point may be read from the storage device and sent to the on-demand service system 105. In some embodiments, the vehicle may upload the GPS data to the on-demand service system 105 at a certain frequency by the passenger terminal device 120 and/or the passenger terminal device 140. The passenger interface 230 and/or the driver interface 240 of the POI engine 110 may receive the GPS dataflow from the passenger terminal device 120 and/or the driver terminal device 140. The address analyzing unit 310 may obtain multiple GPS coordinates of the vehicle in a given period. The calculation sub-unit 385 may calculate the center point coordinate of multiple GPS coordinates, and the distance and the orientation distribution between each GPS coordinate and the center point coordinate. The determining unit 380 may determine the vehicle status based on the distance and the orientation distribution. The determining unit 380 may store the vehicle status and the center point coordinate in the storage module 220 and/or the database 130 of the POI engine 110, respond to the search request for the vehicle status sent by the on-demand service system 105, read the vehicle status and the center point coordinate corresponding to the searching time point from the storage module 220 and/or the database 130 and send the data of the vehicle status to the on-demand service system 105. In some embodiments, the calculation unit 350 may calculate a service fee based on the vehicle status and/or multiple GPS coordinates of the vehicle in a given period. In some embodiments, the calculation unit 350 and the calculation sub-unit 385 of the determining unit 380 may calculate the service fee based on the vehicle status.

In some embodiments, the calculation unit 350 or the calculation sub-unit 385 may calculate the service fee based on the vehicle status and the duration of different vehicle status. In some embodiments, when the vehicle is in the static status or low-speed driving status (e.g., the average speed is less than a certain threshold), the method of calculating the service fee may be based on time, i.e., the service fee is calculated by a minute. Alternatively, one or more unit time rates may be set.

It should be noted that a threshold used to determine the low-speed driving status may be a preset speed, or a dynamic speed determined based on factors such as locations of the vehicle, time, etc. There may be one or more low-speed driving statuses. Multiple stages of the low-speed driving status may correspond to multiple different speed ranges. When the low-speed driving status have multiple stages, different unit time rates may be set for the different stages respectively. The same unit time rate also may be set for two or more statuses.

In some embodiments, when the vehicle is in the motion status or the high-speed driving status (e.g., the average driving speed exceeds a certain threshold), the method of calculating the service fee may be based on distance, i.e., the service fee is calculated by a unit distance. Alternatively, one or more unit distance rates may be set.

It should be noted that a threshold used to determine the high-speed driving status may be a preset speed, or a dynamic speed determined based on factors such as locations of the vehicle, time, etc. There may be one or more high-speed driving statuses. Multiple stages of the high-speed driving status may correspond to multiple different speed ranges. When the high-speed driving status have multiple stages, different unit distance rates may be set for the different stages respectively. The same unit distance rate also may be set for two or more statuses.

In some embodiments, the process that completes an order may include multiple transformations of the vehicle status. The calculation sub-unit 385 may perform statistical analysis of the duration of the static status or the low-speed driving status of the vehicle. Then the calculation unit 350 may calculate the service fee of the vehicle in the static status or the low-speed driving status based on the unit distance rate. In addition, the calculation unit 385 may perform statistical analysis of the duration and the distance of the high-speed driving status of the vehicle. Then the calculation unit 350 may calculate the service fee of the vehicle in the high-speed driving status based on the unit distance rate. Based on the service fee of the static status, low-speed driving status and high-speed driving status, the calculation unit 350 finally may calculate a total service fee of the whole travel route. In some embodiments, the service fee may be calculated when the transportation service is being implemented, i.e., the service fee is calculated in real time. In some embodiments, the service fee may be uniformly calculated after a transportation service is completed.

The description of pricing the service fee is provided for the purposes of illustration, and not intended to limit the scope of the present disclosure. For persons having ordinary skills in the art, various variations and modifications may be conducted under the teaching of the present disclosure about pricing the transportation service. For example, the calculation unit 350 may price the low-speed driving status of the vehicle based on unit distance rate. As another example, the calculation unit 350 may price the high-speed driving status of the vehicle based on the unit time rate. All such modifications are within the protection scope of the present disclosure.

It should be obvious to those skilled in the art that the modules, the units or the steps in the above description of the present disclosure may be realized by general calculating modules. For example, the modules, the units or the steps may be integrated into one calculating module or distributed on a network of multiple calculating modules. Alternatively, the modules, the units or the steps may be realized by executable program codes such that the executable program codes may be stored in a storage module and executed by the calculating module. The modules, the units or the steps may also be realized by distributing each of them on an individual integrated circuit module or distributing some of the modules or steps on a single integrated circuit module. In this way, the present disclosure is not limited to combinations of any particular hardware or software.

It should be noted that the above examples are provided for the purposes of illustration and not intended to limit the scope of the present disclosure. For persons having ordinary skills in the art, various variations and modifications may be conducted under the teaching of the present disclosure. However, those variations and modifications may not depart the spirit and scope of this disclosure.

Figure 14:
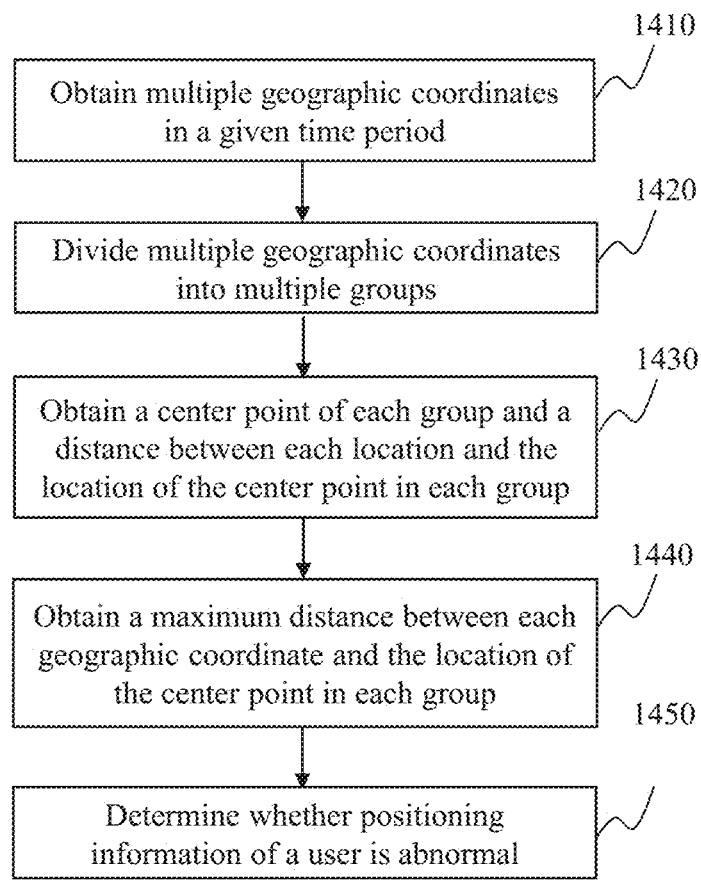
FIG. 14 is a flow chart of an example of a process of determining whether positioning information of a user is abnormal by a POI engine according to some embodiments of the present disclosure.

FIG. 14 is a flow chart of an example of a process of determining whether positioning information is abnormal by the POI engine 110 according to some embodiments of the present disclosure. In step 1410, the POI engine 110 may obtain multiple geographic coordinates of a passenger/driver in a given period. The step 1410 may be performed by the passenger interface 230 and/or the driver interface 240. Location information of multiple geographic coordinates of the passenger/driver in a given period may be obtained by the POI engine 110. According to some embodiments of the present disclosure, the given period may be a period such as ten minutes, half an hour, one hour, etc., determined by previous experience and/or experimental data. The passenger/driver may upload multiple geographic coordinates in a given period at certain intervals. The time intervals may be ten seconds, or the like. Each geographic coordinate may indicate a location of the passenger/driver at a time when the geographic coordinate is uploaded.

In step 1420, the POI engine 110 may divide multiple geographic coordinates into multiple groups. The step 1420 may be performed by the grouping unit 340 of the processing module 210 of the POI engine 110. According to some embodiments of the present disclosure, multiple geographic coordinates may be divided into several groups using at least one clustering algorithm. The clustering algorithm may include but is not limited to K-MEANS algorithm, K-MEDOIDS algorithm, CLARANS algorithm, or the like, or any combination thereof. A data set with N groups or records may be divided into K groups using clustering algorithm. Each group may be referred to as one cluster, wherein K<N. And the K groups may satisfy the following criteria:

(1) Each group may include at least one data record.

(2) Each data record may belong to and only belong to one group (it should be noted that this criterion may not be strictly executed when using fuzzy clustering algorithms).

For the given number K of the groups, the algorithm may generate an initial grouping method, and change the grouping method by repeatedly performing iterations to improve the grouping method. Herein, the criterion in concluding that a grouping method has been improved may relate to that records in the same group are as close or relevant as possible, and records in different groups are as far away or different as possible. According to some embodiments of the present disclosure, the location coordinates may be grouped based on distances between coordinates. After being grouped, the location coordinates in the same group may be as close to each other as possible (i.e., the distance between two coordinates in the same group may be kept as small as possible), and the location coordinates in different groups may be as far away from each other as possible (i.e., the distance between two coordinates in the different group may be kept as big as possible). According to some embodiments of the present disclosure, multiple pieces of positioning information (e.g., N coordinates) may be divided into multiple groups (i.e., multiple clusters) based on the clustering algorithm. The number of the groups (i.e., the number of the clusters) may be determined by previous experience or experimental data, for example, K (N>K>0).

In step 1430, the POI engine 110 may obtain location information of a center point of each group respectively, and a distance between each location and the location of the center point in each group. The step may be performed by the address analyzing unit 310 of the processing module 210 of the POI engine 110 and the calculation unit 350. According to some embodiments of the present disclosure, obtaining the location information of the center point of each group respectively may include calculating a mean of all the location information in each group, and taking the mean as the location information of the center point of each group. For example, the grouping unit 340 may divide N coordinates into K groups, and the calculation unit 350 may calculate the mean of all the coordinates in each group to obtain K mean coordinates. The K mean coordinates may be center point coordinates of corresponding groups respectively. According to some embodiments of the present disclosure, the distance between each obtained location and the location of the center point in each group may be calculated based on the location information of the center point of each group that are calculated respectively. For example, for the N coordinates obtained using a positioning technology, the distance between each location and the location of the center point in each group may be calculated respectively, thereof N distances may be obtained totally.

In step 1440, the POI engine 110 may obtain a maximum of distances between each geographic coordinate and the location of the center point in each group. The step 1440 may be performed by the determining unit 380 and the calculation sub-unit 385 of the processing module 210 of the POI engine 110. For example, based on the N distances described above, the maximum of the N distances may be calculated and determined. The maximum may be designated as $R_{max}$.

In step 1450, the POI engine 110 may determine whether the positioning information of the passenger/driver is abnormal based on the maximum distance (i.e., the maximum of the N distances described above). The step 1450 may be performed by the determining unit 380 of the processing module 210 of the POI engine 110. According to some embodiments of the present disclosure, determining whether the positioning information of the passenger/driver is abnormal may include: comparing the maximum distance with a preset threshold; and determining whether the positioning information of the passenger/driver is abnormal based on the comparing result. The preset threshold may be determined by previous experience or experimental data. For example, in a scenario, the passenger/driver is in the motion status, for example, the driver is driving and the passenger is moving, and the threshold may be set as 50 meters. Then, in a period (e.g., 30 minutes), the location of the driver/passenger may be changing. If the positioning information uploaded by the driver/passenger in this period is too concentrated (e.g., $R_{max}$<50 meters), the positioning information of the passenger/driver may be abnormal. At this time, the driver/passenger may be informed to find out the reason why the positioning information is abnormal, for example, whether the positioning function of the positioning device is turned off. As another example, in another scene, the driver/passenger is not in the motion status or in the low-speed driving status, for example, a pedestrian that is static or walking slowly, or a driver that is stuck in a traffic congestion. In this scene, the threshold may be set as 1000 meters. Then, in a period (e.g., 5 minutes), the location of the driver/passenger may be basically unchanging or changing slowly. So, if the positioning information in this period uploaded by the driver/passenger is too disperse (e.g., $R_{max}$>1000 meters), the positioning information of the driver/passenger may be abnormal in this period. The choice of the threshold and determining whether the positioning information of the driver/passenger is abnormal based on the relationship between the maximum value and the threshold (e.g., greater than, less than, equal to, no less than, no more than, etc.) may depend on the concrete scenario and the location of the driver/passenger in the specific embodiments. It should be noted that the above description of the embodiments is provided for the purposes of illustration, not intended to limit the scope of the present disclosure. It should be noted that any method that determines whether the positioning information of the user is abnormal based on the comparison of the maximum value and the threshold is within the spirit and scope of the present disclosure. In some embodiments, the calculation unit 350 may calculate the service fee based on the positioning information and/or multiple geographic coordinates. In some embodiments, the determining unit 380 and the calculation sub-unit 385 may further calculate the service fee based on the determination that the positioning information is normal.

The determination of whether the positioning information is abnormal may be applied to different scenarios. For example, the determination of whether the positioning information is abnormal may be used to determine whether to push an order to a driver. For example, a driver may provide a location of himself or herself by the driver terminal device 140 and request to provide service for a passenger towards the POI engine 110. If the POI engine 110 determines that the positioning information of the driver is abnormal, then the driver may be rejected to be allocated the order of the passenger. As another example, the determination of whether the positioning information is abnormal may be used to calculate a service fee. If the positioning information of the driver is abnormal, the calculation of the service fee may be adjusted correspondingly. Otherwise, the POI engine 110 may send a relevant reminder to the passenger or driver.

It should be noted that a flow chart may be described as a flow diagram, a flow chart table, a data flow diagram, a schematic chart or a block diagram. Although a flow chart may describe steps as a sequential process, actually, the process may implement multiple operations concurrently or simultaneously. Besides, the sequence of the steps may be rearranged. When the steps in the process are completed, the process may proceed to an end or extra steps not included in the flow chart. The process may correspond to a method, a function, a program, a subroutine, a subprogram, etc. When the process corresponds to the function, the ending of the process may correspond to returns of the function to calling function or main function. Besides, it should be obvious to those skilled in the art that the modules, the units or the steps in the above description of the present disclosure may be realized by general calculating modules. For example, the modules, the units or the steps may be integrated into one calculating module or distributed on a network of multiple calculating modules. Alternatively, the modules, the units or the steps may be realized by executable program codes such that the executable program codes may be stored in a storage module and executed by the calculating module. The modules, the units or the steps may also be realized by distributing each of them on an individual integrated circuit module or distributing some of the modules or steps on a single integrated circuit module. In this way, the present disclosure is not limited to combinations of any particular hardware or software.

It should be noted that the above examples are provided for the purposes of illustration and not intended to limit the scope of the present disclosure. For persons having ordinary skills in the art, various variations and modifications may be conducted under the teaching of the present disclosure. However, those variations and modifications may not depart the spirit and scope of this disclosure.

FIG. 15-A is a flow chart of an exemplary process of determining whether positioning information of a user is abnormal by the POI engine 110 according to some embodiments of the present disclosure. The user may be a service requester (e.g., a passenger), a service provider (e.g., a driver), etc. In step 1510, the POI engine 110 may obtain first positioning information of the user within a preset time period. The step 1510 may be performed by the passenger interface 230 and/or the driver interface 240. According to some embodiments of the present disclosure, information of multiple geographic coordinates of the user within a preset time period may be obtained using a positioning technology. The types or details of the positioning technology may be found in above description and will not be further described here. In some embodiments, GPS coordinate information obtained using the GPS positioning technology may include but is not limited to longitude, latitude, and time stamp information. In some embodiments, the passenger interface 230 and/or the driver interface 240 may be configured to obtain the first positioning information of the passenger terminal device 120 and/or the driver terminal device 140 within a preset time period. And the first positioning information may be the GPS coordinate information obtained using the GPS positioning technology.

In step 1520, the POI engine 110 may obtain second positioning information of the passenger/driver within a preset time period. The step 1520 may be performed by the passenger interface 230 and/or the driver interface 240. In some embodiments, information of multiple geographic coordinates of the passenger/driver within a preset time period may be obtained using a positioning technology. In some embodiments, the second positioning information may include but is not limited to longitude, latitude, and time stamp information. It should be noted that the preset time period in the step 1510 and the step 1520 may be the same, but the first positioning information and the second positioning information may be obtained using different positioning technologies. In some embodiments, the second positioning information of the passenger/driver may be obtained via the passenger interface 230 and/or the driver interface 240 using the base station positioning technology or the Wi-Fi positioning technology.

In step 1530, the POI engine 110 may compare the first positioning information with the second positioning information. The step 1530 may be completed by the determining unit 380 of the processing module 210 of the POI engine 110. According to some embodiments of the present disclosure, the calculation sub-unit 385 of the determining unit 380 may calculate the deviation between the first positioning information and the second positioning information. The determining unit 380 may compare the deviation with a first preset threshold. More particularly, for example, the error between the first positioning information and the second positioning information may be designated as the distance between a first positioning coordinate and a second positioning coordinate. The distance may be compared with the first preset threshold. In some embodiments, the first positioning information may be the GPS coordinate information obtained using the GPS positioning technology. The second positioning information may be the second coordinate information obtained using the base station positioning technology and/or the Wi-Fi positioning technology. In some embodiments, the first preset threshold may be set based on the error of the base station positioning or the Wi-Fi positioning. Generally, if the error of the base station positioning or the Wi-Fi positioning is about hundreds of meters, the first preset threshold may be set as hundreds of meters. In some embodiments, based on the comparison result of the first positioning information with the second positioning information, it may be possible to directly jump to step 1550 to determine whether the positioning information is abnormal without performing step 1540.

In step 1550, the POI engine 110 may determine whether the positioning information is abnormal. The step 1550 may be performed by the determining unit 380 of the processing module 210 of the POI engine 110. If the determining unit 380 determines that the deviation is equal to or greater than the first preset threshold, the determining unit 380 may determine that the first positioning information is abnormal. In some embodiments, the first positioning information may be GPS coordinate information. When the first positioning information is determined to be abnormal, the GPS coordinate information may be determined to be wrong coordinate information. If the determining unit 380 determines that the deviation is less than the first preset threshold, the method of determining whether the positioning information is abnormal may further include step 1540.

In some embodiments, if it is not yet determined whether the positioning information is abnormal based on the result of the step 1530, the step 1540 may be performed. In the step 1540, the POI engine 110 may obtain a number of a base station that the distance between the base station and the current address of the passenger/driver is less than a preset distance, and a signal intensity of the base station within a preset time period. Based on the GPS coordinate information, the number and the signal intensity of the base station, it may be determined whether the GPS coordinate information is wrong coordinate information. The step 1540 may be performed by the passenger interface 230 and/or the driver interface 240 of the POI engine 110. In some embodiments, the POI engine 110 may obtain the information of the current address of the passenger/driver through the passenger interface 230 and/or the driver interface 240 before the step 1540. Based on the current address of the passenger/driver, the address analyzing unit 310 of the processing module 210 may determine a base station that the distance between the base station and the current address of the passenger/driver is less than a preset distance. The current address of the passenger/driver may be the coordinate information obtained by the base station positioning technology or the Wi-Fi positioning technology. More particularly, for example, the step 1540 may include step 1551-1553.

FIG. 15-B is a flow chart of an exemplary process of determining whether positioning information is abnormal by the POI engine 110. In step 1551, the POI engine 110 may obtain a number of a base station that the distance between the base station and the current address of the passenger/driver is less than a preset distance, and a signal intensity of the base station within a preset time period. The number of the base station may be a unique serial number for identifying the base station. A base station may correspond to a base station number. The step 1551 may be performed by the passenger interface 230 and/or the driver interface 240 of the POI engine 110.

In step 1552, the POI engine 110 may compare the change of the GPS coordinate within a preset time period with a second preset threshold, and compare the change of the signal intensity of the base station within a preset time period with a third preset threshold. The step 1552 may be performed by the determining unit 380 of the processing module 210 of the POI engine 110 and the calculating subunit 385. More particularly, for example, the change of the GPS coordinate within a preset time period may be a difference between the GPS coordinate at the starting point of the preset time period and the GPS coordinate at the ending point of the preset time period. The change of the signal intensity of the base station within a preset time period may be a difference between the signal intensity of the base station at the starting point of the preset time period and the signal strength of the same base station at the ending point of the preset time period. For example, if the preset time period is from 1:10 to 1:30, the change of the GPS coordinate in the preset time period may be the difference between the GPS coordinate at 1:10 and the GPS coordinate at 1:30. The change of the signal intensity of the base station in the preset time period may be the difference between the signal intensity of the base station at 1:10 and the signal intensity of the same base station at 1:30. It should be noted that the preset time period may be adjusted based on an actual situation and/or an actual requirement. For example, the preset time period may be 5 minutes, 20 minutes, 30 minutes, 1 hour, or the like.

In step 1553, the POI engine 110 may determine whether the first positioning information is abnormal. The step 1553 may be performed by the determining unit 380 of the processing module 210 of the POI engine 110. If the determining unit 380 determines that the change of the GPS coordinate is greater than the second preset threshold, the number of the base station does not change and the change of the signal intensity of the base station is smaller than the third preset threshold, then the first positioning information may be determined to be abnormal, i.e., the GPS coordinate information in the preset time period is wrong coordinate information. More particularly, for example, if the GPS coordinate of the passenger/driver changes significantly in the preset time period, but the base station number near the passenger/driver does not change and the signal intensity of the base station does not change significantly, then the GPS coordinate in the preset time period may be determined to be wrong coordinate information. If the determining unit 380 determines that the change of the GPS coordinate is less than or equal to the second preset threshold, the number of the base station changes and the change of the signal intensity of the base station is greater than or equal to the third preset threshold, then the first positioning information may be determined to be abnormal, i.e., the GPS coordinate information in the preset time period is wrong coordinate information. More particularly, for example, if the GPS coordinate of the passenger/driver does not change significantly in the preset time period, but the number of the base station near the passenger/driver changes and the signal intensity of the base station changes significantly, then the GPS coordinate in the preset time period may be determined to be wrong coordinate information. In some embodiments, the calculation unit 350 may calculate a service fee based on the positioning information and/or the multiple geographic coordinates. In some embodiments, the determining unit 380 and its calculation sub-unit 385 may further calculate the service fee based on the positioning information that has been determined to be normal.

It should be noted that there are many ways of determining whether positioning information is abnormal and are not limited to the above description. In some embodiments, the determination of whether the positioning information is abnormal may be used to process the positioning information of a passenger. For example, the determination of whether the positioning information is abnormal may be used to determine whether the POI engine 110 should respond to an order request from a passenger. For example, a passenger may provide his/her positioning information by the passenger terminal device 120 and send a request to the POI engine 110 for a driver service. If the POI engine 110 determines that the positioning information of the passenger is abnormal, the POI engine 110 may further request more information from the passenger, remind the passenger that the positioning information is abnormal, send a request of repositioning, or reject the order request of the passenger. In some embodiments, a passenger may request an on-demand service at different locations in a short time (e.g., different locations are far away from each other at a time interval). The POI engine 110 may further inquire the passenger for more information about different service requests. For example, the more information may include whether the different service requests are from a same passenger, the contact information and the method of confirming the order of another passenger when the different service requests are from different passengers. If the departure location input by a passenger on the passenger terminal device 120 is far from the current location of the passenger terminal device 120 (e.g., 10 km) and the departure time designated by the passenger is close to the current system time of the passenger terminal device 120 (e.g., 10 minutes or 20 minutes), then the POI engine 110 may further send confirmation information to the passenger terminal device 120 to request the passenger to confirm the departure location and/or the departure time. The POI engine 110 may also request the passenger for other information (e.g., surrounding public or commercial facilities, important landmark buildings, street names, etc.) to determine whether the positioning of the passenger terminal device 120 is abnormal.

It should be noted that modules of the system of the present disclosure are logically divided according to their functions. These modules are provided for the purposes of illustration, and not intended to limit the scope of the present disclosure. These modules may be re-divided or combined according to different requirements. For example, some modules may be combined into a single module, or further divided into more sub-modules.

Various modules of the present disclosure may be implemented by hardware, software running in one or more processors, or a combination of them. For persons having ordinary skills in the art, some or all of the functions of the modules of the present disclosure may be implemented by a microprocessor or a digital signal processor (DSP). The present disclosure may also be implemented as a device or a program running in a device (e.g., a computer program and a product with computer programs) that perform a part or all of the methods described herein. Such kind of programs may be stored on a computer readable medium, or may be in a form of one or more signals. Such signals may be downloaded from an Internet website, provided on a carrier signal, or provided in any other forms.

The embodiments described above are provided for the purposes of illustration, and not intended to limit the scope of the present disclosure. For persons having ordinary skills in the art, various variations and modifications may be conducted under the teaching of the present disclosure. However, those variations and modifications may not depart the spirit and scope of this disclosure. The scope of the patent disclosure should be the consistent with the scope of the claims.

Figure 16:
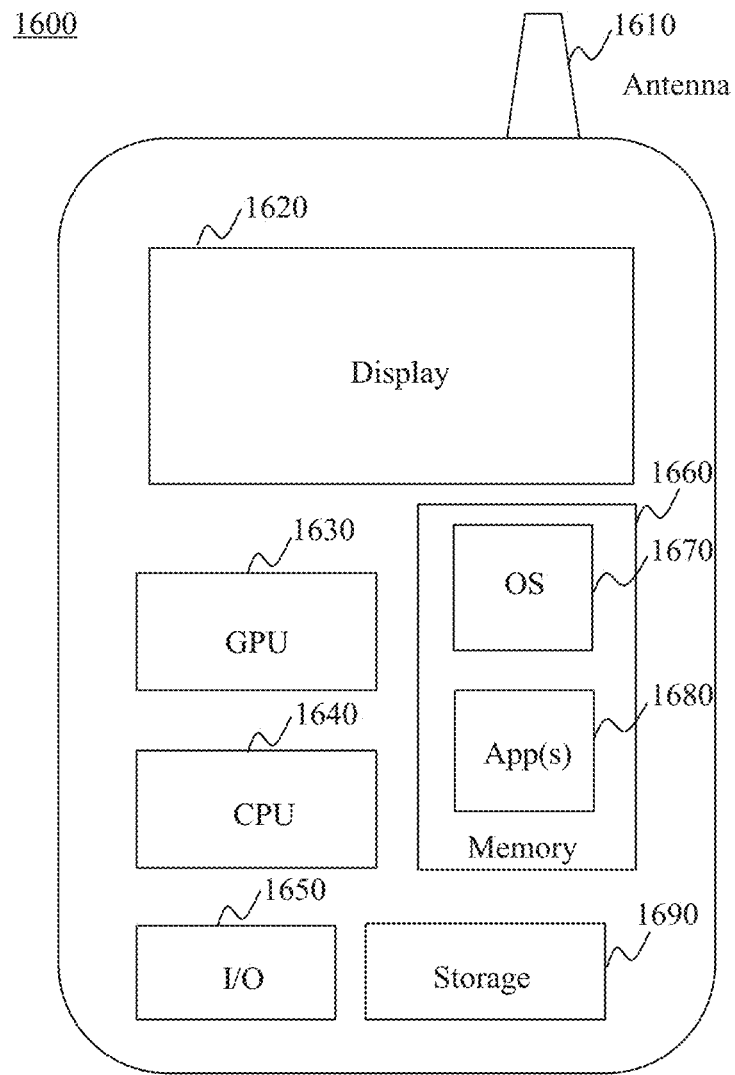
FIG. 16 is a structure of a mobile device that is configured to implement a specific system disclosed in the present disclosure.

FIG. 16 is a structure of a mobile device that is configured to implement a specific system disclosed in the present disclosure. In some embodiments, the user terminal device configured to display and communicate information related to locations may be a mobile device 1600. The mobile device may include but is not limited to a smart phone, a tablet computer, a music player, a portable game console, a GPS receiver, a wearable calculating device (e.g. glasses, watches, etc.), or the like. The mobile device 1600 may include one or more central processing units (CPUs) 1640, one or more graphical processing units (GPUs) 1630, a display 1620, a memory 1660, an antenna 1610 (e.g. a wireless communication unit), a storage unit 1690, and one or more input/output (I/O) devices 1650. Moreover, the mobile device 1600 may also be any other suitable component that includes but is not limited to a system bus or a controller (not shown in FIG. 16). As shown in FIG. 16, a mobile operating system 1670 (e.g. IOS, Android, Windows Phone, etc.) and one or more applications 1680 may be loaded from the storage unit 1690 to the memory 1660 and implemented by the CPUs 1640. The application 1680 may include a browser or other mobile applications configured to receive and process information related to locations in the mobile device 1600. The passenger/driver may obtain communication information related to locations through the system I/O device 1650, and provide the information to the POI engine 110 and/or other modules or units of the system 100, e.g. the network 150.

In order to implement various modules, units and their functions described above, a computer hardware platform may be used as hardware platforms of one or more elements (e.g., the POI engine 110 and/or other sections of the system 100 described in FIG. 1 through FIG. 15). Since these hardware elements, operating systems and program languages are common, it may be assumed that persons skilled in the art may be familiar with these techniques and they may be able to provide information required in the on-demand service according to the techniques described in the present disclosure. A computer with user interface may be used as a personal computer (PC), or other types of work stations or terminal devices. After being properly programmed, a computer with user interface may be used as a server. It may be considered that those skilled in the art may also be familiar with such structures, programs, or general operations of this type of computer device. Thus, extra explanations are not described for the Figures.

Figure 17:
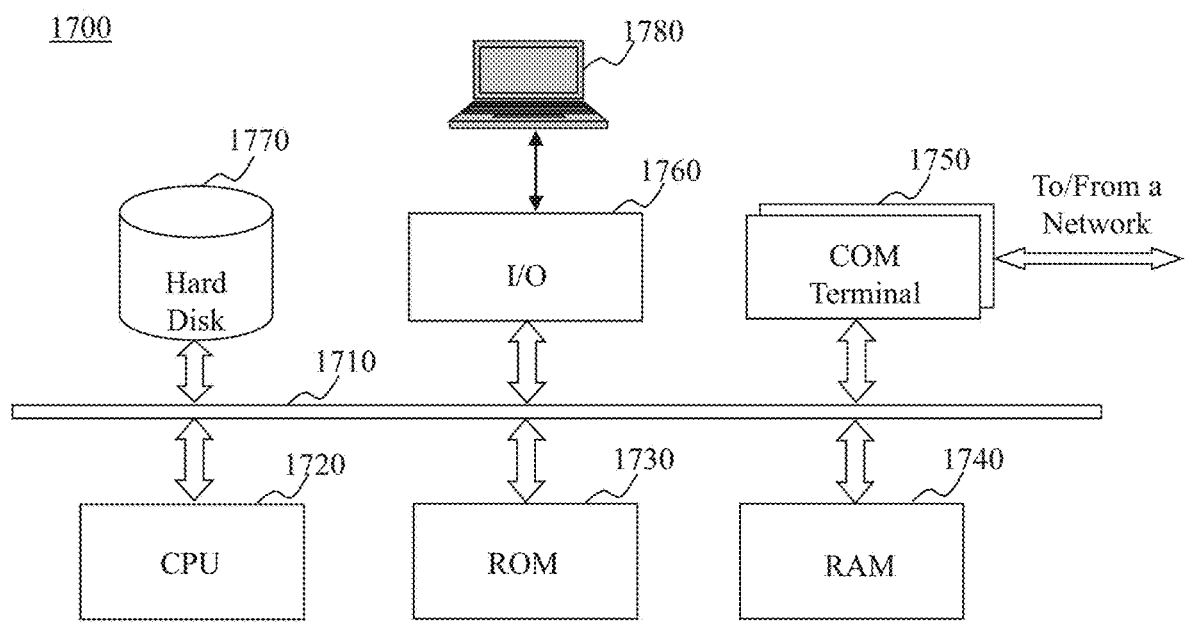
FIG. 17 is a structure of a computing device that is configured to implement a specific system disclosed in the present disclosure.

FIG. 17 is a structure of a computing device that is configured to implement a specific system disclosed in the present disclosure. The particular system may use a functional block diagram to explain the hardware platform containing one or more user interfaces. The computer may be a computer with general or specific functions. Both types of the computers may be configured to implement any particular system according to some embodiments of the present disclosure. The computer 1700 may be configured to implement any components that provides information required by the on-demand service disclosed in the present description. For example, the POI engine 110 may be implemented by hardware devices, software programs, firmwares, or any combination thereof of a computer like the computer 1700. For brevity, FIG. 17 depicts only one computer. In some embodiments, the functions of the computer, providing information that on-demand service may require, may be implemented by a group of similar platforms in a distributed mode to disperse the processing load of the system.

The computer 1700 may include a communication terminal 1750 that may connect with a network that may implement the data communication. The computer 1700 may also include a CPU that is configured to execute instructions and includes one or more processors. The schematic computer platform may include an internal communication bus 1710, different types of program storage units and data storage units, e.g. a hard disk 1770, a read-only memory (ROM) 1730, a random-access memory (RAM) 1740), various data files applicable to computer processing and/or communication, and some program instructions executed possibly by the CPU. The computer 1700 may also include an I/O device 1760 that may support the input and output of data flows between the computer and other components (e.g. a user interface 1780). Moreover, the computer 1700 may receive programs and data via the communication network.

Various aspects of methods of providing information required by on-demand service and/or methods of implementing other steps by programs are described above. The programs of the technique may be considered as "products" or "artifacts" presented in the form of executable codes and/or relative data. The programs of the technique may be joined or implemented by the computer readable media. Tangible and non-volatile storage media may include any type of memory or storage that is applied in computer, processor, similar devices, or relative modules. For example, the tangible and non-volatile storage media may be various types of semiconductor storages, tape drives, disc drives, or similar devices capable of providing storage function to software at any time.

Some or all of the software may sometimes communicate via a network, e.g. the Internet or other communication networks. This kind of communication may load a software from a computer device or a processor to another. For example, a software may be loaded from a management server or a main computer of the on-demand service system to a hardware platform in a computer environment, or to other computer environments capable of implementing the system, or to systems with similar functions of providing information required by on-demand service. Correspondingly, another media used to transmit software elements may be used as physical connections among some of the equipment. For example, light wave, electric wave, electromagnetic wave, etc. may be transmitted by cables, optical cables or air. Physical media used to carry waves, e.g. cable, wireless connection, optical cable, or the like, may also be considered as media of hosting software. Herein, unless the tangible "storage" media is particularly designated, other terminologies representing the "readable media" of a computer or a machine may represent media joined by the processor when executing any instruction.

A computer readable media may include a variety of forms, including but not limited to tangible storage media, wave-carrying media or physical transmission media. Stable storage media may include compact disc, magnetic disk, or storage systems that are applied in other computers or similar devices and may achieve all the sections of the system described in the drawings. Unstable storage media may include dynamic memory, e.g. the main memory of the computer platform. Tangible transmission media may include coaxial cable, copper cable and optical fiber, including circuits forming the bus in the internal of the computer system. Wave-carrying media may transmit electric signals, electromagnetic signals, acoustic signals or light wave signals. And these signals may be generated by radio frequency communication or infrared data communication. General computer readable media may include hard disk, floppy disk, magnetic tape, or any other magnetic media; CD-ROM, DVD, DVD-ROM, or any other optical media; punched cards, or any other physical storage media containing aperture mode; RAM, PROM, EPROM, FLASH-EPROM, or any other memory chip or magnetic tape; carrying waves used to transmit data or instructions, cable or connection devices used to transmit carrying waves, or any other program code and/or data accessible to a computer. Most of the computer readable media may be applied in executing instructions or transmitting one or more results by the processor.

It may be understood to those skilled in the art that various alterations and improvements may be achieved according to some embodiments of the present disclosure. For example, the various components of the system described above are all achieved by hardware equipment. In fact, the various components of the system described above may be achieved merely by software, e.g. installing the system on the current server. Additionally or alternatively, the location information disclosed here may be provided by a firmware, a combination of a firmware and a software, a combination of a firmware and a hardware, or a combination of a firmware, a hardware and a software.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

What is claimed is:

1. A system for providing information for an on-demand service, comprising:
   at least one non-transitory computer-readable storage medium including a set of instructions,
   at least one processor in communication with the at least one non-transitory storage medium, wherein when executing the set of instructions, the at least one processor is configured to cause the system to:
   receive, at the system, from a terminal device of a user, a service request;
   obtain, at the system, information related to the service request, the information related to the service request including feature-related information and profile information from a database and the terminal device;
   determine, at the system, travel information corresponding to at least one single travel method based on the feature-related information and the profile information; and
   determine, at the system, travel information corresponding to at least one hybrid travel method based on the travel information corresponding to the at least one single travel method; wherein
   the profile information comprises at least one of a departure time, a departure or a destination, and the feature-related information comprises at least one of point of interest (POI) information of the departure and the destination, real-time weather information, real-time traffic information or a distance between the departure and the destination; and
   wherein to determine, at the system, travel information corresponding to at least one single travel method based on the feature-related information and the profile information, the at least one processor is configured to cause the system to:
   estimate an order completion rate of the at least one single travel method based on the feature-related information and the profile information using a pre-built prediction model;
   arrange a travel rout based on the departure, the destination and the at least one single travel method, wherein information of the travel rout is obtained to estimate a required fee, a walking distance and a required time, and the information of the travel rout includes at least one of the distance between the departure and the destination, travel time and level of traffic congestion; and determine travel information of the service request corresponding to the at least one single travel method, the travel information including at least one of order completion rate, the required time, the required fee or the walking distance corresponding to the at least one single travel method.

2. The system of claim 1, wherein the at least one processor is configured to cause the system to:

rank, at the system, the at least one single travel method and the at least one hybrid travel method based on a preset travel condition, the preset travel condition including at least one of a preset range of walking distance, a preset required fee, or a preset required time;

send, from the system, a list of the ranked travel methods including the at least one single travel method and the at least one hybrid travel method to the terminal device; and display the ranked travel methods on the terminal device for the user to select.

3. The system of claim 1, wherein the service request comprises at least one transportation service request, and the feature-related information further comprises at least one of preference information of a driver for the at least one single travel method, or the number of available drivers corresponding to the at least one single travel method in a preset area.

4. The system of claim 1, wherein the at least one processor is further configured to cause the system to:

determine, at the system, the order completion rate corresponding to each of a preset amount of additional fee and a passenger's acceptance rate of the preset amount of additional fee based on multiple preset amounts of the additional fee;

obtain, at the system, an optimal amount of additional fee based on the order completion rate and the passenger's acceptance rate corresponding to each of the preset amount of additional fee; and designate, at the system, order completion rate corresponding to the optimal amount of additional as a final order completion rate.

5. The system of claim 1, wherein to determine travel information corresponding to at least one hybrid travel method based on the travel information corresponding to the at least one single travel method, the at least one processor is configured to cause the system to:

determine, at the system, the at least one hybrid travel method based on the travel information corresponding to the at least one single travel method using a global optimization algorithm, wherein the at least one hybrid travel method is ranked based on the required time; and/or determine, at the system, the at least one hybrid travel method in based on the travel information corresponding to the at least one single travel method using the global optimization algorithm, wherein the at least one hybrid travel method is ranked based on the required fee; and obtain, at the system, travel information corresponding to at least one hybrid travel method.

6. The system of claim 1, wherein the at least one processor is further configured to cause the system to:

obtain, at the system, at least one travel rout corresponding to the at least one single travel method, the at least one travel rout comprising the departure and the destination;

calculate, at the system, at least one probability of the at least one travel route;

rank, at the system, the at least one travel rout base on the at least one probability of the at least one travel route; and send, from the system, a list of the ranked travel routes to the terminal device.

7. The system of claim 6, wherein to obtain the at least one travel rout corresponding to the at least one single travel method, at least one processor is further configured to cause the system to:

obtain, at the system, the at least one travel rout preset by the user; and/or obtain, at the system, the at least one travel rout based on a big data calculation of daily travel data and consumption behavior of the user.

8. The system of claim 6, wherein to calculate the at least one probability of the at least one travel route, the at least one processor is further configured to cause the system to:

calculate, at the system, historical probability of the at least one travel route; and calculate, at the system, the at least one probability of the at least one travel route based on the historical probability of the at least one travel route and travel-route-related information, the travel-route-related information including at least one of the departure, the real-time weather information, or the departure time.

9. The system of claim 6, wherein the at least one travel rout is ranked based on the at least one probability in a descending order.

10. A method for providing information for an on-demand service implemented on a computing device having at least one processor and at least one storage device, the method comprising:

receiving, by the computing device, from a terminal device of a user, a service request;

obtaining, by the computing device, information related to the service request, the information related to the service request including feature-related information and profile information;

determining, by the computing device, travel information corresponding to at least one single travel method based on the feature-related information and the profile information; and determining, by the computing device, travel information corresponding to at least one hybrid travel method based on the travel information corresponding to the at least one single travel method; wherein the profile information comprises at least one of a departure time, a departure or a destination, and the feature-related information comprises at least one of point of interest (POI) information of the departure and the destination, real-time weather information, real-time traffic information or a distance between the departure and the destination; and wherein the determining, by the computing device, determining travel information corresponding to at least one single travel method based on the feature-related information and the profile information, the at least one processor is configured to cause the system to:

estimate an order completion rate of the at least one single travel method based on the feature-related information and the profile information using a pre-built prediction model;

arrange a travel rout based on the departure, the destination and the at least one single travel method, wherein information of the travel rout is obtained to estimate a required fee, a walking distance and a required time, and the information of the travel rout includes at least one of the distance between the departure and the destination, travel time and level of traffic congestion; and determine travel information of the service request corresponding to the at least one single travel method, the travel information including at least one of order completion rate, the required time, the required fee or the walking distance corresponding to the at least one single travel method.

11. The method of claim 10, further comprising:

ranking, by the computing device, the at least one single travel method and the at least one hybrid travel method based on a preset travel condition, the preset travel condition including at least one of a preset range of walking distance, a preset required fee, or a preset required time;

sending, from the computing device, a list of the ranked travel methods including the at least one single travel method and the at least one hybrid travel method to the terminal device; and displaying the ranked travel methods on the terminal device for the user to select.

12. The method of claim 10, wherein the determining travel information corresponding to at least one hybrid travel method based on the travel information corresponding to the at least one single travel method comprises:

determining, by the computing device, the at least one hybrid travel method based on the travel information corresponding to the at least one single travel method using a global optimization algorithm, wherein the at least one hybrid travel method is ranked based on the required time; and/or determining, by the computing device, the at least one hybrid travel method in based on the travel information corresponding to the at least one single travel method using the global optimization algorithm, wherein the at least one hybrid travel method is ranked based on the required fee; and obtaining, by the computing device, travel information corresponding to at least one hybrid travel method.

13. The method of claim 10, further comprising:

obtaining, by the computing device, at least one travel rout corresponding to the at least one single travel method, the at least one travel rout comprising the departure and the destination;

calculating, by the computing device, at least one probability of the at least one travel route;

ranking, by the computing device, the at least one travel rout base on the at least one probability of the at least one travel route; and sending, from the computing device, a list of the ranked travel routes to the terminal device.

14. The method of claim 13, wherein the obtaining at least one travel rout corresponding to the at least one single travel method comprises:

obtaining, by the computing device, the at least one travel rout preset by the user; and/or obtaining, by the computing device, the at least one travel rout based on a big data calculation of daily travel data and consumption behavior of the user.

15. The method of claim 13, wherein the calculating the at least one probability of the at least one travel route comprises:

calculating, by the computing device, historical probability of the at least one travel route; and calculating, by the computing device, the at least one probability of the at least one travel route based on the historical probability of the at least one travel route and travel-route-related information, the travel-route-related information including at least one of the departure, the real-time weather information, or the departure time.

16. A non-transitory computer readable medium, comprising at least one set of instructions, wherein when executed by at least one processor of a computing device, the at least one set of instructions cause the at least one processor to effectuate a method comprising:

receiving, by the processor, from a terminal device of a user, a service request;

obtaining, by the processor, information related to the service request, the information related to the service request including feature-related information and profile information;

determining, by the processor, travel information corresponding to at least one single travel method based on the feature-related information and the profile information; and determining, by the processor, travel information corresponding to at least one hybrid travel method based on the travel information corresponding to the at least one single travel; wherein the profile information comprises at least one of a departure time, a departure or a destination, and the feature-related information comprises at least one of point of interest (POI) information of the departure and the destination, real-time weather information, real-time traffic information or a distance between the departure and the destination; and wherein the determining, by the computing device, determining travel information corresponding to at least one single travel method based on the feature-related information and the profile information, the at least one processor is configured to cause the system to:

estimate an order completion rate of the at least one single travel method based on the feature-related information and the profile information using a pre-built prediction model;

arrange a travel rout based on the departure, the destination and the at least one single travel method, wherein information of the travel rout is obtained to estimate a required fee, a walking distance and a required time, and the information of the travel rout includes at least one of the distance between the departure and the destination, travel time and level of traffic congestion; and determine travel information of the service request corresponding to the at least one single travel method, the travel information including at least one of order completion rate, the required time, the required fee or the walking distance corresponding to the at least one single travel method.

* * * * *